(12) United States Patent
Lu et al.

(10) Patent No.: US 11,653,435 B2
(45) Date of Patent: May 16, 2023

(54) SYSTEM LEVEL OCCUPANCY COUNTING IN A LIGHTING SYSTEM WITH A SINGLE TRANSMITTER AND MULTIPLE RECEIVERS

(71) Applicant: ABL IP HOLDING LLC, Conyers, GA (US)

(72) Inventors: Min-Hao Michael Lu, Castro Valley, CA (US); Michael Miu, Castro Valley, CA (US); Eric J. Johnson, San Francisco, CA (US)

(73) Assignee: ABL IP HOLDING LLC, Conyers, GA (US)

( * ) Notice: Subject to any disclaimer, the term of this patent is extended or adjusted under 35 U.S.C. 154(b) by 1454 days.

(21) Appl. No.: 15/870,033

(22) Filed: Jan. 12, 2018

(65) Prior Publication Data

US 2019/0220728 A1  Jul. 18, 2019

(51) Int. Cl.
G06N 3/04 (2006.01)
G06N 3/08 (2006.01)
H05B 47/19 (2020.01)
G06N 3/084 (2023.01)
G05B 13/02 (2006.01)
(Continued)

(52) U.S. Cl.
CPC ........... *H05B 47/19* (2020.01); *G05B 13/027* (2013.01); *G06N 3/04* (2013.01); *G06N 3/084* (2013.01); *H05B 45/10* (2020.01); *H05B 47/115* (2020.01); *H04B 1/02* (2013.01); *H04B 1/06* (2013.01); *H04B 17/318* (2015.01)

(58) Field of Classification Search
CPC combination set(s) only.
See application file for complete search history.

(56) References Cited

U.S. PATENT DOCUMENTS 9,474,042 B1  10/2016  Wootton et al.
9,986,623 B1  5/2018  Miu et al.
(Continued)

OTHER PUBLICATIONS

Wang et al. Estimation of Occupancy Level in Indoor Environment Based on Heterogeneous Information Fusion (Dec. 15-17, 2010) (Year: 2010).*
Soltani et al., Enhancing Cluster-based RFID Tag Localization using artificial neural networks and virtual reference tags (Mar. 30, 2015) (Year: 2015).*
(Continued)

*Primary Examiner* — Luis A Sitiriche
(74) *Attorney, Agent, or Firm* — RatnerPrestia

(57) ABSTRACT

Disclosed herein is system level occupancy counting in a lighting system configured to obtain an indicator data of a RF spectrum signal (signal) generated at a number of times in an area. At each respective one of the number of times, apply one of a plurality of heurist algorithm heuristic algorithm coefficients to each indicator data of the signal, based on results of the application of the heuristic algorithm coefficients, generate an indicator data metric value for each of the indicator data for the respective time. The lighting system is also configured to process each of the indicator data metric value to compute a plurality of metric values for the respective time and combine the plurality of metric values to compute an output metric value for each of a plurality of probable number of occupants in the area for the respective time. The lighting system is further configured to determine an occupancy count in the area at the respective time based on the computed output metric value.

27 Claims, 21 Drawing Sheets

(51) Int. Cl.
*H05B 45/10* (2020.01)
*H05B 47/115* (2020.01)
*H04B 17/318* (2015.01)
*H04B 1/06* (2006.01)
*H04B 1/02* (2006.01)

(56) References Cited

U.S. PATENT DOCUMENTS

| | | | |
|---|---|---|---|
| 10,154,566 B1 | 12/2018 | Lu et al. | |
| 10,334,706 B1 | 6/2019 | Lu et al. | |
| 10,334,707 B1 | 6/2019 | Lu et al. | |
| 10,412,814 B2 | 9/2019 | Lu et al. | |
| 10,849,207 B2 | 11/2020 | Lu et al. | |
| 11,170,296 B2 | 11/2021 | Lu et al. | |
| 2010/0026479 A1* | 2/2010 | Tran | A61B 5/02042 340/501 |
| 2011/0121654 A1* | 5/2011 | Recker | H05B 45/3725 307/64 |
| 2014/0119160 A1 | 5/2014 | Shilling et al. | |
| 2015/0178865 A1 | 6/2015 | Anderson et al. | |
| 2015/0346702 A1 | 12/2015 | Camden et al. | |
| 2016/0248506 A1 | 8/2016 | Ryan et al. | |
| 2016/0260135 A1 | 9/2016 | Zomet et al. | |
| 2016/0294492 A1 | 10/2016 | Mostofi et al. | |
| 2016/0320758 A1 | 11/2016 | Park | |
| 2017/0017214 A1* | 1/2017 | O'Keeffe | G06N 20/00 |
| 2017/0018042 A1 | 1/2017 | Pudipeddi et al. | |
| 2018/0167547 A1 | 6/2018 | Casey et al. | |
| 2018/0205793 A1 | 7/2018 | Loeb et al. | |
| 2019/0220728 A1 | 7/2019 | Lu et al. | |

OTHER PUBLICATIONS

Hang, X., Machine Learning Based Data Analytics for IoT Devices (2017) (Year: 2017).*
Meyn et al., A Sensor-Utility-Network Method for Estimation of Occupancy in Buildings (Dec. 16-18, 2009) (Year: 2009).*
Keeping, S., ZigBee-Powered Smart Lighting Solutions (Apr. 15, 2016) (Year: 2016).*
Nordic Semiconductor: nRF51822—Multi-protocol Bluetooth Low Energy and 2.4GHz proprietary system-on-a chip, document printed Aug. 10, 2017 (2 pages).
U.S. Appl. No. 15/214,962, filed Jul. 20. 2016. entitled "Protocol for Lighting Control Via a Wireless Network" (75 pages).
Non Final Office Action for U.S. Appl. No. 15/870,003, dated May 13, 2021, 30 pages.
Final Office Action for U.S. Appl. No. 15/870,003, dated Jun. 25, 2021, 5 pages.
Notice of Allowance for U.S. Appl. No. 15/870,003, dated Jul. 12, 2021, 8 pages.
Notice of Allowance for U.S. Appl. No. 15/870,057, dated Jun. 7, 2022, 17 pages.
Wagiman et al., "Lighting System Control Techniques in Commercial Buildings: Current Trends and Future Directions," Journal of Building Engineering, 2020, vol. 31, 20 pages.
Wang, "Self-Configuring and Self-Adaptive Environment Control Systems for Buildings," A Dissertation Presented in Partial Fulfillment of the Requirements for the Degree of Doctor of Philosophy, Arizona State University, 2015, 99 pages.
Non Final Office Action for U.S. Appl. No. 15/870,057, dated Dec. 24, 2021, 75 pages.

* cited by examiner

SYSTEM LEVEL OCCUPANCY COUNTING IN A LIGHTING SYSTEM WITH A SINGLE TRANSMITTER AND MULTIPLE RECEIVERS

CROSS REFERENCE TO RELATED APPLICATIONS

This application is related to U.S. patent application Ser. No. 15/870,057, filed on Jan. 12, 2018, entitled "System Level Occupancy Counting in a Lighting System with Multiple Transmitters and a Single Receiver," published as U.S. Patent Publication No. 2019/0220729 on Jul. 18, 2019; and U.S. patent application Ser. No. 15/870,003, filed on Jan. 12, 2018, entitled "System Level Occupancy Counting in a Lighting System," issued as U.S. Pat. No. 11,170,296 on Nov. 9, 2021.

BACKGROUND

In recent years, a number of systems and methods have been proposed for occupancy counting within a particular area. Examples of such systems include video sensor monitoring systems, radio frequency identification (RFID) systems, global positioning systems (GPS), and wireless communication systems among others. Some of these systems, such as RFID and GPS, utilize various radio frequency (RF) based technologies. However, many of these occupancy counting systems have several disadvantages. For example, the video sensor monitoring system requires a considerable number of dedicated sensors that are expensive and the system requires a large amount of memory for storing data. The RFID systems rely on occupants carrying an RFID tag/card that can be sensed by the RFID system to monitor the occupants. The GPS system uses orbiting satellites to communicate with the terrestrial transceiver to determine a location of the occupant in the area. However, such systems are generally less effective indoors or in other environments where satellite signals may be blocked, reducing accuracy of detecting the occupant in the area.

Electrically powered artificial lighting has become ubiquitous in modern society. Since the advent of electronic light emitters, such as lighting emitting diodes (LEDs), for general lighting type illumination application, lighting equipment has become increasingly intelligent with incorporation of sensors, programmed controller and network communication capabilities. Automated control, particularly for enterprise installations, may respond to a variety of sensed conditions, such a daylight or ambient light level or occupancy. Commercial grade lighting systems today utilize special purpose sensors and related communications.

There also have been proposals to detect or count the number of occupants in an area based on effects on an RF signal received from a transmitter due to the presence of the occupant(s) in the area. These RF wireless communication systems generally count the number of occupants in the area based on change in signal characteristics of a data packet transmitted by a single receiver and a single transmitter over the wireless network. However, an inaccurate count of the occupants in the area can occur when multiple receivers are receiving the RF signals from one or more transmitters. Further, none of the proposals for detecting or counting the number of occupants provide for the transmission and receipt of the RF signals in the lighting system.

SUMMARY

The examples disclosed herein improve over RF-based sensing technologies by counting number of occupants in space.

Some examples disclosed herein include a radio frequency (RF) based system level occupancy counting in a space. In such examples, occupancy count is determined based on measurements of RF perturbations in an area or space. An example algorithm involves establishing a relationship between the RF perturbations occurring in real time with a pre-determined number of occupancy count prior to the real time. The relationship is compared with the RF perturbations in real time to determine the occupancy count in the area at real time.

Other examples disclosed herein include heuristically counting number of occupants in a space. In such examples, occupancy count is determined based on measurements of RF perturbations in an area or space. An example machine learning algorithm involves determining optimized heuristic algorithm heuristic algorithm coefficients associated with the RF perturbations to provide occupancy count in the area at a time. The optimized heuristic algorithm heuristic algorithm coefficients are utilized in the example machine learning algorithm to provide the occupancy count in the area at real time. In one example, prior to the real time occupancy count, learning occurs to optimize the heuristic algorithm coefficients, for example, prior to shipping of a product or as part of commissioning. In another example, learning occurs in real time operation, thus resulting in an on-going learning process to further optimize the heuristic algorithm coefficients.

An example system includes a plurality of lighting elements. Each of the plurality of lighting elements is a luminaire and includes a light source to illuminate an area. The system also includes a wireless communication transmitter for wireless radio frequency (RF) spectrum transmission in the area, including RF spectrum transmission at a plurality of times. The transmitter is integrated into one of the lighting elements. The system also includes a plurality of wireless communication receivers configured to receive RF spectrum signals of transmissions from the transmitter through the area at the plurality of times. Each of the plurality of the receivers is configured to generate an indicator data of a signal characteristic of received RF spectrum signal at each of the plurality of times. Each of the plurality of receivers is integrated into one of the lighting elements. The system further includes a processing circuitry coupled to obtain the indicator data of RF spectrum signal generated at each of the plurality of times from each of the plurality of receivers. The processing circuitry is configured to at each respective one of the plurality of times, for each respective one of the plurality of receivers; apply one of a plurality of heuristic algorithm coefficients to each indicator data of an RF spectrum signal from the transmitter received by the respective receiver at the respective time; based on results of the application of the heuristic algorithm coefficients, generate an indicator data metric value for each of the indicator data generated by the respective receiver for the respective time; and process each of the indicator data metric value to compute a plurality of metric values associated with the respective receiver for the respective time. Each of the plurality of metric values provide a measurement of each of a plurality of a probable number of occupants in the area for the respective time. The processing circuitry is also configured to combine the plurality of metric values associated with each of the plurality of receivers to compute an output metric value for each of the plurality of probable number of occupants in the area for the respective time. At each respective one of the plurality of times, the processing circuitry is configured to determine an occupancy count in the area at the respective time based on the computed output metric values for each of the plurality of probable number of occupants in the area.

An example method includes obtaining, in a lighting system, an indicator data generated at each of a plurality of times from each of a plurality of receivers configured to receive radio frequency (RF) spectrum signals from a RF transmitter in an area. The lighting system includes a plurality of lighting elements. At each respective one of the plurality of times in the lighting system, the method also includes applying a plurality of heuristic algorithm coefficients to each indicator data from each of the plurality of receivers for the respective time, based on results of the application of the heuristic algorithm coefficients to the indicator data, generating an indicator data metric value for the indicator data generated by the respective receiver for the respective time, processing each of the indicator data metric for each of the indicator data to compute a plurality of metric values for the respective receiver for the respective time. Each of the plurality of metric values provide a measurement of each of a plurality of a probable number of occupants in the area for the respective time. The method further includes combining the plurality of metric values for the respective receiver to compute an output value for each of the plurality of probable number of occupants in the area for the respective time; and determining an occupancy count in the area at the respective time based on the computed output metric values for each of the plurality of probable number of occupants in the area.

Another example system includes a plurality of lighting elements. Each of the plurality of lighting elements is a luminaire and includes a light source to illuminate an area. The system also includes a wireless communication transmitter for wireless radio frequency (RF) spectrum transmission in an area, including RF transmission at a plurality of times. The transmitter is integrated into one of the lighting elements. The system also includes a plurality of wireless communication receivers integrated into other of the lighting elements and configured to receive RF spectrum signals of transmissions from the transmitter through the area at the plurality of times. Each of the plurality of the receivers is configured to generate an indicator data of a signal characteristic of received RF spectrum signal at each of the plurality of times. The system further includes a processing circuitry coupled to obtain the indicator data of the RF spectrum signal generated at each of the plurality of times from each of the plurality of receivers. The processing circuitry is configured to process the indicator data from the plurality of lighting elements to determine an occupancy count in the area at each of the plurality of times.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accordance with the present teachings, by way of example only, not by way of limitation. In the figures, like reference numerals refer to the same or similar elements.

DETALED DESCRIPTION

Figure 1A:
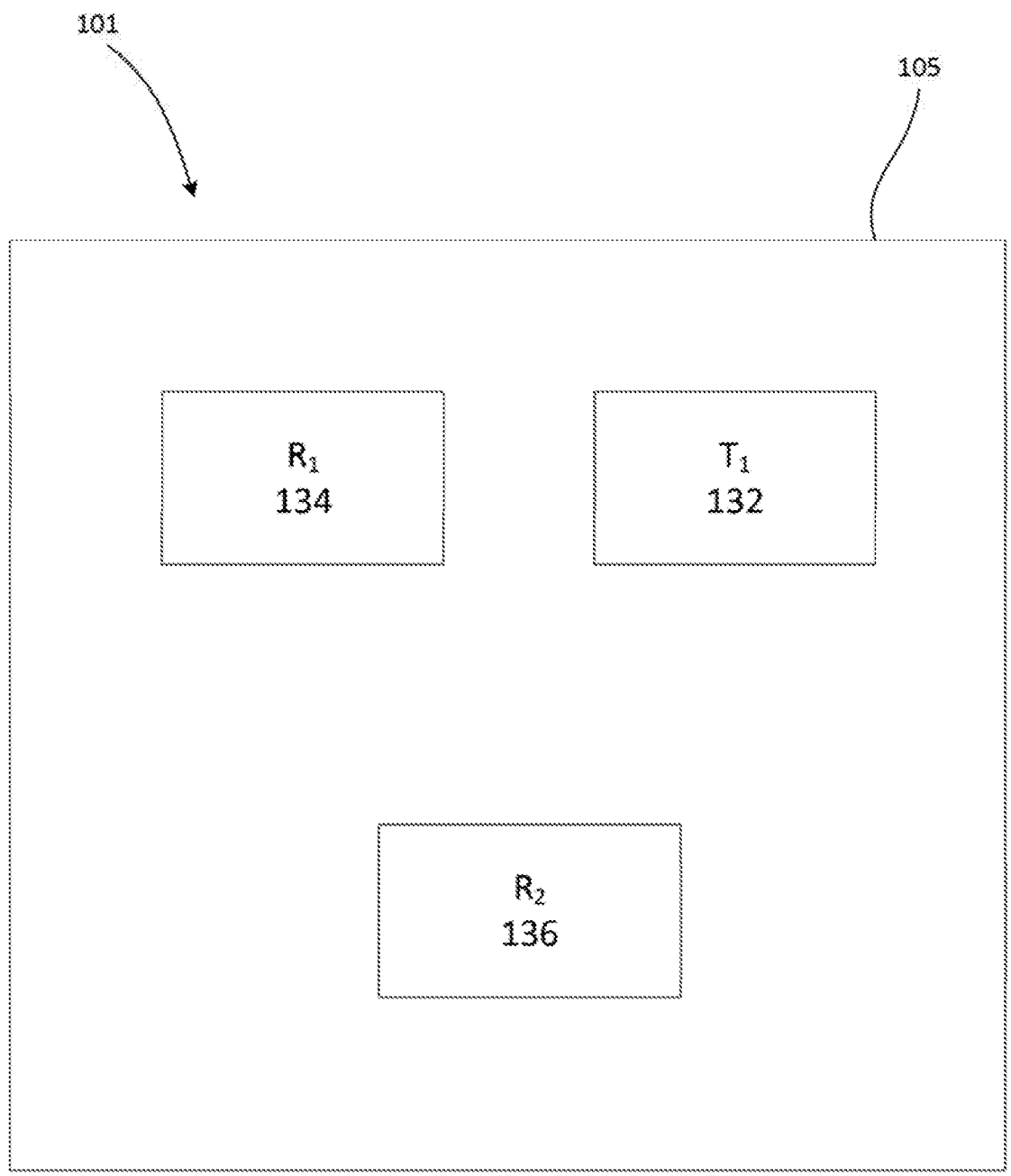
FIG. 1A illustrates an example of a wireless topology of a lighting system with a single transmitter and multiple receivers.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Although there have been suggestions to control lighting based on RF wireless counting results, prior RF-based counting systems have not themselves been integrated as part of a lighting system of which the lighting operation is controlled as a function of the count. Also, prior RF-based counting systems have not themselves been integrated as part of machine learning (ML) in a lighting system of which the lighting operation are controlled as a function of the count.

There is also room for improvement in the RF wireless counting algorithms for lighting system control. For example, a ML algorithm in the lighting system may enable a more rapid and real time response so that an occupant entering a previously empty area perceives that the system instantly turns ON the light(s) in the area. As another example, the ML algorithm may offer improved counting accuracy, e.g. to reduce false positives in determining a number of occupants in the area.

Also, there is a need to manage the area based on the occupant count. other control and manage functions in the area such as heating, ventilation and air conditioning (HVAC), heat mapping, smoke control, equipment control, security control, etc. instead of or in addition to lighting control.

Further, there is room for improvement for accurate determination of a number of the occupant(s) in a region among multiple different regions of the area. False positives may occur when detecting number of occupant (s) in a specific region or sub-area when multiple transmitters are transmitting the RF signals from multiple different regions of the area. For example, a ML algorithm may offer improved occupancy count accuracy, e.g. to reduce false positives in determining the number of occupant(s) in the actual sub-area of interest in the facility.

The examples described below and shown in the drawings integrate RF wireless based occupancy count capabilities in one or more lighting devices or into lighting devices and/or other elements forming a lighting system. Examples of an occupancy count system address some or all of the concerns noted above regarding rapid real time detection of changes in occupancy count and/or improved count performance, such as reduction or even elimination of false positive of occupancy count. These advantages and possibly other advantages may be more readily apparent from the detailed description below and illustration of aspects of the examples in the drawings.

Referring to FIG. 1A, an example of a wireless topology 101 of a lighting element, which includes a single wireless communication transmitter (Tx) and a number of wireless communication receivers (Rx) in physical space/area 105. In one implementation, an indoor environment is described, but it should be readily apparent that the systems and methods described herein are operable in external environments as well. Specifically, in this example, the area 105 is a room. In one implementation, although, not shown, the area 105 may also include corridors, additional rooms, hallways etc.

As illustrated in the example in FIG. 1A, the area 105 includes three intelligent system nodes 132, 134, 136. Each such system node has an intelligence capability to transmit a signal or receive a signal and process data. In one example, at least one system node includes a light source and is configured as a lighting device or luminaire. In another example, a system node includes a user interface component and is configured as a lighting controller. In another example a system node includes a switchable power connector and is configured as a plug load controller. In a further example, a system node includes detector as well as related circuitry and is configured as a lighting related sensor.

System node 132 includes a transmitter T1 and system nodes 134 and 136 include receivers R1 and R2 respectively. In one implementation, occupancy count in the area 105 is detected according to an occupancy counting procedure as will be described below with respect to FIGS. 2A, 2B and 2C below.

In the wireless topology 101, the T1 in the area 105 transmits a RF spectrum (RF) signal for some number (plurality >1) of times. The transmission may be specifically for the occupancy count, although the present teachings also apply to implementations using the RF wireless transmissions for other purposes, such as system network communications (as discussed later regarding other examples). Each of the receivers R1-R2 receives the transmissions of the RF signal through the area 105 for each of the plurality of times from T1. Accordingly, each of the R1 and R2 is configured to detect a metric of the received RF, which the system (e.g. at one or more of the nodes or another processor in communication with the receivers) uses to determine occupancy count based on the RF spectrum (RF) signals received from the T1 in the area 105.

Figure 1B:
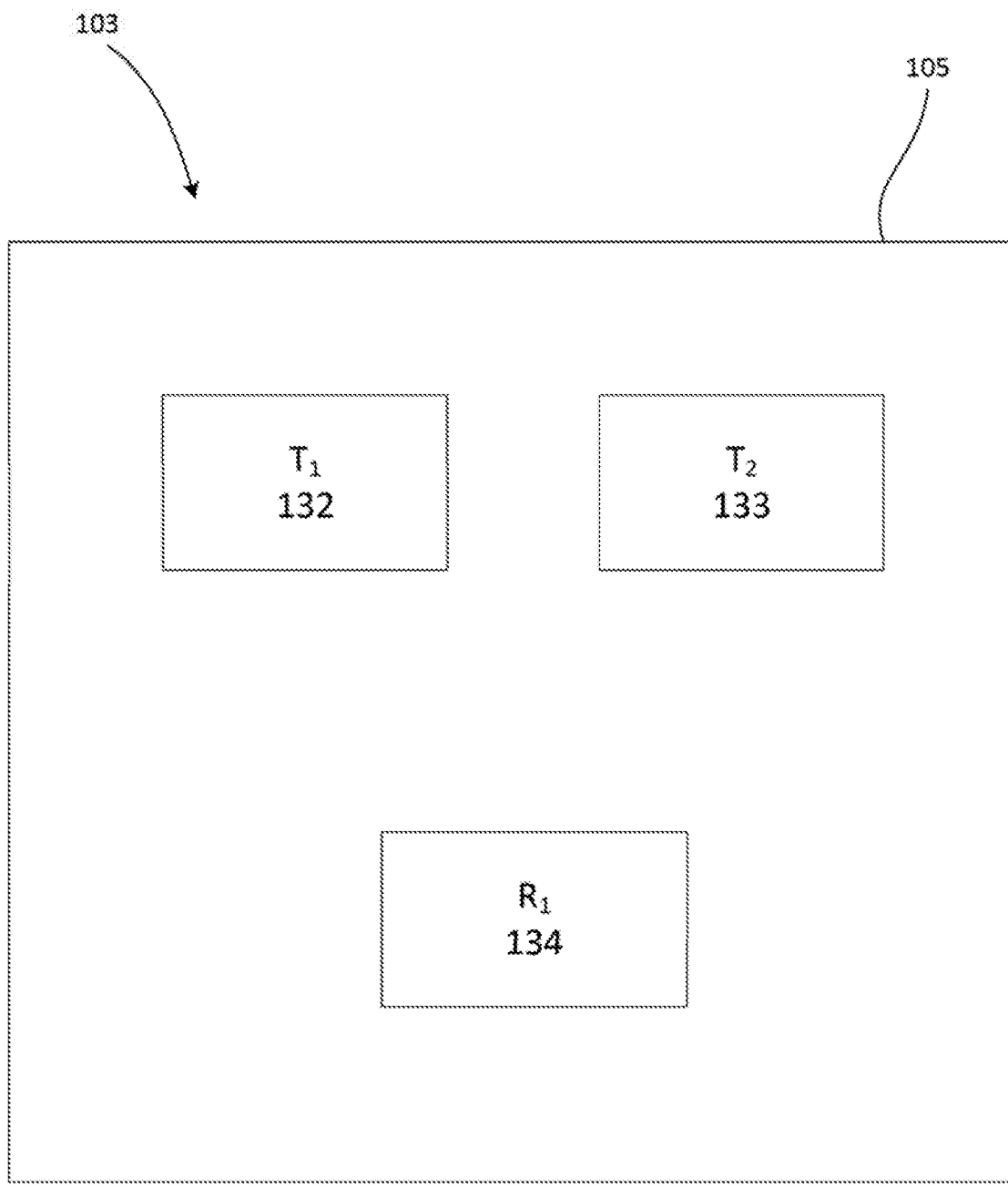
FIG. 1B illustrates an example of a wireless topology of a lighting system with a single receiver and multiple transmitters.
Figure 2A:
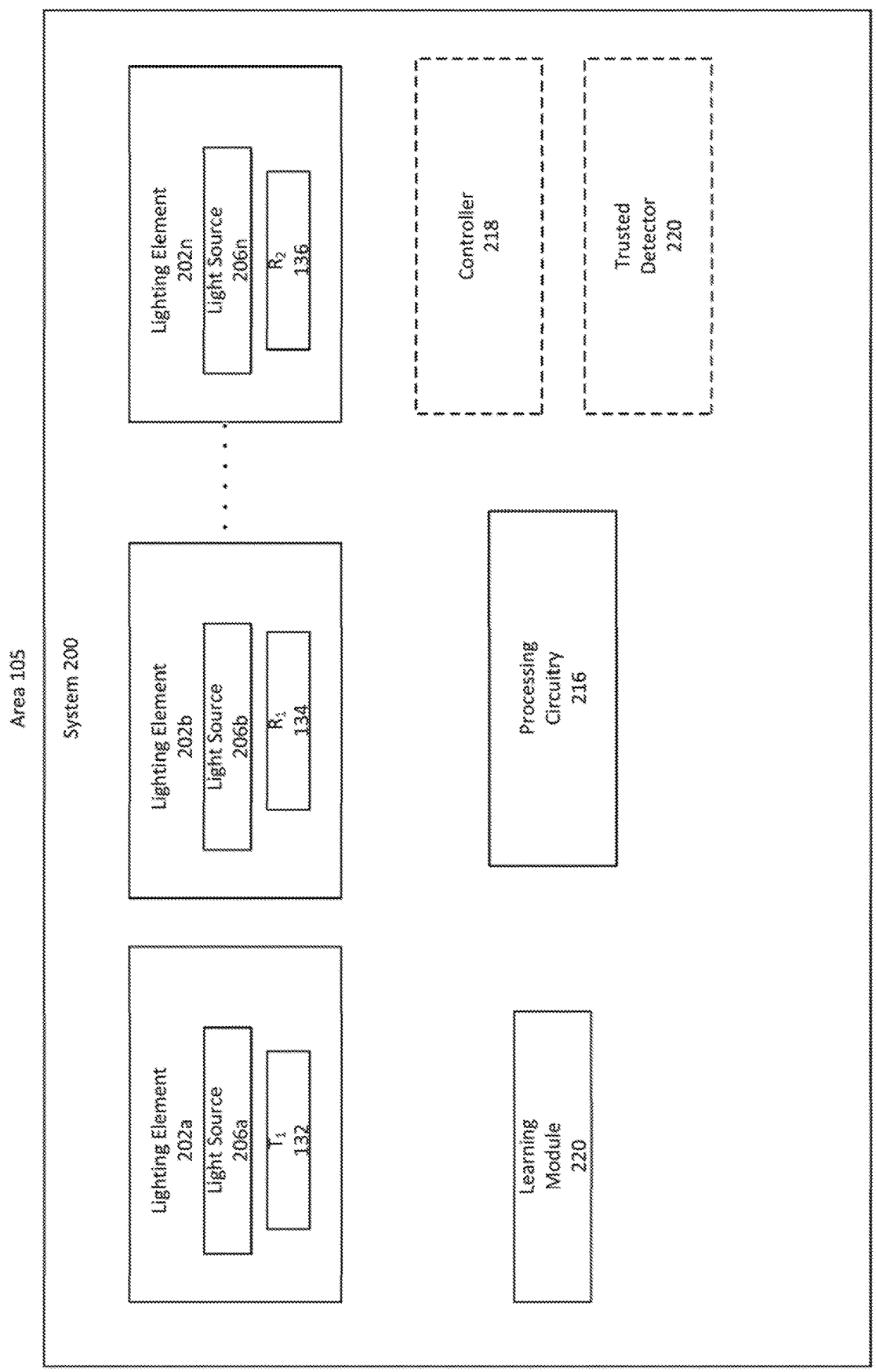
FIG. 2A is a functional block diagram illustrating an example of an occupancy count system based on the wireless topology of FIG. 1A.

Referring to FIG. 2A, there is shown a functional block diagram of an example of an occupancy counting system (system) 200 configured to function on a radio frequency (RF) wireless communication network. As illustrated, the occupancy counting system 200 includes a plurality of lighting elements 202a-202n disposed within the physical space/area 105 such as a room, corridor, etc. as described above with respect to FIG. 1. In one implementation, an indoor environment is described, but it should be readily apparent that the systems and methods described herein are operable in external environments as well.

In one implementation, the system 200 includes the three intelligent system nodes 132, 134 and 136 as described with respect to FIG. 1A above. As discussed above, each such system node has an intelligence capability to transmit and receive data and process the data. Each system node, for example, may include a receiver (R) and/or a transmitter (T) along with another component used in lighting operations. In one example, a system node includes a light source and is configured as a lighting device. In another example, a system node includes a user interface component and is configured as a lighting controller. In another example the system node includes a switchable power connector and is configured as a plug load controller. In a further example, a system node includes a detector as well as related circuitry and is configured as a lighting related sensor.

The system node 132 includes a T1, and each of the system nodes 134 and 136 includes a R1 and R2 respectively. In the implementation shown in FIG. 2A, each of the system nodes 132, 134 and 136 is integrated in one of the lighting elements 202a-202n such that the system node 132 is integrated in the lighting element 202a, the system node 134 is integrated in the lighting element 202b and the system node 136 is integrated in the lighting element 202. Even though the system nodes 132, 134 and 136 are shown to be integrated in the lighting elements 202a, 202b and 202n respectively, it should be apparent that the system nodes 132, 134 and 136 are integrated in different lighting devices among the lighting devices 202a-202n. In another alternate implementation, two or more of the system nodes 132, 134 and 136 may be integrated in the same lighting element. For example, the system node 132 and the system node 134 may both be incorporated in the lighting element 202a; or in another example, the system node 134 and the system node 136 may both be incorporated in the lighting element 202b.

As described above, the Tx is configured to transmit RF signals and each of the Rx is configured to receive signals from the Tx. In one implementation, each of the lighting elements 202a-202n includes a light source 206, and is configured as a luminaire, for example, may take the form of a lamp, light fixture, or other luminaire that incorporates the light source, where the light source by itself contains no intelligence or communication capability, such as one or more LEDs or the like, or a lamp (e.g. "regular light bulbs") of any suitable type. The light source 206 is configured to illuminate some or all of the area 105. In one example, each of some number of individual light sources 206 is configured to illuminate a portions or a regions of the area 105. Typically, a system will include one or more other system nodes, such as a wall switch, a plug load controller, or a sensor.

In one implementation, the system 200 includes processing circuitry 216 coupled to the receivers R1 and R2. In one implementation, the processing circuitry is coupled to one or more of the lighting elements 202a-202n. In an alternate implementation, the processing circuitry 216 is coupled to the system 200 via a network (not shown). In one implementation, the processing circuitry 216 is implemented in a processor executing software or firmware configured to determine occupancy count in the area 105, although other circuitry or processor-based implementations may be used. In one implementation, the processing circuitry 216 is implemented in firmware of a processor in the R1 node and/or in the R2 node.

In one implementation, the system 208 includes a controller 218 coupled to the processing circuitry 216. In one implementation the controller 218 may be the same or an additional processor configured to control operations of elements in the system 200 in response to determination of occupancy count in the area 105. For example, in an alternate implementation, the controller 218 is configured to process a signal to control operation of one or more light sources 206a-206n. In one alternate implementation, the controller 218 is configured to turn ON one or more light sources 206a-206n upon the occupancy count of one or more determined by the processing circuitry 216. In one implementation, the controller 218 is configured to turn OFF one or more light sources 206a-206n upon the occupancy count of zero determined by the processing circuitry 216. In another implementation, upon the occupancy count in the area 105, the controller 218 may be configured to provide other control and management functions in the area such as heating, ventilation and air conditioning (HVAC), heat mapping, smoke control, equipment control, security control, etc. instead of or in addition to control of the light source(s).

Accordingly, the system 200 is configured to function on the RF wireless communications network in accordance with an implementation of a local control of light source(s) in the lighting element(s), as well as other automation control of energy, equipment, operational and management, as discussed above, of the area.

In yet another implementation, the controller 218 communicates the occupancy count to the lighting network via a data packet. The data packet is received by one or more luminaires in the lighting network, which are configured to turn ON or OFF the light source(s) 206 based on the occupancy count provided in the data packet. The luminaire or another node on the lighting network may receive the packet and respond to provide automation of other energy control, equipment control, operational control and management systems (e.g. HVAC, heat mapping, smoke control, equipment control and security control) in the area. Accordingly, the system 200 communicates the occupancy count with other networks. In another alternate implementation, the controller 218 is coupled to the system 200 via a network (not shown). Accordingly, the system 200 is configured to function on the RF wireless communication network in accordance with an implementation of a global control of light source(s), as well as other automation control of energy, equipment, operational and management, as discussed above, of the area in lighting element(s).

In one implementation, the system nodes typically include a processor, memory and programming (executable instructions in the form of software and/or firmware). Although the processor may be a separate circuitry (e.g. a microprocessor), in many cases, it is feasible to utilize the central processing unit (CPU) and associated memory of a micro-control unit (MCU) integrated together with a transceiver in the form of a system on a chip (SOC). Such an SOC can implement the wireless communication functions as well as the intelligence (e.g. including any processing or controller capabilities) of the system node.

In examples discussed in more detail later, system nodes often may include both a transmitter and a receiver (sometimes referenced together as a transceiver), for various purposes. At times, such a transceiver-equipped node may use its transmitter as part of an occupancy counting operation; and at other times such a transceiver-equipped node may use its receiver as part of an occupancy counting operation. Such transceiver equipped nodes also typically include a processor, memory and programming (executable instructions in the form of software and/or firmware). Although the processor may be a separate circuitry (e.g. a microprocessor), in many cases, it is feasible to utilize the central processing unit (CPU) and associated memory of a micro-control unit (MCU) integrated together with physical circuitry of a transceiver in the form of a system on a chip (SOC). Such an SOC can implement the wireless communication functions as well as the intelligence (e.g. including any processing or controller capabilities) of the system node.

Although the system nodes 132, 134 and 136 of FIG. 2A illustrate an implementation of a single Tx and a single Rx in each of the nodes, the system 200 may include other implementations such as multiple Txs in one or more nodes. Also, FIG. 2A illustrates the implementation of a single Rx in each of the nodes, the system 200 may include other implementations such as multiple Rxs in one or more nodes. In the illustrated implementation, the system 200 includes multiple lighting elements 206a-206n with either the Tx or the Rx, however, the multiple lighting elements 206a-206n of the system 200 may include one or more Txs and one or more Rxs (see FIG. 7).

For discussion of an initial example of a RF-based occupancy counting operation, assume that the system 200 includes just the elements shown in FIG. 2A. In one example, each of the system nodes 132, 134 and 136 includes the capabilities to communicate over two different RF bands, although the concepts discussed herein are applicable to devices that communicate with luminaires and other system elements via a single RF band. Hence, in the dual band example, the Tx/Rx may be configured for sending and receiving various types of data signals over one band, e.g. for the RF transmission and reception leading to occupancy counting. The other band may be used or for pairing and commissioning messages over another band and/or for communications related to detection of RF or higher level occupancy counting functions, e.g. between receivers R1 and R2 and the controller 220 or the processing circuitry 216. For example, the Tx and Rx are configured as a 900 MHz transmitter and receiver for communication of a variety of system or user data, including lighting control data, for example, commands to turn lights ON/OFF, dim up/down, set scene (e.g., a predetermined light setting), and sensor trip events. Alternatively, the Tx and Rx may be configured as a 2.4 GHz transmitter and receiver for Bluetooth low energy (BLE) communication of various messages related to commissioning and maintenance of a wireless lighting system and/or to communicate results of processing functions in relation to occupant counting.

In one implementation, benefits of the system include the ability to take advantage of Tx and the Rx (e.g. Tx and RF Rx) already installed in a location in the area 105, and because the system passively monitors signal broadcasts in the area 105 at a plurality of times, the occupancy counting functionality does not require (does not on) the occupants to carry any device.

At a high level, the T1 transmits a RF spectrum (RF) signal at a plurality of times. The transmission may be specifically for the occupancy counting. In some cases, however, where the transmitter is in another lighting device or other lighting system element (e.g. a sensor or a wall switch), the transmissions maybe regular lighting related communications, such as reporting status, sending commands, reporting sensed events, etc. Each of the R1-R2 receives the transmissions of the RF signal from the T1 through the area 105 during each of the plurality of times. Each of the R1-R2 generates an indicator data of one or more characteristics of the received RF signal at each of the plurality of times. Some of examples of the characteristics include but are not limited to received signal strength indicator (RSSI) data, bit error rate, packet error rate, phase change etc. or a combination of two or more thereof. The RSSI data represents measurements of signal strength of the received RF. The bit error rate is rate of incorrect bits in received RF signals versus total number of bits in the transmitted RF signals. The packet error rate is rate of incorrect packets in received RF signals versus total number of packets the transmitted RF signals. Phase change is a change of phase of a received RF signal compared to previous reception of the RF signal (typically measured between the antennas spaced apart from each other). For the purposes of the present description, we use RSSI data as the characteristics of the RF signals for processing by the R1-R2 receivers to generate as the indicator data. Each of the R1-R2 measures the signal strength of the RF signal received from transmitter T1 and generates the RSSI data based on the signal strength. The signal strength of each of the RF signal varies over time based whether an occupant exists or there are a number of occupants (plural) in each path between the T1 and R1 or R2 in the area 105.

For each time, each of the receivers R1-R2 supplies the generated indicator data of one or more characteristics of the received RF signal to the processing circuitry 216. In one implementation using RSSI as the characteristic of interest, the processing circuitry 216 obtains the generated RSSI data at each of the plurality of times from the various receivers R1-R2 and processes the RSSI data to determine occupancy count in the area 105.

In one implementation, the processing circuitry 216 processes the generated RSSI data utilizing a RF signal computation to determine occupancy count in the area 105 in real time. In one implementation, the RF signal is a line-of-sight (LOS) signal and blocking occurs when at least one occupant crosses the path between one of the R1 134 and/or the R2 136 and the T1 132 in the area 105 or is located directly (or close enough) between the one of the R1 134 and/or the R2 136 and the T1 132 (i.e., along the so-called line-of-sight path between the receiver and the transmitter). Similarly, LOS blockage also describes multiple simultaneous occupant crossings or multiple occupants located on the LOS path. LOS blocking causes a measurable decrease in the amplitude or strength of the RF signal received by the R1 134 and/or R2 136 for the duration of time the occupant remains in a blocking position.

In another implementation using RSSI, the received RF signal includes a multi-path signal which is generated based on a multi-path (MP) scattering/fading. In such an implementation, occupant(s) impact the receive signal as a result of changes they cause in the multi-path (MP) scattering/fading. The MP scattering does not require occupants to be located along a LOS path. Although MP scattering may not decrease the amplitude/signal strength as dramatically as LOS blocking, MP scattering results in a decrease in amplitude/signal strength that is related to the number of occupants located in the area 105.

In a further implementation, the RF signal reception and associated RSSI measurements and processing thereof are based on both the LOS blockage and the MP scattering.

In one implementation, the RF signal computation generates theoretical or mathematical models that provide for a pre-determined number of occupants in the area 105 at a time prior to the real time. The theoretical model describes RSSI data or a function of the RSSI data of the RF signals received from the transmitter by the various receivers as they relate to various numbers of possible occupants. Theoretical models may take into account one or more ways in which occupants impact the received signal. For example, modeling may include mathematical modeling of the LOS blocking as a function of potential number of occupants, mathematical modeling of the multi-path (MP) scattering/fading as a function of potential number of people, or a combination of both LOS/MP analysis. In one example, mathematical modeling or LOS, MP or LOS/MP may involve deriving an expression for the probability density function (PDF), probability mass function (PMF), or other statistical or probabilistic function as they relate to various numbers of occupants. In other examples, mathematical analysis can involve other spatio-temporal analysis (mathematical analysis of multiple links over space and time) or other probabilistic spatio-temporal analysis (probabilistic analysis of multiple links over space and time) of the RSSI data. In some examples, the analysis makes use of modeling occupant behavior within the area. In one example, for instance, the speed or average speed of occupants may be assumed and used in the mathematical modeling. In another example, any knowledge of spatial preferences or popular areas can be used in the mathematical modeling. Theoretical models generated are stored, for example in a memory unit (not shown) and subsequently compared to the generated RSSI data for occupancy count in the real time.

In one implementation, the processing circuitry 216 compares the generated RSSI data from the plurality of receivers in real time with thresholds or the like produced by the mathematical model. More particularly, in one implementation, the processing circuitry 216 analyzes the generated RSSI data to derive a probability density function (PDF) or probability mass function (PMF) representation of the generated RSSI data that can be compared with the statistical or probabilistic functions derived for the theoretical models as described above. In one implementation, the processing circuitry 216 determines a best match between the PDF/PMF representation of the generated RSSI data in real time and the theoretical or modeled attributes (or functions of the modeled attributes). A variety of methods may be utilized to find the best match or fit between the function describing the RSSI data generated in real time and the function describing the theoretical (modeled) attributes, such as Kullback-Leibler (KL) divergence.

In another implementation, the processing circuitry 216 processes the generated RSSI data utilizing a heuristic algorithm to determine an occupancy count in the area 105. The processing circuitry applies the heuristic algorithm to the indicator data of the RF signals from each of the plurality of receivers to compute an output metric value for each of a plurality of probable number of occupants in the area. The processing circuitry 216 also compares each one of the plurality of computed output metric values with another one of the plurality of computed output metric values to identify one of the plurality of computed output metric values as having a largest value and indicates that the probable number of occupants associated with the computed metric value having the largest value is the current estimate of the occupancy count in the area 105. Details of the utilizing of the heuristic algorithm are provided herein below.

In one implementation that takes advantage of the machine learning (ML) capability of the heurist algorithm, the system 200 includes a trusted detector 230, which provides a known occupancy count value (similar to the "known answer" as discussed above). Input from the trusted detector 230 enables the processor or the like running the heuristic algorithm to "learn" which outcomes are accurate versus outcomes that are not accurate, so as to improve performance. The trusted detector 230 in the example may be a standard occupancy sensor, such as passive infrared occupancy detector, a high resolution camera, low resolution (pixel) camera, a camera based occupancy counting system, ultra-wide band (UWB) radar other radar systems, or sonar systems. Specifically, the trusted detector 230 provides a known occupancy count value for an accurate occupancy count in the area 105 at each of the multiple times. In one implementation, the known occupancy count value is predetermined prior to heuristically determining the occupancy count in the area 105.

In one implementation, the processing circuitry 216 obtains the indicator data of the RF signal generated for multiple times (ta-tn) from each of the R1 and R2. The processing circuitry 216 applies one of a heuristic algorithm heuristic algorithm coefficient heuristic algorithm coefficient among a set of heuristic algorithm heuristic algorithm coefficients to each of the indicator data from each of the R1 and R2 to generate an indicator data metric value for each of the indicator data from each of the R1 and R2 for the times ta-tn.

Each heuristic algorithm heuristic algorithm coefficient among the set of heuristic algorithm heuristic algorithm coefficients may be randomly selected at an initial stage of training. In one implementation, a heuristic algorithm heuristic algorithm coefficient is a variable. In one implementation, a value of the heuristic algorithm heuristic algorithm coefficient applied to an indicator data from R1 is the same as the value of the heuristic algorithm heuristic algorithm coefficient applied to another indicator data that is from R2. In another implementation, a value of a first heuristic algorithm heuristic algorithm coefficient applied to an indicator data from the R1 is different from value of another (second) heuristic algorithm heuristic algorithm coefficient applied to another indicator data from R2. In one implementation, the processing circuitry 216 processes the indicator data metric values to compute metric values associated with each of the R1 and R2 at each of the times ta-tn. The metric values provide a measurement of each of a plurality of a probable or possible number of occupants in the area for each of the times ta-tn. Some examples of the measurements may include but not limited to percentage, decimal, ratio, rates etc. In one implementation, the processing circuitry 216 combines/adds the metric values associated with R1 with metric values associated with R2 to compute an output metric value for each of the plurality of probable number of occupants in the area for each of the times ta-tn. In one implementation, the processing circuitry 216 compares each of the plurality of output metric values with one another to determine which of the plurality of output metric values has the highest value. The processing circuitry 216 determines that the probable number of occupants in the area with the largest output metric value as the occupancy count in the area for each of the times ta-tn. In one implementation, the processing circuitry 216 compares the occupancy count in the area with the known occupancy count value generated by the trusted detector for each of the ta-tn. Specifically, the processing circuitry 216 compares the occupancy count in the area at each of the ta-tn with the known occupancy count value, for example, an output of the trusted detector 230, to determine an accurate occupancy count in the area as described in greater detail below. In one implementation, the system 202 includes a learning module 220 coupled to the processing circuitry 216 to determine whether the set of heuristic algorithm coefficients are optimized heuristic algorithm coefficients based on the comparison by the processing circuitry 216 at the times ta-tn to detect an accurate occupancy count in the area. In one implementation, upon determination, that the set of heuristic algorithm coefficients are optimized heuristic algorithm coefficients, the learning module 220 instructs the processing circuitry 216 to utilize the optimized heuristic algorithm coefficients in real time. In one implementation, upon determination, that the set of heuristic algorithm coefficients are not optimized heuristic algorithm coefficients, the learning module 220 instructs the processing circuitry 216 to update one or more heuristic algorithm coefficients among the set of heuristic algorithm coefficients and utilize the updated one or more heuristic algorithm coefficients in a next time. The above implementations are described in greater detail below.

In one implementation, the processing circuitry 216 determines that the occupancy count at a time t1 among the times ta-tn is same as the known occupancy count value. In one implementation, the learning module 220 determines, that the set of heuristic algorithm coefficients are determined to be optimized heuristic algorithm coefficients to be applied to the indicator data for the time t1 to determine the accurate occupancy count. In one implementation, the learning module 220 instructs the processing circuitry 216 to utilize the optimized heuristic algorithm coefficients to apply to each indicator data among the plurality of indicator data from each of the plurality of receivers for the time t1 to detect the occupancy count in real time. Accordingly, the processing circuitry 216 applies the optimized heuristic algorithm coefficients to determine the occupancy count in real time.

In another implementation, the processing circuitry 216 determines that the occupancy count at a time t1 among the times ta-tn is different than the known occupancy count value. The learning module 220 determines that the set of heuristic algorithm coefficients are not optimized heuristic algorithm coefficients and thus updates the one or more heuristic algorithm coefficients among the set of the heuristic algorithm coefficients to generate updated set of heuristic algorithm coefficients. The learning module 220 instructs the processing circuitry 216 to utilize the updated set of heuristic algorithm coefficients in a next time. The processing circuitry 216 applies the updated heuristic algorithm coefficients to corresponding indicator data from each of the R1 and R2 to generate an updated indicator data metric value for each of the indicator data from each of the R1 and R2 at the time t1. In one implementation, the processing circuitry 216 processes each of the updated indicator data metric values to compute updated occupancy count at t1. In one implementation, the processing circuitry 216 determines that the updated occupancy count at the time t1 is the same as the known occupancy count value. As such, the learning module 220 determines that the updated set of heuristic algorithm coefficients are optimized heuristic algorithm coefficients to be applied to the indicator data for the time t1 to determine the accurate occupancy count in real time. In another implementation, the processing circuitry 216 determines that the updated occupancy count is different than the known occupancy count value. The processing circuitry 216 and the learning module 220 repeats the above process for t1 until the occupancy count is same as the known occupancy count value to determine that the set of heuristic algorithm coefficients corresponding to the indicator data from each of the R1 and R2 are the optimized heuristic algorithm coefficients for the t1 among the ta-tn to accurately determine the occupancy count at real time. Accordingly, the processing circuitry 216 applies the optimized heuristic algorithm coefficients to determine the occupancy count in real time.

In one implementation, the occupancy count is determined for each of the indicator data at each of the ta-tn and compared with the known occupancy count value to determine the optimized heuristic algorithm coefficients for each of the ta-tn to detect an accurate occupancy count in the area 105 of FIG. 1A at each of the ta-tn. In one implementation, the optimized set of heuristic algorithm coefficients for each of the ta-tn are utilized by the processing circuitry 216 to detect accurate occupancy count in the area 105 of FIG. 1A at real time.

Figure 2B:
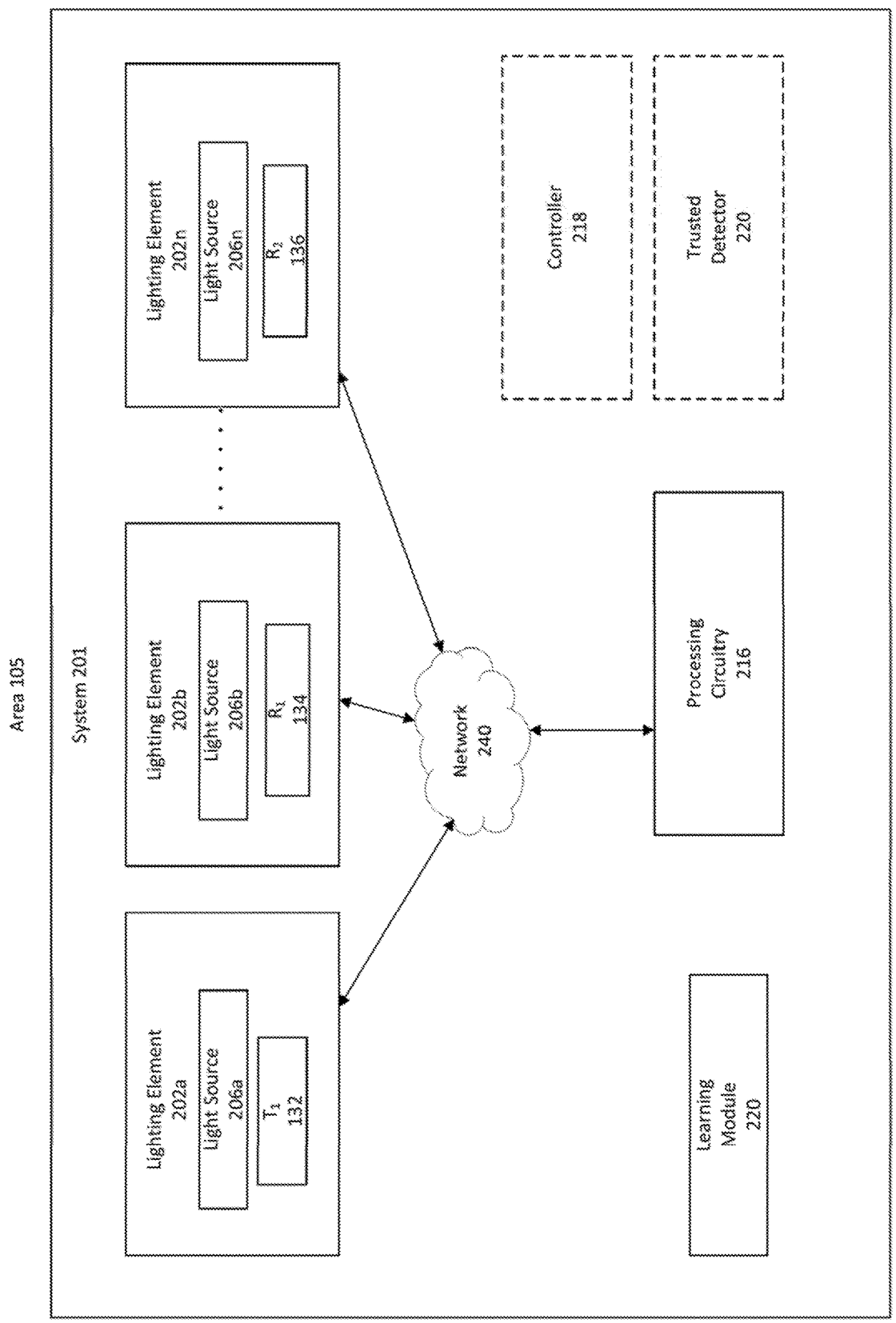
FIG. 2B is a functional block diagram illustrating another example of an occupancy count system based on the wireless topology of FIG. 1A.

Referring to FIG. 2B, there is shown a functional block diagram of an example of an occupancy counting system (system) 201 configured to function on a radio frequency (RF) wireless communication network. In one implementation, the system 201 is similar to the system 200 of FIG. 2A except the processing circuitry 216 is coupled to the one or more of the lighting elements via a network 240. In one implementation, the network 240 is a wireless communication network. In one example, the network 240 is a BLE mesh. In one implementation, the network 240 is a wired network. In one implementation, the processing circuitry 216 is a cloud computing system which includes a plurality of processing servers/machines, which work together or independently to process the indicator data to determine the occupancy count in the area 105. In an alternate implementation, the controller 218 is coupled to the processing circuitry 216 via the network 240. In such alternate implementation, the controller 218 is a cloud computing system which includes a plurality of processing servers/machines, which work together or independently to control operations of one or more elements (e.g. light source 206a-206n) of the lighting elements 202a-202n and/or provide automation of other energy control, equipment control, operational control and management systems (e.g. HVAC, heat mapping, smoke control, equipment control and security control) in the area based on determination of the occupancy count by the processing circuitry 216. Accordingly, implementation of the system 201 is configured to globally control the light source(s) of the lighting element(s), as well as other automation control of energy, equipment, operational and management, as discussed above, of the area in the lighting system.

Figure 2C:
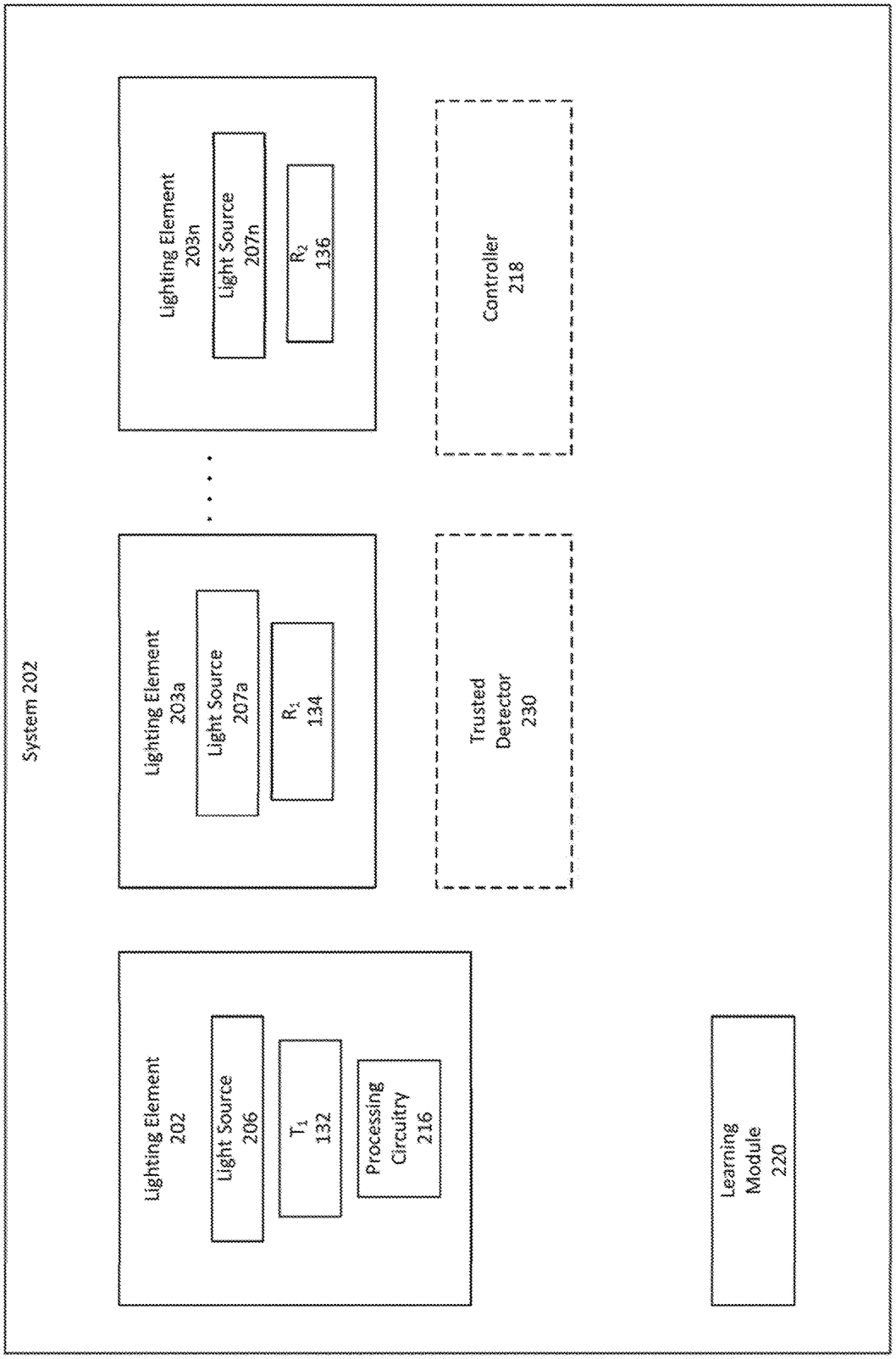
FIG. 2C is a functional block diagram illustrating a further example of an occupancy count system based on the wireless topology of FIG. 1A.

Referring to FIG. 2C, there is shown a functional block diagram of an example of an occupancy counting system (system) 202 configured to function on a radio frequency (RF) wireless communication network. In one implementation, the system 202 is similar to the system 200 of FIG. 2A except the processing circuitry 216 is integrated in a lighting element 202. The processing circuitry 216 functions to process the indicator data to determine the occupancy count in the area 105 as discussed in detail above. The system 202 also includes plurality of lighting elements 202a-202n including the lighting element 202. Although, not illustrated, in an alternate implementation, the processing circuitry 216 is integrated in one of the plurality of lighting elements 202a-202n. Each of the plurality of lighting elements includes a corresponding light source among a plurality of light sources 202a-202n.

Referring to FIG. 1B, an example of a wireless topology 103 of a lighting system includes a single wireless communication receiver (Rx) and a number of wireless communication transmitters (TXs) in physical space/area 105. In one implementation, an indoor environment is described, but it should be readily apparent that the systems and methods described herein are operable in external environments as well. Specifically, in this example, the area 105 is a room. In one implementation, although not shown, the area 105 may also include corridors, additional rooms, hallways etc. As illustrated in the example in FIG. 1B, the area 105 includes three intelligent system nodes, out of which two are Tx 132, and Tx 133, and one is the Rx 136. As discussed above, each such system node has an intelligence capability to transmit a signal or receive a signal and process data. In one example, at least one system node includes a light source and is configured as a lighting device or luminaire. In another example, a system node includes a user interface component and is configured as a lighting controller. In another example a system node includes a switchable power connector and is configured as a plug load controller. In a further example, a system node includes detector as well as related circuitry and is configured as a lighting related sensor. In one implementation, occupancy count in the area 105 is detected according to an occupancy counting procedure as will be described below with respect to FIGS. 2D, 2E and 2F below.

In the wireless topology 103, the T1 and T2 in the area 105 transmits a RF spectrum (RF) signal for some number (plurality >1) of times. The transmission may be specifically for the occupancy count, although the present teachings also apply to implementations using the RF wireless transmissions for other purposes, such as system network communications (as discussed later regarding other examples). The R1 receives the transmissions of the RF signals through the area 105 for each of the plurality of times from T1 and T2. Accordingly, the R1 is configured to detect a metric of the received RF, which the system (e.g. at one or more of the nodes or another processor in communication with the receivers) uses to determine occupancy count based on the RF signals received from the T1 and the T2 in the area 105.

Figure 2D:
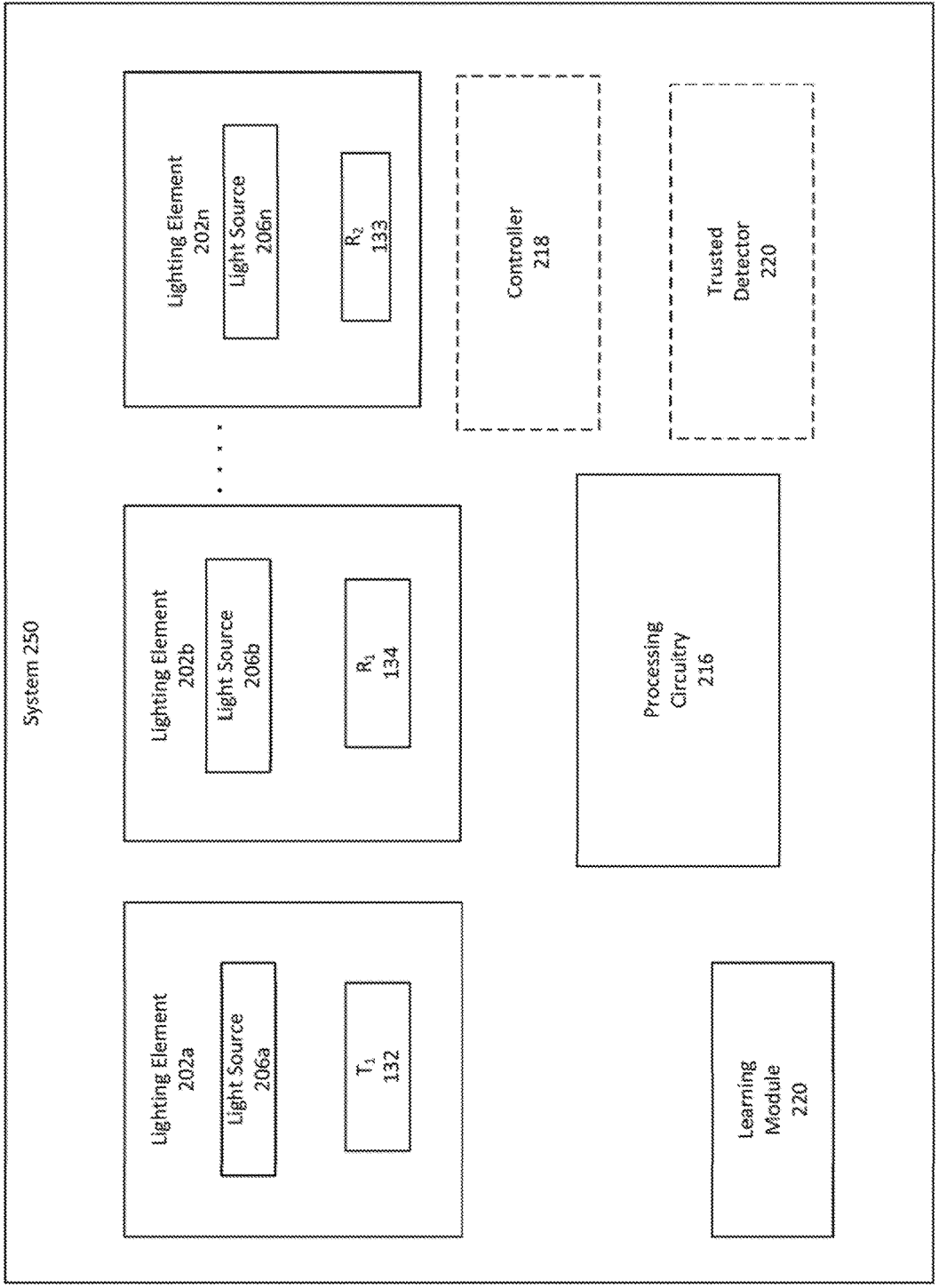
FIG. 2D is a functional block diagram illustrating another example of an occupancy count system based on the wireless topology of FIG. 1B.

Referring to FIG. 2D, there is shown a functional block diagram of an example of an occupancy counting system (system) 250 configured to function on a radio frequency (RF) wireless communication network. As illustrated, the occupancy counting system 250 includes a plurality of lighting elements 202a-202n disposed within the physical space/area 105 such as a room, corridor, etc. as described above with respect to FIG. 1B. In one implementation, an indoor environment is described, but it should be readily apparent that the systems and methods described herein are operable in external environments as well.

In one implementation, the system 250 includes the three intelligent system nodes, as described with respect to FIG. 1B above. As discussed above, each such system node has an intelligence capability to transmit and receive data and process the data. Each system node, for example, may include a receiver (R) and/or a transmitter (T) along with another component used in lighting operations. In one example, a system node includes a light source and is configured as a lighting device. In another example, a system node includes a user interface component and is configured as a lighting controller. In another example the system node includes a switchable power connector and is configured as a plug load controller. In a further example, a system node includes a detector as well as related circuitry and is configured as a lighting related sensor. The system node 134 includes a R1, and each of the system nodes 132 and 133 includes a T1 or T2 respectively. In the implementation shown in FIG. 2D, each of the system nodes 132, 134 and 136 is integrated in one of the lighting elements 202a-202n. Even though, the system nodes 132, 134 and 136 are shown to be integrated in the lighting elements 202a, 202b and 202n respectively, it should be apparent that the system nodes 132, 134 and 136 are integrated in different lighting elements among the lighting elements 202a-202n. In another alternate implementation, two or more of the system nodes 132, 134 and 136 may be integrated in the same lighting element. For example, the system node 132 and the system node 134 may both be incorporated in the lighting element 202a or in another example, the system node 134 and the system node 136 may both be incorporated in the lighting element 202b.

As described above, each of the Tx is configured to transmit RF spectrum (RF) signals and the Rx is configured to receive signals from each of the Tx. Similar to the system 200 in FIG. 2A, each of the lighting elements 202a-202n in the system 250 of FIG. 2D also includes a light source 206, and is configured as a luminaire, for example, may take the form of a lamp, light fixture, or other luminaire that incorporates the light source, where the light source by itself contains no intelligence or communication capability, such as one or more LEDs or the like, or a lamp (e.g. "regular light bulbs") of any suitable type. The light source 206 is configured to illuminate some or all of the area 105. In one example, each of some number of individual light sources 206 is configured to illuminate a portions or a regions of the area 105. Typically, a system will include one or more other system nodes, such as a wall switch, a plug load controller, or a sensor.

The system 250 also includes processing circuitry 216. The processing circuitry 216 is coupled to the receivers R1. In one implementation, the processing circuitry is coupled to one or more of the lighting elements 202a-202n. In an alternate implementation, the processing circuitry 216 is coupled to the system 200 via a network (not shown). In one implementation, the processing circuitry 216 is implemented in a processor executing software or firmware configured to determine occupancy count in the area 105, although other circuitry or processor-based implementations may be used. Similar to the system 200 in FIG. 2A, the system 250 in FIG. 2D also includes a controller 218 coupled to the processing circuitry 216. In one implementation the controller 218 may be the same or an additional processor configured to control operations of elements in the system 250 in response to determination of occupancy count in the area 105. For example, in an alternate implementation, the controller 218 is configured to process a signal to control operation of one or more light sources 206a-206n. In one alternate implementation, the controller 218 is configured to turn ON one or more light sources 206a-206n upon the occupancy count of one or more determined by the processing circuitry 216. In one implementation, the controller 218 is configured to turn OFF one or more light sources 206a-206n upon the occupancy count of zero determined by the processing circuitry 216. In another implementation, the controller 218 is configured to provide automation of other energy control, equipment control, operational control and management systems (e.g. HVAC, heat mapping, smoke control, equipment control and security control) in the area upon the occupancy count determined by the processing circuitry 216. Accordingly, the system 250 is configured to function on the RF wireless communications network in accordance with an implementation of a local control of light source(s) in the lighting element(s), as well as other automation control of energy, equipment, operational and management, as discussed above, of the area in the lighting system.

In examples discussed in more detail later, system nodes often may include both a transmitter and a receiver (sometimes referenced together as a transceiver), for various purposes. At times, such a transceiver-equipped node may use its transmitter as part of an occupancy counting operation; and at other times such a transceiver-equipped node may use its receiver as part of an occupancy counting operation.

Although, FIG. 2D illustrates the implementation of a single Rx and a single Tx in each of the nodes, the system 203 may include other implementations such as multiple Rx in one or more nodes and multiple Tx in one or more nodes. Further, the system 203 may include one or more Tx and one or more Rx in each of the nodes. In the illustrated implementation, the system 250 includes multiple lighting elements 206a-206n with either the Tx or the Rx, however, the multiple lighting elements 206a-206n of the system 200 may include one or more Tx and one or more Rx (see FIG. 7).

For discussion of an initial example of a RF-based occupancy counting operation, assume that the system 250 includes just the elements shown in FIG. 2D. In one example, each of the system nodes 132, 134 and 136 includes the capabilities to communicate over two different RF bands, although the concepts discussed herein are applicable to devices that communicate with luminaires and other system elements via a single RF band. Hence, in the dual band example, the Tx/Rx may be configured for sending and receiving various types of data signals over one band, e.g. for the RF transmission and reception leading to occupancy counting. The other band may be used or for pairing and commissioning messages over another band and/or for communications related to detection of RF or higher level occupancy counting functions, e.g. between receivers R1 and R2 and the controller 218 or the processing circuitry 216. For example, the Tx and Rx are configured as a 900 MHz transmitter and receiver for communication of a variety of system or user data, including lighting control data, for example, commands to turn lights ON/OFF, dim up/down, set scene (e.g., a predetermined light setting), and sensor trip events. Alternatively, the Tx and Rx may be configured as a 2.4 GHz transmitter and receiver for Bluetooth low energy (BLE) communication of various messages related to commissioning and maintenance of a wireless lighting system and/or to communicate results of processing functions in relation to occupant counting.

In one implementation, benefits of the system include the ability to take advantage of Tx and the Rx (e.g. RF Tx and RF Rx) already installed in a location in the area 105, and because the system passively monitors signal broadcasts in the area 105 at a plurality of times, the occupancy counting functionality does not require (does not rely on) the occupants to carry any device.

At a high level, each of the T1 and T2 transmits a RF spectrum (RF) signal at each of a plurality of times. The transmission may be specifically for the occupancy counting. In some cases, however, where the transmitter is in another lighting device or other lighting system element (e.g. a sensor or a wall switch), the transmissions maybe regular lighting related communications, such as reporting status, sending commands, reporting sensed events, etc. The R1 receives the transmissions of the RF signals from the T1 and the T2 through the area 105 during each of the plurality of times. The R1 generates an indicator data of one or more characteristics of the received RF signals at the plurality of times. Some of examples of the characteristics include but are not limited to received signal strength indicator (RSSI) data, bit error rate, packet error rate, phase change etc. or a combination of two or more thereof. The RSSI data represents measurements of signal strength of the received RF. The bit error rate is rate of incorrect bits in received RF signals versus total number of bits in the transmitted RF signals. The packet error rate is rate of incorrect packets in received RF signals versus total number of packets the transmitted RF signals. Phase change is a change of phase of a received RF signal compared to previous reception of the RF signal (typically measured between the antennas spaced apart from each other). For the purposes of the present description, we use RSSI data as the characteristics of the RF signal for processing by the R1 to generate as the indicator data. The R1 measures the signal strength of the received RF signals transmitted by T1 and T2; and generate the RSSI data based on the signal strength of the RF signals transmitted by T1 and T2. The signal strength of each of the RF signal varies over time based whether an occupant exists or there are a number of occupants in each a path the T1 and R1 and/or the T2 and R1 in the area 105.

For each time, the R1 supplies the generated indicator data of one or more characteristics of the received RF signal to the processing circuitry 216. In one implementation using RSSI as the characteristic of interest, the processing circuitry 216 obtains the generated RSSI data at each of the plurality of times from the R1 and processes the RSSI data to determine occupancy count in the area 105.

In one implementation, the processing circuitry 216 processes the generated RSSI data utilizing a RF signal computation to determine occupancy count in the area 105 in real time. In one implementation, the RF signal is a line-of-sight (LOS) signal blocking occurs when at least one occupant crosses the path between one of the T1 132 and/or the T2 133 and R1 134 in the area 105 or is located directly (or close enough) between the one of the T1 132 and/or the T2 133 and the R1 134 (i.e., along the so-called line-of-sight path between the receiver and the transmitter). Similarly, LOS blockage also describes multiple simultaneous occupant crossings or multiple occupants located on the LOS path. LOS blocking causes a measurable decrease in the amplitude or strength of the RF signal received by the R1 134 for the duration of time the occupant remains in a blocking position. In another implementation, using RSSI, the received RF signal includes a multi-path signal which is generated based on a multi-path (MP) scattering/fading. In such implementation, occupant(s) impact the receive signal as a result of changes they cause in the multi-path (MP) scattering/fading. The MP scattering does not require occupants to be located along a LOS path. Although MP scattering may not decrease the amplitude/signal strength as dramatically as LOS blocking, MP scattering results in a decrease in amplitude/signal strength that is related to the number of occupants located in the area 105. In a further implementation, the RF signal reception and associated RSSI measurements and processing thereof are based on both the LOS blockage and the MP scattering.

As discussed above, in one implementation, the RF signal computation generates theoretical or mathematical models that provide for a pre-determined number of occupants in the area 105 at a time prior to the real time. The theoretical model describes RSSI data or a function of the RSSI data of the RF signals received from the transmitter by the various receivers as they relate to various numbers of possible occupants. Theoretical models may take into account one or more ways in which occupants impact the received signal. For example, modeling may include mathematical modeling of the LOS blocking as a function of potential number of occupants, mathematical modeling of the multi-path (MP) scattering/fading as a function of potential number of people, or a combination of both LOS/MP analysis. In one example, mathematical modeling or LOS, MP or LOS/MP may involve deriving an expression for the probability density function (PDF), probability mass function (PMF), or other statistical or probabilistic function as they relate to various numbers of occupants. In other examples, mathematical analysis can involve other spatio-temporal analysis (mathematical analysis of multiple links over space and time) or other probabilistic spatio-temporal analysis (probabilistic analysis of multiple links over space and time) of the RSSI data. In some examples, the analysis makes use of modeling occupant behavior within the area. In one example, for instance, the speed or average speed of occupants may be assumed and used in the mathematical modeling. In another example, any knowledge of spatial preferences or popular areas can be used in the mathematical modeling. Theoretical models generated are stored, for example in a memory unit (not shown) and subsequently compared to the generated RSSI data for occupancy count in the real time.

As discussed above, in one implementation, the processing circuitry 216 compares the generated RSSI data from the plurality of receivers in real time with thresholds or the like produced by the mathematical model. More particularly, in one implementation, the processing circuitry 216 analyzes the generated RSSI data to derive a probability density function (PDF) or probability mass function (PMF) representation of the generated RSSI data that can be compared with the statistical or probabilistic functions derived for the theoretical models as described above. In one implementation, the processing circuitry 216 determines a best match between the PDF/PMF representation of the generated RSSI data in real time and the theoretical or modeled attributes (or functions of the modeled attributes). A variety of methods may be utilized to find the best match or fit between the function describing the RSSI data generated in real time and the function describing the theoretical (modeled) attributes, such as Kullback-Leibler (KL) divergence.

As discussed above, in another implementation, the processing circuitry 216 processes the generated RSSI data utilizing a heuristic algorithm to determines an occupancy count in the area 105. The processing circuitry applies the heuristic algorithm to the indicator data of the RF signals from each of the plurality of receivers to compute an output metric value for each of a plurality of probable number of occupants in the area. The processing circuitry 216 also compares each one of the plurality of computed output metric values with another one of the plurality of computed output metric values to identify one of the plurality of computed output metric values as having a largest value indicates that the probable number of occupants associated with the computed metric value having the larges value is the current estimate of the occupancy count in the area 105. Details of the utilizing of the heuristic algorithm are provided herein below.

As discussed above, in one implementation that takes advantage of the machine learning (ML) capability of the heurist algorithm, the system 250 includes a trusted detector 230, which provides a known occupancy count value (similar to the "known answer" as discussed above). Input from the trusted detector 230 enables the processor or the like running the heuristic algorithm to "learn" which outcomes are accurate versus outcomes that are not accurate, so as to improve performance. The trusted detector 230 in the example may be a standard occupancy sensor, such as passive infrared occupancy detector or a camera based occupancy counting system. Specifically, the trusted detector 230 provides a known occupancy count value for an accurate occupancy count in the area 105 at each of the multiple times. In one implementation, the known occupancy count value is pre-determined prior to heuristically determining the occupancy count in the area 105.

In one implementation, the processing circuitry 216 obtains the indicator data of the RF signal (transmitted by T1 and T2) generated for multiple times (ta-tn) from the R1. The processing circuitry 216 applies one of a heuristic algorithm coefficient among a set of heuristic algorithm heuristic algorithm coefficients to each of the indicator data from the R1 to generate an indicator data metric value for each of the indicator data from the R1 and R2 for the times ta-tn. Each heuristic algorithm coefficient among the set of heuristic algorithm coefficients may be randomly selected at an initial stage of training. In one implementation, a heuristic algorithm coefficient is a variable. In one implementation, the processing circuitry 216 processes the indicator data metric values to compute metric values associated with the R1 at each of the times ta-tn. The metric values provide a measurement of each of a plurality of a probable or possible number of occupants in the area for each of the times ta-tn. Some examples of the measurements may include but not limited to percentage, decimal, ratio, rates etc. In one implementation, the processing circuitry 216 combines/adds the metric values associated with R1 to compute an output metric value for each of the plurality of probable number of occupants in the area for each of the times ta-tn. In one implementation, the processing circuitry 216 compares each of the plurality of output metric values with one another to determine which of the plurality of output metric values has the highest value. The processing circuitry 216 determines that the probable number of occupants in the area with the largest output metric value as the occupancy count in the area for each of the times ta-tn. In one implementation, the processing circuitry 216 compares the occupancy count in the area with the known occupancy count value generated by the trusted detector for each of the ta-tn. Specifically, the processing circuitry 216 compares the occupancy count in the area at each of the ta-tn with the known occupancy count value, for example, an output of the trusted detector 230, to determine an accurate occupancy count in the area as described in greater detail below. In in one implementation, the system 250 includes a learning module 220 coupled to the processing circuitry 216 to determine whether the set of heuristic algorithm coefficients are optimized heuristic algorithm coefficients based on the comparison by the processing circuitry 216 at the times ta-tn to detect an accurate occupancy count in the area. In one implementation, upon determination, that the set of heuristic algorithm coefficients are optimized heuristic algorithm coefficients, the learning module 220 instructs the processing circuitry 216 to utilize the optimized heuristic algorithm coefficients in real time. In one implementation, upon determination, that the set of heuristic algorithm coefficients are not optimized heuristic algorithm coefficients, the learning module 220 instructs the processing circuitry 216 to update one or more heuristic algorithm coefficients among the set of heuristic algorithm coefficients and utilize the updated one or more heuristic algorithm coefficients in a next time. The above implementations are described in greater detail below.

As discussed above, in one implementation, the processing circuitry 216 determines that the occupancy count at a time t1 among the times ta-tn is same as the known occupancy count value. In one implementation, the learning module 220 determines, that the set of heuristic algorithm coefficients are determined to be optimized heuristic algorithm coefficients to be applied to the indicator data for the time t1 to determine the accurate occupancy count. In one implementation, the learning module 220 instructs the processing circuitry 216 to utilize the optimized heuristic algorithm coefficients to apply the indicator data from the receiver for the time t1 to detect the occupancy count in real time. Accordingly, the processing circuitry 216 applies the optimized heuristic algorithm coefficients to determine the occupancy count in real time.

As discussed above, in another implementation, the processing circuitry 216 determines that the occupancy count at a time t1 among the times ta-tn is different than the known occupancy count value. The learning module 220 determines that the set of heuristic algorithm coefficients are not optimized heuristic algorithm coefficients and thus updates the one or more heuristic algorithm coefficients among the set of the heuristic algorithm coefficients to generate updated set of heuristic algorithm coefficients. The learning module 220 instructs the processing circuitry 216 to utilize the updated set of heuristic algorithm coefficients in a next time. The processing circuitry 216 applies the updated heuristic algorithm coefficients to corresponding indicator data from the R1 to generate an updated indicator data metric value for the indicator data from the R1 at the time t1. In one implementation, the processing circuitry 216 processes the updated indicator data metric values to compute updated occupancy count at t1. In one implementation, the processing circuitry 216 determines that the updated occupancy count at the time t1 is the same as the known occupancy count value. As such, the learning module 220 determines that the updated set of heuristic algorithm coefficients are optimized heuristic algorithm coefficients to be applied to the indicator data for the time t1 to determine the accurate occupancy count in real time. In another implementation, the processing circuitry 216 determines that the updated occupancy count is different than the known occupancy count value. The processing circuitry 216 and the learning module 220 repeats the above process for t1 until the occupancy count is same as the known occupancy count value to determine that the set of heuristic algorithm coefficients corresponding to the indicator data from the R1 are the optimized heuristic algorithm coefficients for the t1 among the ta-tn to accurately determine the occupancy count at real time. Accordingly, the processing circuitry 216 applies the optimized heuristic algorithm coefficients to determine the occupancy count in real time.

In one implementation, the occupancy count is determined for the indicator data at each of the ta-tn and compared with the known occupancy count value to determine the optimized heuristic algorithm coefficients for each of the ta-tn to detect an accurate occupancy count in the area 105 of FIG. 1B at each of the ta-tn. In one implementation, the optimized set of heuristic algorithm coefficients for each of the ta-tn are utilized by the processing circuitry 216 to detect accurate occupancy count in the area 105 of FIG. 1B at real time.

Figure 2E:
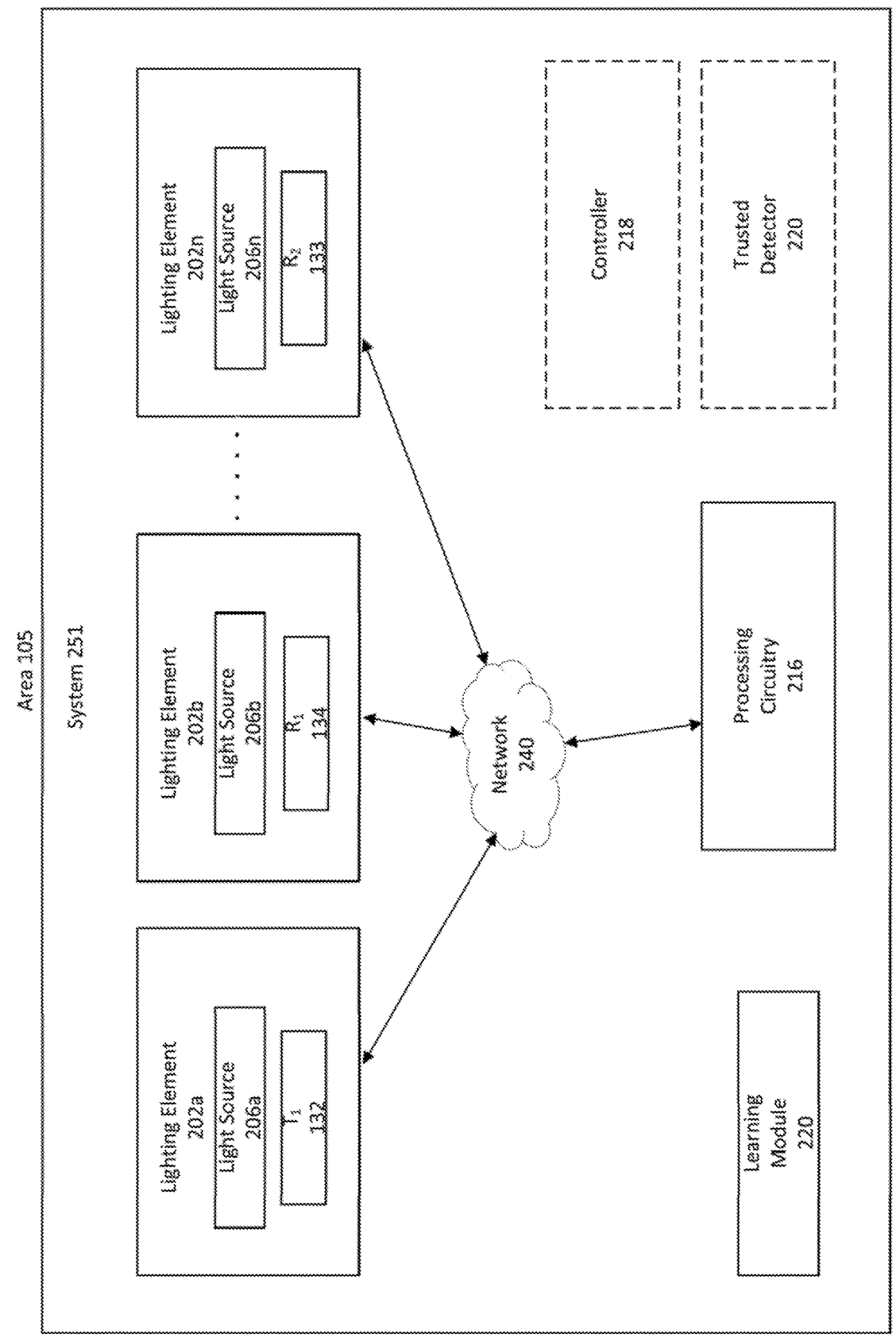
FIG. 2E is a functional block diagram illustrating another example of an occupancy count system based on the wireless topology of FIG. 1B.

Referring to FIG. 2E, there is shown a functional block diagram of an example of an occupancy counting system (system) 251 configured to function on a radio frequency (RF) wireless communication network. In one implementation, the system 251 is similar to the system 250 of FIG. 2D except the processing circuitry 216 is coupled to the one or more of the lighting elements via a network 240. In one implementation, the network 240 is a wireless communication network. In one example, the network 240 is a BLE mesh. In one implementation, the network 240 is a wired network. In one implementation, the processing circuitry 216 is a cloud computing system which includes a plurality of processing servers/machines, which work together or independently to process the indicator data to determine the occupancy count in the area 105. In an alternate implementation, the controller 218 is coupled to the processing circuitry 216 via the network 240. In such alternate implementation, the controller 218 is a cloud computing system which includes a plurality of processing servers/machines, which work together or independently to control operations of one or more elements (e.g. light source 206a-206n) of the lighting elements 202a-202n, and to provide automation of other energy control, equipment control, operational control and management systems (e.g. HVAC, heat mapping, smoke control, equipment control and security control) in the area upon the occupancy count determined by the processing circuitry 216 as well as other automation control of energy, equipment, operational and management, as discussed above, of the area based on determination of the occupancy count by the processing circuitry 216. Accordingly, implementation of the system 251 is configured to globally control the light source(s) of the lighting element(s), as well as other automation control of energy, equipment, operational and management, as discussed above, of the area.

Figure 2F:
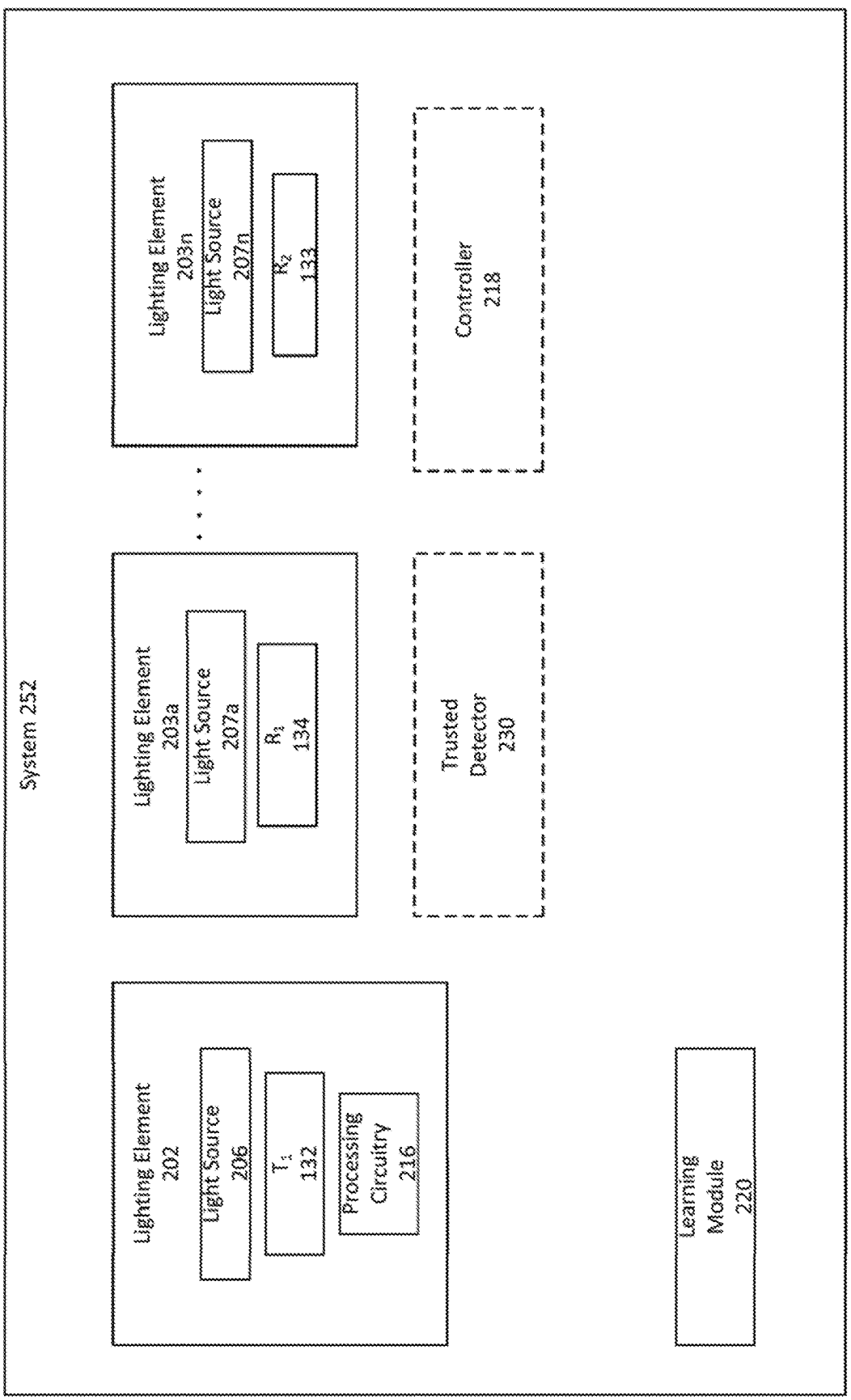
FIG. 2F is a functional block diagram illustrating further example of an occupancy count system based on the wireless topology of FIG. 1B.

Referring to FIG. 2F, there is shown a functional block diagram of an example of an occupancy counting system (system) 252 configured to function on a radio frequency (RF) wireless communication network. In one implementation, the system 252 is similar to the system 250 of FIG. 2D except the processing circuitry 216 is integrated in a lighting element 202. The processing circuitry 216 functions to process the indicator data to determine the occupancy count in the area 105 as discussed in detail above. The system 252 also includes plurality of lighting elements 202a-202n including the lighting element 202. Although, not illustrated, in an alternate implementation, the processing circuitry 216 is integrated in one of the plurality of lighting elements 202a-202n. Each of the plurality of lighting elements includes a corresponding light source among a plurality of light sources 202a-202n.

Figure 3:
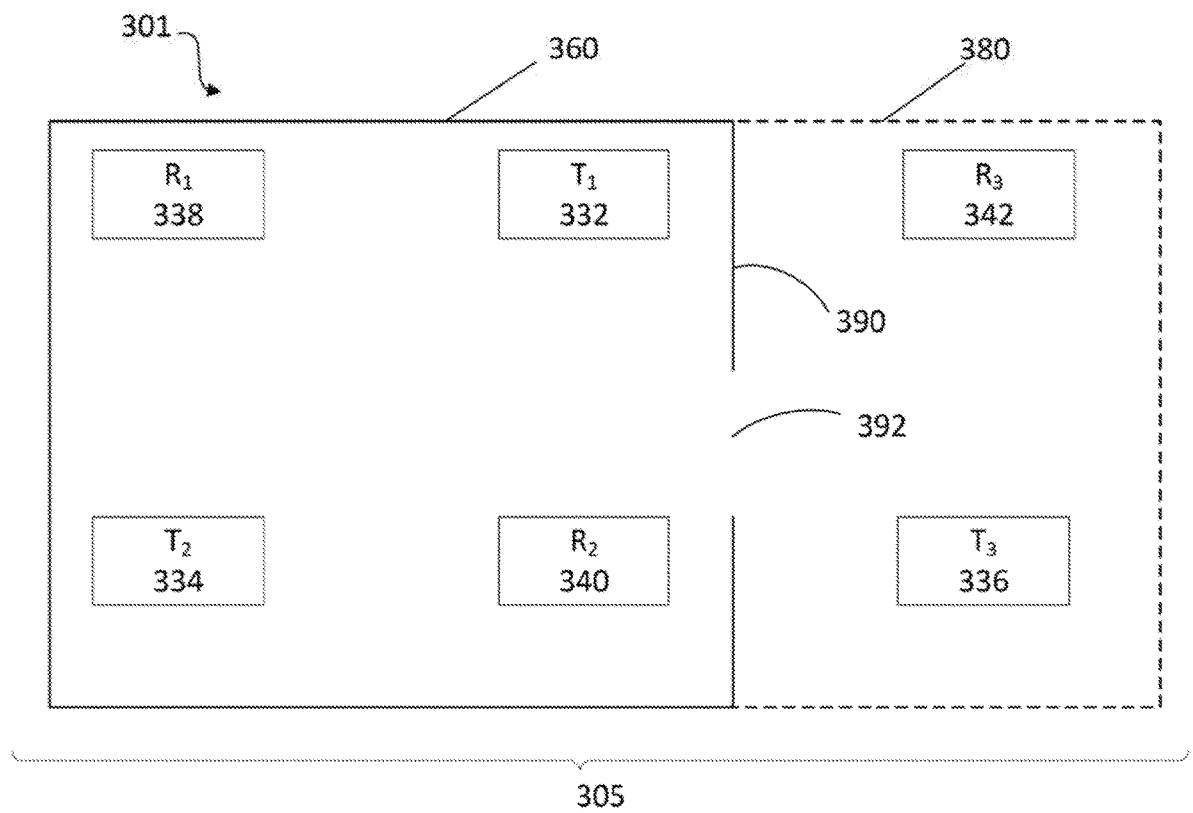
FIG. 3 illustrates an example of a wireless topology of a lighting system with multiple transmitters and multiple receivers.

Referring to FIG. 3, an example of a wireless topology 301 of a lighting system includes a number of wireless communication transmitters (Tx) and a number of wireless communication receiver (Rx) in physical space/area 305. In one implementation, indoor environment is described, but it should be readily apparent that the systems and methods described herein are operable in external environments as well. Specifically, in this example, the area 305 includes a combination of a room 360, and a hallway 380. In one implementation, although, not shown, the area 305 may also include corridors, additional rooms, additional hallways etc. In one implementation, although, not shown, the area 305 may also include corridors, additional rooms, hallways etc.

A wall 390 separates the room 360 from the hallway 380 with an opening 392. As illustrated in the example in FIG. 3, the area 305 includes six intelligent system nodes 332, 334, 336, 338, 340, and 342. Each such system node has an intelligence capability to transmit a signal or receive a signal and process data. In one example, at least one system node includes a light source and is configured as a lighting device or luminaire. In another example, a system node includes a user interface component and is configured as a lighting controller. In another example a system node includes a switchable power connector and is configured as a plug load controller. In a further example a system node includes detector as well as related circuitry and is configured as a lighting related sensor.

In general, a heuristic algorithm with prior or ongoing training for machine learning, "learns" how to manipulate various inputs, possibly including previously generated outputs, in order to generate current new outputs. As part of this learning process, the algorithm receives feedback on prior outputs and possibly some other inputs. Then, the machine learning algorithm calculates parameters to be associated with the various inputs (e.g. the previous outputs, feedback, etc.). The parameters are then utilized by the machine learning to manipulate the inputs and generate the current outputs intended to improve some aspect of system performance in a desired manner. During the machine learning phase, the training data is the discrepancy between the outputs of a present system and the outputs of a trusted system.

In a lighting system with occupancy count, for example, the training data may be the discrepancy between the outputs of an RF based detection system operating in a user/consumer installation and a trusted occupancy count system such as a standard occupancy sensor (e.g. such as a sensor using passive infrared (PIR) of or a camera based system). Machine learning techniques such as artificial neural network is applied to reduce the discrepancy, or example, by optimizing one or more heuristic algorithm coefficients used in the real time occupancy count. Training can take place ahead of the time (before product shipment/commissioning) or in the field as an on-going optimization to reduce false positives in counting occupant(s).

An example may apply a "supervised learning" approach in which the system will be provided a "known answer"

from a "trusted detector" and machine learning is used to optimize the occupancy count algorithm to minimize the difference between the system output and the "known answer." A trusted detector may be a passive infrared occupancy detector or a camera. The particular machine learning approach can be one of decision tree or artificial neural net.

Learning can take place prior to shipping product or as part of commissioning after installation. In either such case, the system may normally operate in the field without using the trusted detector in real time.

Alternatively, a trusted detector can be installed with the system in the field and utilized in real time, in which case, there may be on-going machine learning. For an ongoing learning implementation, the data can be routed to a cloud, learning can take place on another system, and then the improved algorithm (e.g. in the form of new node parameters in the case of a neural network) can be downloaded to the installed lighting system.

In one implementation, details of the heuristic algorithm and machine learning are provided in more detail with respect to the example of FIG. 3.

System nodes 332, 334, 136 and 138 are located in the room 360 and the system nodes 340 and 342 are located in the hallway 380. Each of the system nodes 332, 334 and 336 include transmitters T1, T2 and T3 respectively and each of the system nodes 338, 340 and 342 include receivers R1, R2 and R3 respectively. In one implementation, the occupancy count in the entire area 305 and/or a region (for example room 360) in the area 305 is detected according to a ML occupancy counting procedure as will be described below with respect to FIGS. 4A, 4B and 4C.

In the wireless topology 301 each of the transmitters T1-T3 in the area 305 transmits a RF spectrum (RF) signal for some number (plurality >1) of times. The transmissions from T1-T3 may be specifically for the occupancy count, although the present teachings also apply to implementations using the RF wireless transmissions for other purposes, such as system network communications (as discussed later regarding other examples. Each of the receivers R1-R3 in the area 305 receives the transmissions of the RF signal through the area 305 for each of the plurality of times from each of the multiple T1-T3. Logically, such a three transmitter-three receiver arrangement provides nine T-R pairings for the analysis (each of the three transmitters T1-T3 each paired logically with each of the three receivers R1-R3). Accordingly, each of the R1-R3 is configured to detect a metric of the received RF, which the system (e.g. at one or more nodes or another processor in communication with the receivers) uses to count occupant(s) in its own region (room 360 or the hallway 380) based on receipt of the multiple RF signals received globally from the multiple T1-T3 in the area 305.

Thus, for example, a RF perturbation caused by a person in room 380 is detected by the T1/R1 and T2/R2 (in the room 360), each of which generates a signal indicator data for the heuristic analysis. A person in the room 360 can also trigger a response in the hallway 390 detected by the T3/R3 in the hallway 380, but at a lower signal level. A signal level threshold may be used to reject the false positive in the hallway 390. A similar threshold approach may be implemented to prevent false positives at the nodes i.e. T3/R3 in the hallway 390.

In one example, it is desired to determine an occupancy count in the room 380. The heuristic algorithm is configured to processing indicator data from R1 and R2 to detect one of an inaccurate occupancy count in the room 380 since each of R1 and R2 receives RF signals not only from the T1 and the T2 in the room 380 but also receives RF signals from the T3 in the hallway 180. Accordingly, the heuristic algorithm is applied to allow processing of indicator data from the R1 and R2 in the room 160 to ignore/eliminate the RF signals received from the R3, which are generated by the T3 due to the presence of the number of occupants in the hallway 380 and/or multipath returns of signals generated by the T1 and T2 in the room 180 but received due to or modified by the presence of number of occupants in the hallway 380. In one implementation, the occupancy count in the room 360 is detected according to a ML occupancy counting procedure as will be described below with respect to FIGS. 4A, 4B and 4C.

Figure 4A:
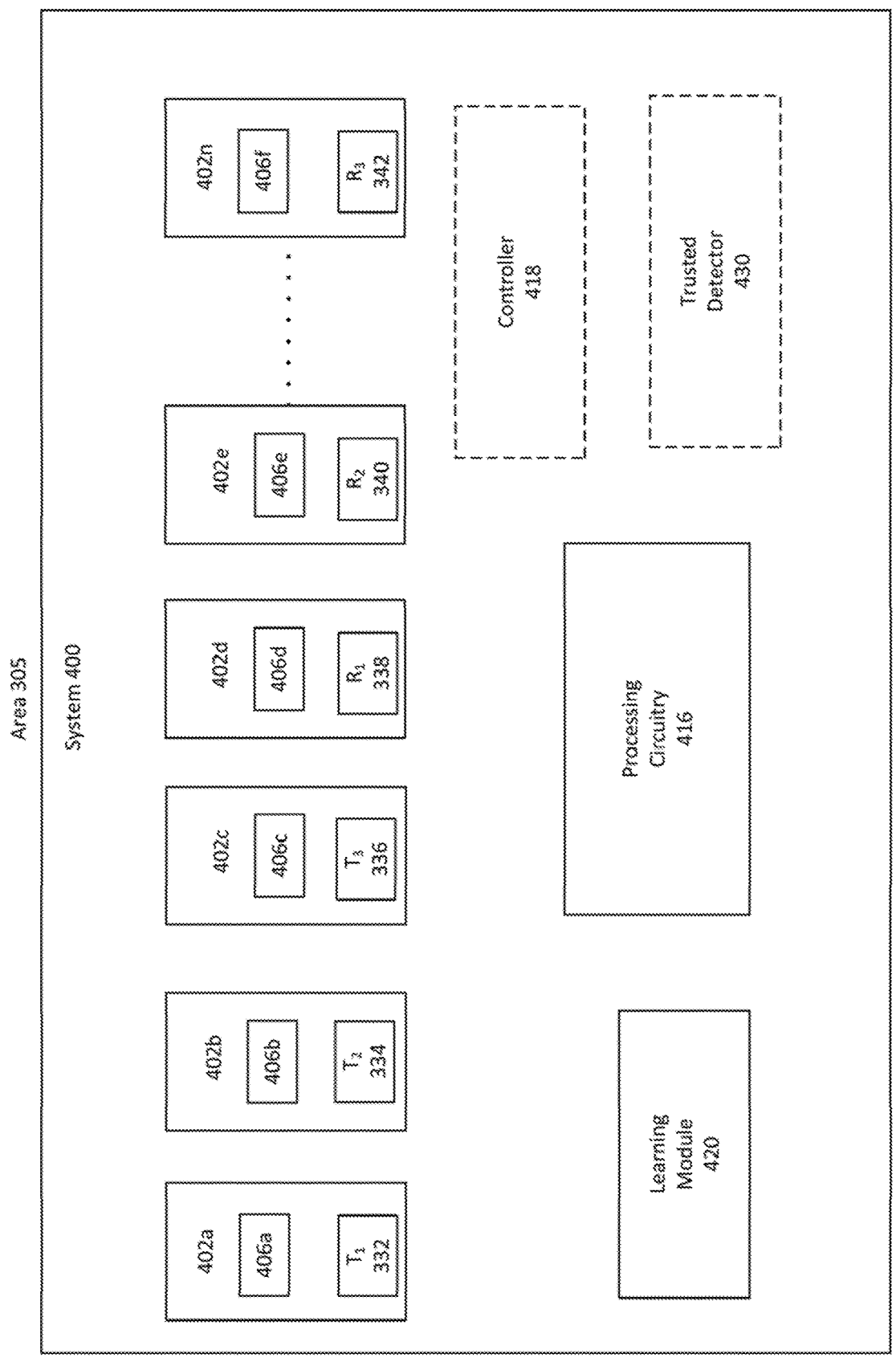
FIG. 4A is a functional block diagram depicting an example of a heuristic occupancy count system based on the wireless topology of FIG. 3.

Referring to FIG. 4A, there is shown a functional block diagram of an example of a heuristic occupancy counting system 400 configured to function on a radio frequency (RF) wireless communication network. As illustrated, the heuristic occupancy counting system 400 includes a plurality of lighting elements 402a-402n in the physical space/area 305 such as a room and a hallway etc. as described above with respect to FIG. 3. In one implementation, an indoor environment is described, but it should be readily apparent that the systems and methods described herein are operable in external environments as well.

In one implementation, the system 402 includes the six intelligent system nodes 332, 334, 336, 338, 340, and 342 as described with respect to FIG. 3 above. As discussed above, each such system node has an intelligence capability to transmit and receive data and process the data. Each system node, for example, may include a receiver (R) and/or a transmitter (T) along with another component used in lighting operations. In one example, a system node includes a light source and is configured as a lighting device. In another example, a system node includes a user interface component and is configured as a lighting controller. In another example the system node includes a switchable power connector and is configured as a plug load controller. In a further example, a system node includes a detector as well as related circuitry and is configured as a lighting related sensor. The system nodes 332, 334, and 336 include T1, T2 and T3 respectively; and the system nodes 338, 340 and 342 include R1, R2 and R3 respectively.

In the implementation shown in FIG. 4A, each of the system nodes 332, 334, 336, 338, 340 and 342 is integrated in one of the lighting elements 402a-402n such that the system node 332 is integrated in the lighting element 402a, the system node 334 is integrated in the lighting element 402b, the system node 336 is integrated in the lighting element 402c the system node 338 is integrated in the lighting element 402d the system node 340 is integrated in the lighting element 402e the system node 342 is integrated in the lighting element 402n. Even though, the system nodes 332, 334, 336, 338, 340 and 342 are shown to be integrated in the lighting elements 202a, 402b and 402c, 402d, 402e and 402n respectively, it should be apparent that the system nodes 332, 334, 336, 338, 340 and 342 are integrated in different lighting devices among the lighting devices 402a-402n. In another alternate implementation, two or more of the system nodes 332, 334, 336, 338, 340 and 342 may be integrated in the same lighting element. For example, the system node 332 and the system node 338 may both be incorporated in the lighting element 402a or in another example, the system node 334 and the system node 340 may both be incorporated in the lighting element 402b.

As described above, the Tx is configured to transmit RF signals and each of the Rx is configured to receive signals from each Tx. In one implementation, each of the lighting elements 402a-402n includes a light source 406, and a system node containing the source 206 or coupled to and operation together with the source 406 and is configured as a luminaire, for example, may take the form of a lamp, light fixture, or other luminaire that incorporates the light source, where the light source by itself contains no intelligence or communication capability, such as one or more LEDs or the like, or a lamp (e.g. "regular light bulbs") of any suitable type. The light source 406 is configured to illuminate some or all of the area 405. In one example, each of some number of individual the light sources 406 is configured to illuminate a portions or a regions of the area 405. Typically, a lighting system will include one or more other system nodes, such as a wall switch, a plug load controller, or a sensor.

In one implementation, the system 400 includes processing circuitry 416 coupled to the receivers R1 and R2. In one implementation, the processing circuitry is coupled to one or more of the lighting elements 402a-402n. In an alternate implementation, the processing circuitry 416 is coupled to the system 400 via a network (not shown). In one implementation, the processing circuitry 416 is implemented in a processor executing software or firmware of configured to determine occupancy count in the area 305 or the region (for example, room 360) in the area 305, although other circuitry or processor-based implementations may be used. In one implementation, the processing circuitry 216 is implemented in firmware of a processor in or more of the R1 node, R2 node or R3 node.

In one implementation, the system 400 includes a controller 418 coupled to the processing circuitry 416. In one implementation the controller 418 may be the same or an additional processor configured to control operations of elements in the system 400 in response to determination of occupancy count in the area 305 or a region (for example, room 360) in the area 305. For example, in an alternate implementation, the controller 418 is configured to process a signal to control operation of one or more light sources 406a-406n. In one alternate implementation, the controller 418 is configured to turn ON one or more light sources 406a-406n upon the occupancy count of one or more determined by the processing circuitry 416. In one implementation, the controller 418 is configured to turn OFF one or more light sources 406a-406n upon the occupancy count of zero determined by the processing circuitry 416. In another implementation, upon the occupancy count in the area 305, the controller 418 may be configured to provide other control and management functions in the area such as heating, ventilation and air conditioning (HVAC), heat mapping, smoke control, equipment control, security control, etc. instead of or in addition to control of the light source(s). Accordingly, the system 400 is configured to function on the RF wireless communications network in accordance with an implementation of a local control of light source(s) in the lighting element(s), as well as other automation control of energy, equipment, operational and management, as discussed above, of the area.

In yet another implementation, the controller 418 communicates the occupancy count to the lighting network via a data packet. The data packet is received by one or more luminaires in the lighting network, which are configured to turn ON or OFF the light source(s) 406 and/or in the luminaire or another network node to provide automation of other energy control, equipment control, operational control and management systems (e.g. HVAC, heat mapping, smoke control, equipment control, security control) in the area 105 based on the occupancy count provided in the data packet. Accordingly, the system 400 communicates the occupancy count with other networks. In another alternate implementation, the controller 418 is coupled to the system 400 via a network (not shown). Accordingly, the system 400 is configured to function on the RF wireless communication network in accordance with an implementation of a global control of light source(s) in lighting element(s), as well as other automation control of energy, equipment, operational and management, as discussed above, of the area in a lighting system.

In one implementation, the system nodes typically include a processor, memory and programming (executable instructions in the form of software and/or firmware). Although the processor may be a separate circuity (e.g. a microprocessor), in many cases, it is feasible to utilize the central processing unit (CPU) and associated memory of a micro-control unit (MCU) integrated together with a transceiver in the form of a system on a chip (SOC). Such an SOC can implement the wireless communication functions as well as the intelligence (e.g. including any processing or controller capabilities) of the system node.

In examples discussed in more detail later, system nodes often may include both a transmitter and a receiver (sometimes referenced together as a transceiver), for various purposes. At times, such a transceiver-equipped node may use its transmitter as part of a heuristic occupancy sensing operation; and at other times such a transceiver-equipped node may use its receiver as part of a heuristic occupancy counting operation. Such transceiver equipped nodes also typically include a processor, memory and programming (executable instructions in the form of software and/or firmware). Although the processor may be a separate circuity (e.g. a microprocessor), in many cases, it is feasible to utilize the central processing unit (CPU) and associated memory of a micro-control unit (MCU) integrated together with physical circuitry of a transceiver in the form of a system on a chip (SOC). Such an SOC can implement the wireless communication functions as well as the intelligence (e.g. including any processing or controller capabilities) of the system node.

Although the system nodes 332-342 of FIG. 4A illustrate an implementation of a single Tx and a single Rx in each of the nodes, the system 400 may include other implementations such as multiple Txs in one or more nodes. Also, FIG. 4A illustrates the implementation of a single Rx in each of the nodes, the system 400 may include other implementations such as multiple Rx in one or more nodes. In the illustrated implementation, the system 400 includes multiple lighting elements 406a-406n with either the Tx or the Rx, however, the multiple lighting elements 406a-406n of the system 400 may include one or more Tx and one or more Rx (see FIG. 7).

For discussion of an initial example of a heuristic RF-based occupancy counting operation, assume that the system 400 includes just the elements shown in FIG. 4A. In one example, each of the system nodes 332-342 includes the capabilities to communicate over two different RF bands, although the concepts discussed herein are applicable to devices that communicate with luminaires and other system elements via a single RF band. Hence, in the dual band example, the Tx/Rx may be configured for sending and receiving various types of data signals over one band, e.g. for the RF transmission and reception leading to occupancy counting. The other band may be used or for pairing and commissioning messages over another band and/or for communications related to detection of RF or higher level occupancy counting functions, e.g. between receivers R1 and R2 and the controller 420 or the processing circuitry 416. For example, the Tx and Rx are configured as a 900 MHz transmitter and receiver for communication of a variety of system or user data, including lighting control data, for example, commands to turn light son/OFF, dim up/down, set scene (e.g., a predetermined light setting), and sensor trip events. Alternatively, the Tx and Rx may be configured as a 2.4 GHz transmitter and receiver for Bluetooth low energy (BLE) communication of various messages related to commissioning and maintenance of a wireless lighting system and/or to communicate results of processing functions in relation to occupant counting.

In one implementation, benefits of the system include the ability to take advantage of Tx and the Rx (e.g. RF Tx and RF Rx) already installed in a location in the area 305, and because the system passively monitors signal broadcasts in the area 305 at a plurality of times, the heuristic occupancy counting functionality does not require (does not rely on) the occupants to carry any device.

At a high level, the T1 transmits a RF spectrum (RF) signal at a plurality of times. The transmission may be specifically for the occupancy counting. In some cases, however, where the transmitter is in another lighting device or other lighting system element (e.g. a sensor or a wall switch), the transmissions maybe regular lighting related communications, such as reporting status, sending commands, reporting sensed events, etc. Each of the R1-R3 receives the transmissions of the RF signal from each of the T1-T3 through the area 305 during each of the plurality of times. Each of the R1-R3 generates an indicator data of one or more characteristics of the received RF signal at each of the plurality of times. Some of examples of the characteristics include but are not limited to received signal strength indicator (RSSI) data, bit error rate, packet error rate, phase change etc. or a combination of two or more thereof. The RSSI data represents measurements of signal strength of the received RF. The bit error rate is rate of incorrect bits in received RF signals versus total number of bits in the transmitted RF signals. The packet error rate is rate of incorrect packets in received RF signals versus total number of packets the transmitted RF signals. Phase change is a change of phase of a received RF signal compared to previous reception of the RF signal (typically measured between the antennas spaced apart from each other). For the purpose of the present description, we use RSSI data as the characteristics of the RF signal for processing by each of the R1-R3 receives to generate as the indicator data. Each of the R1-R3 measures the signal strength of the RF signal received from transmitter T1 and generates the RSSI data based on the signal strength. The signal strength of each of the RF signal varies over time based whether an occupant exists or there are a number of occupants in a path between each of the T1-T3 and each of the R1-R3 in the area 305.

For each time, each of the receivers R1-R3 supplies the generated indicator data of one or more characteristics of the received RF signal to the processing circuitry 316. In one implementation using RSSI as the characteristic of interest, the processing circuitry 316 obtains the generated RSSI data at each of the plurality of times from the various receivers R1-R3 and utilizes a heuristic algorithm to determine occupancy count in the area 305 or the region (for example, room 360) in the area 305 as described in greater detail herein below.

In one implementation, that takes advantage of the machine learning (ML) capability of the heurist algorithm, the system 400 includes a trusted detector 430, which provides a known occupancy count value (similar to the "known answer" as discussed above). Input from the trusted detector 430 to "learn" so as to improve performance. The trusted detector 430 in the example may be a standard occupancy sensor, such as passive infrared occupancy detector or a camera based occupancy counting system. Specifically, the trusted detector 430 provides a known occupancy count value for an accurate occupancy count in the area 305 or the region (for example, room 360) in the area 305 at each of the multiple times. In one implementation, the known occupancy count value is pre-determined prior to heuristically determining the occupancy count in the area 305 or the region (for example, room 360) in the area 305.

In one implementation, the processing circuitry 416 obtains the indicator data of the RF signal generated for multiple times (ta-tn) from each of the R1-R3. The processing circuitry 416 applies one of a heuristic algorithm heuristic algorithm coefficient (heuristic algorithm coefficient) among a set of heuristic algorithm heuristic algorithm coefficients to each of the indicator data from each of the R1-R3 to generate an indicator data metric value for each of the indicator data from each of the R1-R3 for the times ta-tn. Each heuristic algorithm coefficient among the set of heuristic algorithm coefficients may be randomly selected at an initial stage of training. In one implementation, a set of heuristic algorithm coefficients are utilized to determine count in the entire area 305. In one implementation, a different set of heuristic algorithm coefficients are utilized to determine the occupancy count in the sub-area (example, room 360) of the area 305. As such, the different set of heuristic algorithm coefficients are selected to reject false positives such as transmission signals from T3 and received signals from R3 that are not part of the room 360. In one implementation, the heuristic algorithm is trained using the appropriate set of heuristic algorithm coefficients to determine the occupancy count in the entire area 305 or the sub-area of the area, for example, the room 360. As discussed above, training can take place ahead of the time (before product shipment/commissioning) or in the field as an on-going optimization to reduce false positives in determining an occupant count. Also as discussed above, the training is executed by the trusted detector. Accordingly, the occupancy count as discussed below with respect to the area may include the entire area 305 or a sub-area (example room 360) of the entire area 305.

In one implementation, a heuristic algorithm coefficient is a variable. In one implementation, a value of a heuristic algorithm coefficient applied to an indicator data from R1 is the same as a value of a heuristic algorithm coefficient applied to another indicator data that is from R2. In another implementation, a value of a first heuristic algorithm coefficient applied to an indicator data from the R1 is different from value of another (second) heuristic algorithm coefficient applied to another indicator data from R2. In one implementation, the processing circuitry 416 processes the indicator data metric values to compute metric values associated with each of the R1 and R2 at each of the times ta-tn. The metric values provide a measurement of each of a plurality of a probable or possible number of occupants in the area for each of the times ta-tn. Some examples of the measurements may include but not limited to percentage, decimal, ratio, rates etc. In one implementation, the processing circuitry 416 combines/adds the metric values associated with R1 with metric values associated with R2 and the metric values associated with R3 to compute an output metric value for each of the plurality of probable or possible number of occupants in the area for each of the times ta-tn. In one implementation, the processing circuity 416 compares each of the plurality of output metric values with one another to determine which of the plurality of output metric values has the highest value. The processing circuitry 416 determines that the probable number of occupants in the area with the largest output metric value as the occupancy count in the area for each of the times ta-tn. In one implementation, the processing circuitry 416 compares the occupancy count in the area with the known occupancy count value generated by the trusted detector for each of the ta-tn. Specifically, the processing circuitry 416 compares the occupancy count in the area at each of the ta-tn with the known occupancy count value, for example, an output of the trusted detector 430 to determine an accurate occupancy count in the area as described in greater detail below. In one implementation, the system 400 includes a learning module 420 coupled to the processing circuitry 416 to determine whether the set of heuristic algorithm coefficients are optimized heuristic algorithm coefficients based on the comparison by the processing circuitry 416 at the times ta-tn to detect an accurate occupancy count in the area. In one implementation, upon determination, that the set of heuristic algorithm coefficients are optimized heuristic algorithm coefficients, the learning module 420 instructs the processing circuitry 416 to utilize the optimized heuristic algorithm coefficients in real time. In one implementation, upon determination, that the set of heuristic algorithm coefficients are not optimized heuristic algorithm coefficients, the learning module 420 instructs the processing circuitry 416 to update one or more heuristic algorithm coefficients among the set of heuristic algorithm coefficients and utilize the updated one or more heuristic algorithm coefficients in a next time. The above implementations are described in greater detail below.

In one implementation, the processing circuitry 416 determines that the occupancy count at a time t1 among the times ta-tn is same as the known occupancy count value. In one implementation, the learning module 420 determines, that the set of heuristic algorithm coefficients are determined to be optimized heuristic algorithm coefficients to be applied to the indicator data for the time t1 to determine the accurate occupancy count. In one implementation, the learning module 420 instructs the processing circuitry 416 to utilize the optimized heuristic algorithm coefficients to apply to each indicator data among the plurality of indicator data from each of the plurality of receivers for the time t1 to detect the occupancy count in real time. Accordingly, the processing circuitry 416 applies the optimized heuristic algorithm coefficients to determine the occupancy count in real time.

In another implementation, the processing circuitry 416 determines that the occupancy count at a time t1 among the times ta-tn is different than the known occupancy count value. The learning module 420 determines that the set of heuristic algorithm coefficients are not optimized heuristic algorithm coefficients and thus updates the one or more heuristic algorithm coefficients among the set of the heuristic algorithm coefficients to generate updated set of heuristic algorithm coefficients. The learning module 420 instructs the processing circuitry 416 to utilize the updated set of heuristic algorithm coefficients in a next time. The processing circuitry 416 applies the updated heuristic algorithm coefficients to corresponding indicator data from each of the R1-R3 to generate an updated indicator data metric value for each of the indicator data from each of the R1-R3 at the time t1. In one implementation, the processing circuitry 416 processes each of the updated indicator data metric values to compute updated occupancy count at t1. In one implementation, the processing circuitry 416 determines that the updated occupancy count at the time t1 is the same as the known occupancy count value. As such, the learning module 420 determines that the updated set of heuristic algorithm coefficients are optimized heuristic algorithm coefficients to be applied to the indicator data for the time t1 to determine the accurate occupancy count in real time. In another implementation, the processing circuitry 416 determines that the updated occupancy count is different than the known occupancy count value. The processing circuitry 416 and the learning module 420 repeats the above process for t1 until the occupancy count is same as the known occupancy count value to determine that the set of heuristic algorithm coefficients corresponding to the indicator data from each of the R1-R3 are the optimized heuristic algorithm coefficients for the t1 among the ta-tn to accurately determine the occupancy count at real time. Accordingly, the processing circuitry 416 applies the optimized heuristic algorithm coefficients to determine the occupancy count in real time.

In one implementation, the occupancy count is determined for each of the indicator data at each of the ta-tn and compared with the known occupancy count value to determine the optimized heuristic algorithm coefficients for each of the ta-tn to detect an accurate occupancy count in the area 305 or the region (for example, room 360) in the area 305 of FIG. 3 at each of the ta-tn. In one implementation, the optimized set of heuristic algorithm coefficients for each of the ta-tn are utilized by the processing circuitry 416 to detect accurate occupancy count in the area 305 or the region (for example, room 360) in the area 305 of FIG. 3 at real time.

Figure 4B:
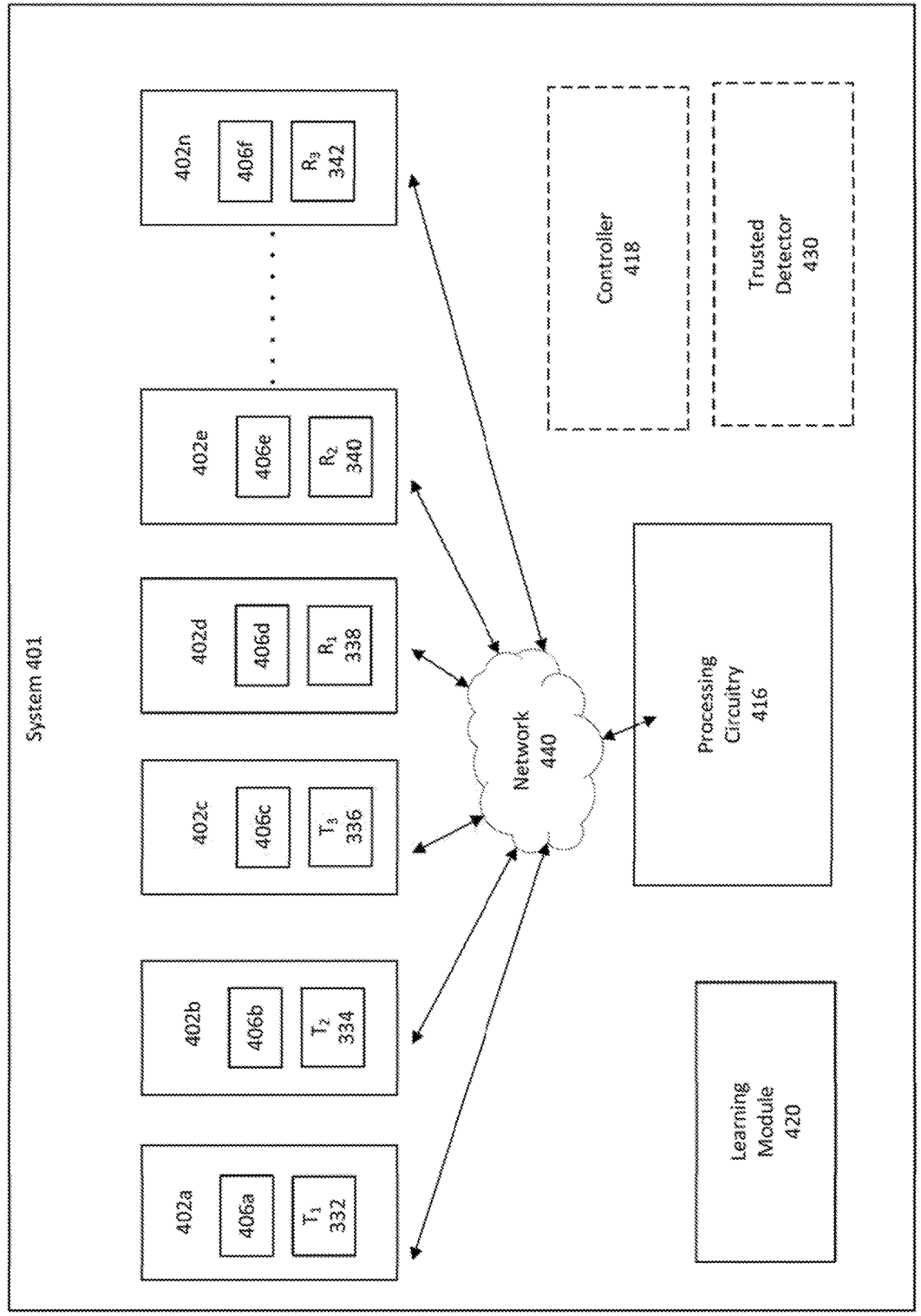
FIG. 4B is a functional block diagram illustrating another example of a heuristic occupancy count system based on the wireless topology of FIG. 3.

Referring to FIG. 4B, there is shown a functional block diagram of an example of a heuristic occupancy counting system (system) 401 configured to function on a radio frequency (RF) wireless communication network. In one implementation, the system 401 is similar to the system 400 of FIG. 4A except the processing circuitry 416 is coupled to the one or more of the lighting elements via a network 440. In one implementation, the network 440 is a wireless communication network. In one example, the network 440 is a BLE mesh. In one implementation, the network 440 is a wired network. In one implementation, the processing circuitry 416 is a cloud computing system which includes a plurality of processing servers/machines, which work together or independently to process the indicator data to determine the occupancy count in the area 305 or the region (for example, room 360) in the area 305. In an alternate implementation, the controller 418 is coupled to the processing circuitry 416 via the network 440. In such alternate implementation, the controller 418 is a cloud computing system which includes a plurality of processing servers/machines, which work together or independently to control operations of one or more elements (e.g. light source 406a-406n) of the lighting elements 402a-402n and/or provide automation of other energy control, equipment control, operational control and management systems (e.g. HVAC, heat mapping, smoke control, equipment control, security control) in the area 105 based on determination of the occupancy count by the processing circuitry 416. Accordingly, implementation of the system 201 is configured to globally control the light source(s) of the lighting element(s) as well as other automation control of energy, equipment, operational and management, as discussed above, of the area.

Figure 4C:
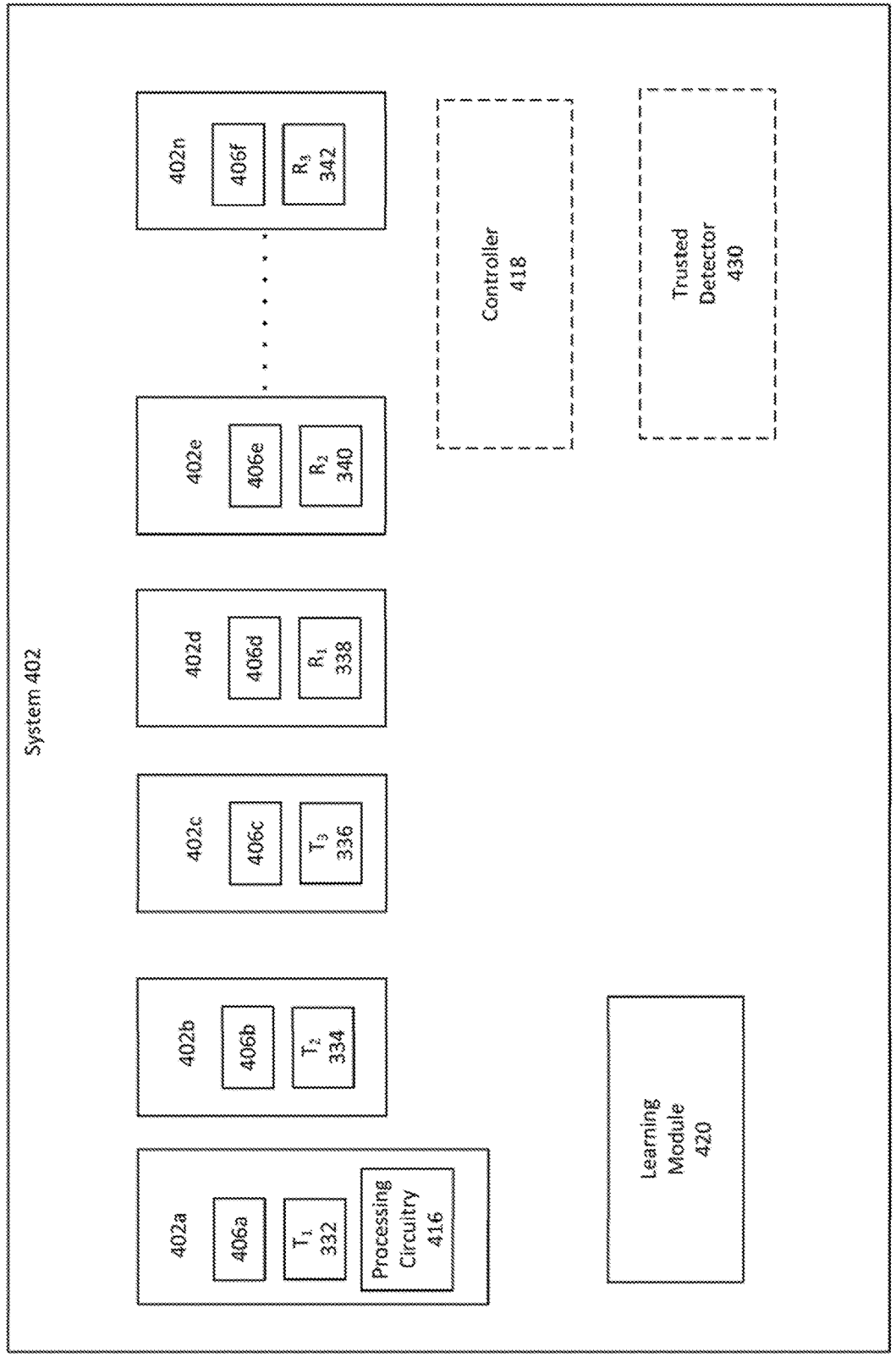
FIG. 4C is a functional block diagram illustrating further example of a heuristic occupancy count system based on the wireless topology of FIG. 3.

Referring to FIG. 4C, there is shown a functional block diagram of an example of a heuristic occupancy counting system (system) 402 configured to function on a radio frequency (RF) wireless communication network. In one implementation, the system 402 is similar to the system 400 of FIG. 4A except the processing circuitry 416 is integrated in a lighting element 402. The processing circuitry 416 functions to process the indicator data to determine the occupancy count in the area 305 or the region (for example, room 360) in the area 305 as discussed in detail above. The system 402 also includes plurality of lighting elements 407a-407n including the lighting element 402. Although, not illustrated, in an alternate implementation, the processing circuitry 416 is integrated in one of the plurality of lighting elements 407a-407n. Each of the plurality of lighting elements includes a corresponding light source among a plurality of light sources 407a-407n.

Figure 5:
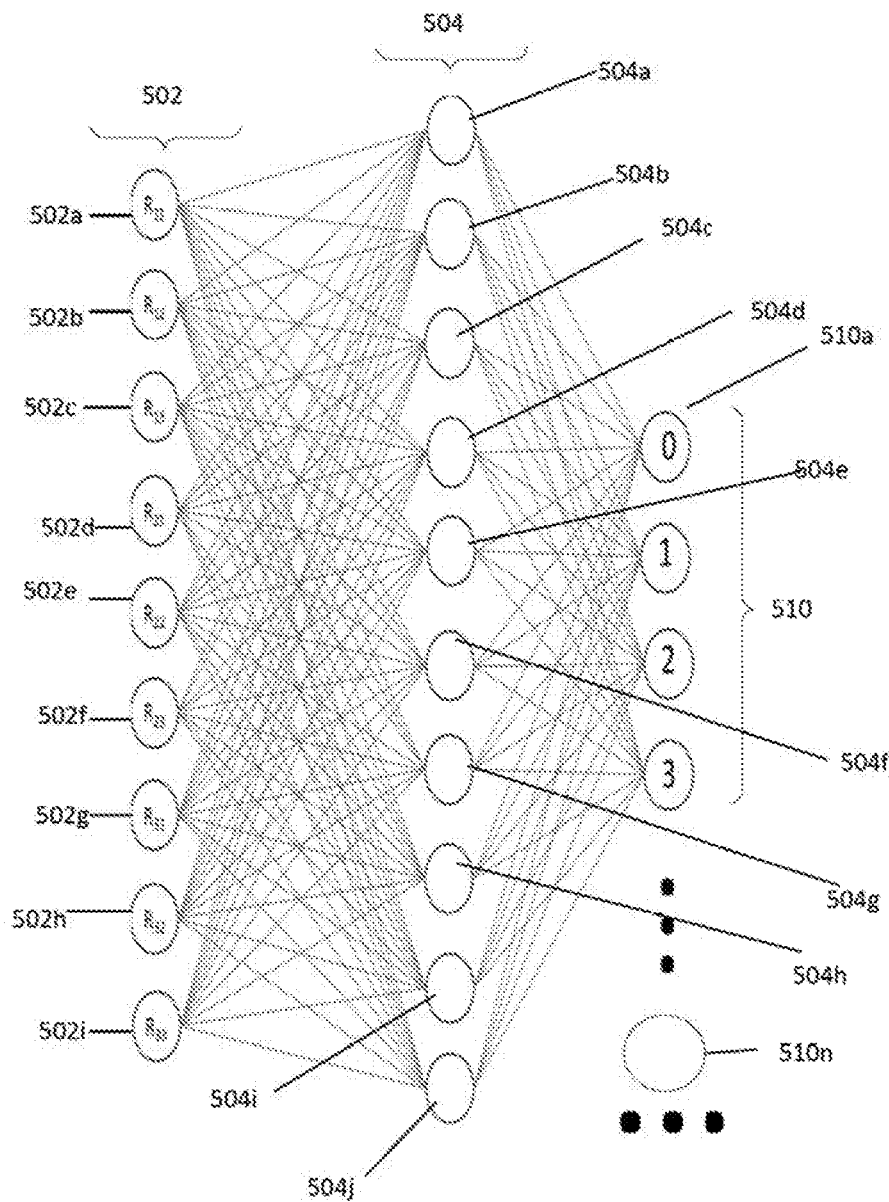
FIG. 5 illustrates an example of a neural network for heuristically determining occupancy count in a lighting system.

In one implementation, the processing circuitry 416 includes a neural network as a training method to determine occupancy count of one of the area 105 of FIG. 1 or 305 of FIG. 3. Referring to FIG. 5, there is shown an example of a neural network 500. The neural network 500 includes an input layer 502 of input nodes 502a-502i, at least one middle layer 504 of middle nodes 504a-504j and an output layer 510 of output nodes 510a-510n. Although, the middle layer 504 includes ten nodes, it is known to one of ordinary skill that the middle layer 504 may include any number of nodes, the number likely to be larger than the number of input nodes. Even though only one middle layer is shown, it known to one of ordinary skill in the art that more than one middle layer of nodes may be implemented in the neural network 500. As shown, each of the input nodes 504a-504i is coupled to each of the middle nodes 504a-504j and each of the middle nodes 504a-504j is coupled to each of the output nodes 510a-510n. In one implementation, each of the middle nodes 504a-504j in the middle layer 504 includes a corresponding bias constant ba-bi unique to that node. The bias constants ba-bi are initially randomly assigned. In one implementation, each connection from each of the input nodes 502a-502i to each of the middle nodes 504a-504j includes a corresponding weight (Wa-Wi) unique to the connection. The weights Wa-Wi are initially randomly assigned. In one implementation, the bias constants ba-bi and the weights Wa-Wi are the plurality of heuristic algorithm coefficients as described above.

The input layer of nodes 502a-502i includes the RSSI data R11, R12, R13, R21, R22, R23, R31, R32 and R33. Specifically, input node 502a includes R11, input node 502b includes R12, input node 502c includes R13, input node 502d includes R21, input node 502e includes R22, input node 502f includes R23, input node 502g includes R31, input node 502h includes R32, and input node 502i includes R33. As such, number of input nodes in the input layer of nodes 502a-502i is equal to number of RSSI data R11, R12, R13, R21, R22, R23, R31, R32 and R33. In one implementation, a forward propagation including propagation function and an activation function is executed in the neural network as described herein below.

An output of each of the input nodes 502a-502i is an input to each of the middle nodes 504a-504i in the middle layer. In one implementation, the forward propagation includes a propagation function executed at each of the middle nodes, 504a-504i to generate propagation function values. Specifically, the propagation function is determined by multiplying each of the RSSI data, R11, R12, R13, R21, R22, R23, R31, R32 and R33 with its corresponding weight (W) among the Wa-Wi and added with its corresponding bias constant (b) among the ba-bi of each of the middle nodes 504a-504i resulting in a propagation value Za-Zi at each of the middle nodes 504a-504i, which is summed together into a single propagation value Zj as shown below:

$$z_j^l = \sum_k w_{jk}^l R_k^{l-1} + b_j^l$$

The single propagation value Zj is fed into the activation function executed in each of the plurality of the output nodes 510a-510n resulting in an output metric value, aj for each of the output nodes 510a-510n as shown herein below:

$$a_j^l = f(z_j^l)$$

As discussed above, each of the output metric values represent the probable or possible number of occupants in the area. In one implementation, the output value is computed for each of the RSSI data at multiple times (ta-tn). In one implementation, each output metric value computed at each time among the multiple times (ta-tn) is compared with the known occupancy count value As discussed above, the known occupancy count value is a "known answer" computed from a trusted detector such as the passive infrared occupancy detector or a camera for each of the times among the multiple times (ta-tn).

In one implementation, the output metric values includes 40 percent for possibly 2 occupants in the area, 30 percent for possibly 4 occupants in the area, 20 percent for possible 7 occupants in the area and 10 percent for possible 10 occupants in the area for a time t1 among the times ta-tn. Since the 40 percent is the highest percent, the occupancy count would be determined to be 2 in the area for the time t1. In one example, the known occupancy count value is 2 at the time t1. The processing circuitry 216 compares the known occupancy count value of 2 at the time tl with the occupancy count of 2 and since it is the same value the occupancy count of 2 is determined to be an accurate occupancy count in the area at the time t1. Accordingly, the corresponding weights Wa-Wi and the bias constants ba-bi are considered to be optimized heuristic algorithm coefficients and these optimized heuristic algorithm coefficients are utilized in the forward propagation as described above to detect an occupancy count in the area at real time. In another example, the known occupancy value is 4 at the time t1. The processing circuitry 216 compares the known occupancy count value of 4 at the time t1 with the occupancy count of 2 and since it is a different value, the occupancy count of 2 is determined to be an inaccurate occupancy count in the area at the time t1. Accordingly, one or more weights Wa-Wi may be updated using a second gradient descent function as shown below:

$$w'_{jk} = w_{jk} - \eta \frac{\partial C}{\partial w_{jk}}$$

Further, one or more bias constants ba-bi may be updated using the third gradient descent function as shown herein below:

$$b'_j = b_j - \eta \frac{\partial C}{\partial b_j}$$

W is the weight, b is the bias constant, n is the learning rate, C is the cost (loss) function. C is the difference between the computed output value and the true occupancy or non-occupancy value. C is minimized by taking the gradient with respect to the heuristic algorithm coefficients. In one implementation, a backward propagation function is applied to the neural network 500 using the one or more updated values of the weights, Wa-Wi and/or the one or more updated bias constants ba-bi. In one implementation, the backward propagation function includes providing the one or more updated values of the weights Wa-Wi and/or one or more updated bias constants ba-bi at each of the output nodes 510a410n and then cascading backwards towards the input node 502 by applying the one or more updated weights Wa-Wi and/or the one or more updated values of the bias constants ba-bi cascade backwards at each of the corresponding middle nodes 504a-504j in the middle layer 504 (including any additional middle nodes in additional middle layers not shown).

In one implementation, an updated occupancy count is generated for the t1 with the one or more updated weights Wa-Wi and/or the one or more updated bias constants ba-bi using the forward propagation as described above. In one implementation, the updating of Wa-Wi using the second gradient function and/or of the ba-bi using the third gradient function as described above, backward propagation and the forward propagation are repeated until the occupancy count is determined to be of the same value as the known occupancy count value at the time t1. In one implementation, upon determination of the updated occupant count being equivalent to the known occupancy count value, the corresponding updated Wa-Wi and/or the updated ba-bi are utilized in the forward propagation as described above to determine the occupancy count in the area 105 and/or 305 at a real time.

Figure 6A:
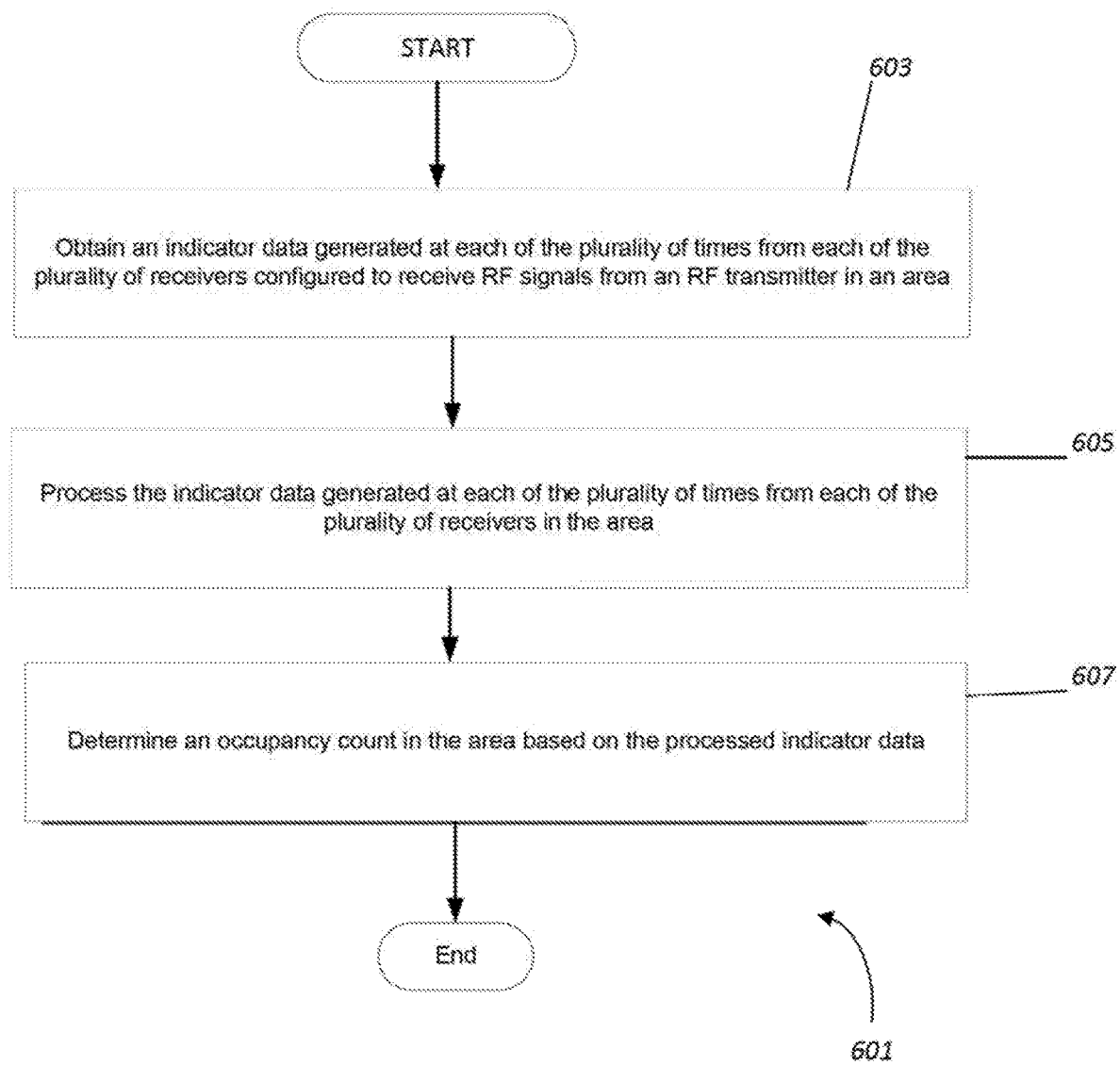
FIG. 6A is a high-level flow chart illustration of an example of a method for a system level determination of an occupancy count.

FIG. 6A illustrates an example of a flowchart of a method 601 for a system level determination of an occupancy count for multiple times in area 105 of a system of FIGS. 2A-2C. As discussed above, the system is disposed within a physical space/area such as a room, corridor, hallway, or doorway. In one implementation, indoor environment is described, but it is known to one of ordinary skill that the systems and methods described herein are operable in external environments as well. In one implementation, the method 601 is implemented by the processing circuitry 216 of FIGS. 2A-2C. At block 603, an indicator data generated at each of the plurality of times from each of the plurality of receivers configured to receive RF spectrum (RF) signals from a RF transmitter in an area is obtained. As discussed above, some of the characteristics include but are not limited to received signal strength indicator (RSSI) data, bit error rate, packet error rate, phase change etc. or a combination of two or more thereof. At block 605, the indicator data generated at each of the plurality of times from each of the plurality of receivers in the area is processed. In one implementation, the processing includes applying, at each respective one of the plurality of times, a RF signal computation to analyze the indicator data of the RF signals from each of the plurality of receivers. In another implementation, the processing includes applying a heuristic algorithm to the indicator data of the RF signals from each of the plurality of receivers to compute an output metric value for each of a plurality of probable number of occupants in the area. At block 607, an occupancy count in the area at each of the plurality of times is determined based on the processed indicator data. In one implementation, the determining includes comparing the analyzed indicator data with a pre-determined number of the occupants in the area and determine one of the pre-determined number of occupants to be the occupancy count in the area that best matches with the analyzed indicator data. In another implementation, the determining includes comparing each one of the plurality of occupant values with another one of the plurality of output metric values to determine one of the plurality of computed output metric values as having a largest value among the plurality of computed output metric values; and determining the probable number of occupants associated with the computed output metric value having the largest value as the occupancy count in the area.

Figure 6B:
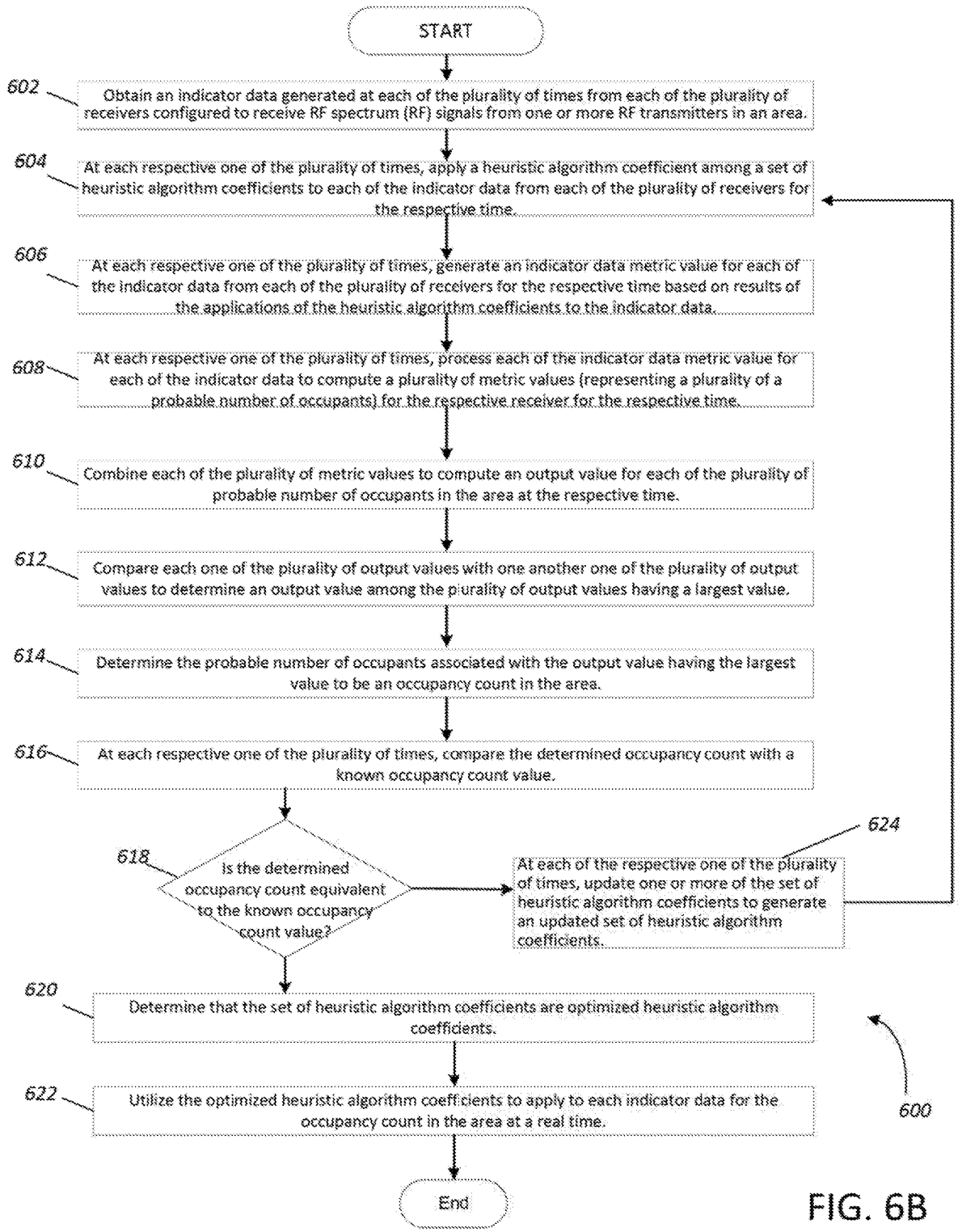
FIG. 6B is a high-level flow chart illustration of an example of a method for heuristically determining an occupancy count.

FIG. 6B illustrates an example of a flowchart of a method 600 for heuristically determining an occupancy count for multiple times in area 105 of a system of FIGS. 2A-2C or the area 305 of the system of FIGS. 4A-4C. As discussed above, the system is disposed within a physical space/area such as a room, corridor, hallway, or doorway. In one implementation, indoor environment is described, but it is known to one of ordinary skill that the systems and methods described herein are operable in external environments as well. In one implementation, the method 600 is implemented by the processing circuitry 216 and the learning module 220 of FIG. 2. In one implementation, the method 600 is implemented by the processing circuitry 416 and the learning module 420 of FIG. 4.

At block 602, an indicator data generated at each of the plurality of times from each of the plurality of receivers configured to receive RF spectrum (RF) signals from one or more RF transmitters in an area is obtained. As discussed above, some of the characteristics include but are not limited to received signal strength indicator (RSSI) data, bit error rate, packet error rate, phase change etc. or a combination of two or more thereof. At block 604, at each respective one of the plurality of times, a heuristic algorithm coefficient among a set of heuristic algorithm coefficients is applied to each of the indicator data from each of the plurality of receivers for the respective time. In one implementation, during the initial stage of the training, each of the heuristic algorithm coefficients among the set of heuristic algorithm coefficients are randomly selected. At block 606, at each respective one of the plurality of times, generate an indicator data metric value for each of the indicator data from each of the plurality of receivers for the respective time based on results of the applications of the heuristic algorithm coefficients to the indicator data. At block 608, at each respective one of the plurality of times, each of the indicator data metric value for each of the indicator data is processed to compute a plurality of metric values (representing a plurality of a probable number of occupants) for the respective receiver for the respective time. In one implementation, each of the plurality of metric values provide a measurement of each of a plurality of a probable number of occupants in the area at the respective time. At block 610, each of the plurality of metric values is combined to compute an output value for each of the plurality of probable number of occupants in the area at the respective time. At block 612, each of the plurality of output values are compared with one another to determine an output value among the plurality of output values having a largest value. At block 614, the probable number of occupants associated with the output value having the largest value is determined to be an occupancy count in the area.

At block 616, at each respective one of the plurality of times, the determined occupancy count is compared with a known occupancy count value. At block 618, at each of the respective one of the plurality of times, a decision is made whether the determined occupancy count is equivalent to the known occupancy count value. When at block 618, it is determined that determined occupancy count is equivalent to the known occupancy count value, then at block 620, it is determined that the set of heuristic algorithm coefficients are optimized heuristic algorithm coefficients. At block 622, the optimized heuristic algorithm coefficients are utilized to apply to each indicator data for the occupancy count in the area at a real time. When at block 618, it is determined that the set of heuristic algorithm coefficients are not optimized heuristic algorithm coefficients, then at block 624, at each of the respective one of the plurality of times, one or more of the set of heuristic algorithm coefficients are updated to generate an updated set of heuristic algorithm coefficients. In one implementation, the method is repeated from block 604 for the updated set of heuristic algorithm coefficients until it is determined that the updated set of heuristic algorithm coefficients are optimized heuristic algorithm coefficients to detect an accurate occupancy count at each respective one of the plurality of times.

Figure 7:
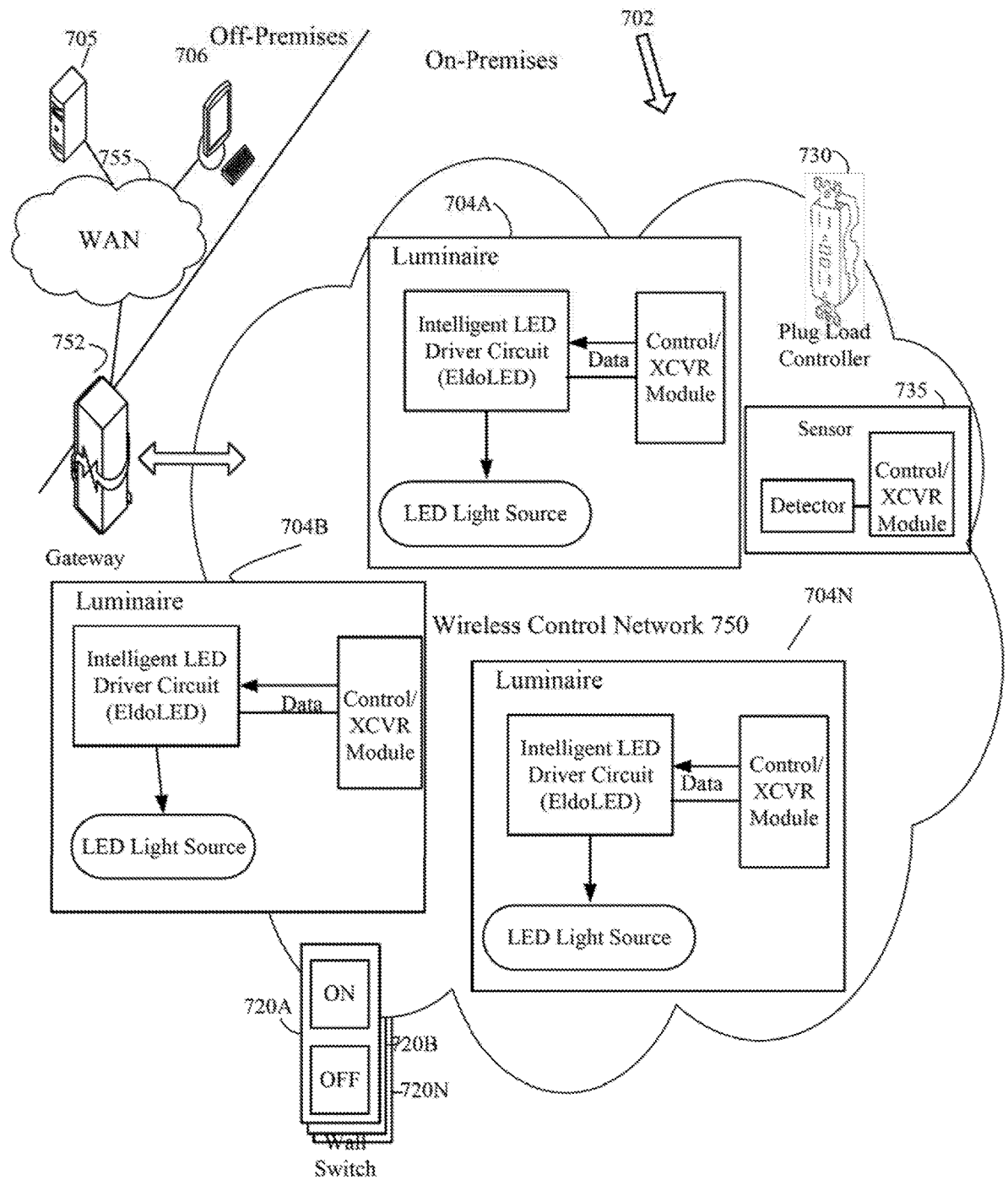
FIG. 7 is a functional block diagram illustrating an example relating to a lighting system of networked devices that provide a variety of lighting capabilities and may implement RF-based occupancy counting.

FIG. 7 is a functional block diagram illustrating an example relating to a system of wireless networked devices that provide a variety of lighting capabilities and may implement RF-based occupancy counting. The wireless networked devices also provide communications in support of lighting functions such as turning lights On/OFF, dimming, set scene, or sensor trip events and may implement RF-based occupancy counting. It should be understood that the term "lighting control device" means a device that includes a controller (Control/XCR module or micro-control unit) that executes a lighting application for communication over a wireless lighting network communication band, of control and systems operations information during control network operation over the lighting network communication band.

A lighting system 702 may be designed for indoor commercial spaces, although the system may be used in outdoor or residential settings. As shown, system 702 includes a variety of lighting control devices, such as a set of lighting devices (a.k.a. luminaires) 104a-104n (lighting fixtures), a set of wall switch type user interface components (a.k.a. wall switches) 720a-720n, a plug load controller type element (a.k.a. plug load controller) 730 and a sensor type element (a.k.a. sensor) 735. Daylight, ambient light, or audio sensors may embedded in lighting devices, in this case luminaires 704a-704n. RF wireless occupancy counting as described above is implemented in one or more of the luminaires 704a-704n to enable occupancy/non-occupancy based control of the light sources. One or more luminaires may exist in a wireless network 750, for example, a sub-GHz or Bluetooth (e.g. 2.4 GHz) network defined by an RF channel and a luminaire identifier.

The wireless network 750 may use any available standard technology, such as WiFi, Bluetooth, ZigBee, etc. An example of a lighting system using a wireless network, such as Bluetooth low energy (BLE), is disclosed in patent application publication US 20160248506 A1 entitled "System and Method for Communication with a Mobile Device Via a Positioning System Including RF Communication Devices and Modulated Beacon Light Sources," the entire contents of which are incorporated herein by reference. Alternatively, the wireless network may use a proprietary protocol and/or operate in an available unregulated frequency band, such as the protocol implemented in nLight® Air products, which transport lighting control messages on the 900 MHz band (an example of which is disclosed in U.S. patent application Ser. No. 15/214,962, filed Jul. 20, 2016, entitled "Protocol for Lighting Control Via a Wireless Network," the entire contents of which are incorporated herein by reference). The system may support a number of different lighting control protocols, for example, for installations in which consumer selected luminaires of different types are configured for a number different lighting control protocols.

The system 702 also includes a gateway 752, which engages in communication between the lighting system 702 and a server 705 through a network such as wide area network (WAN) 755. Although FIG. 7 depicts server 705 as located off premises and accessible via the WAN 755, any one of the luminaires 704a-704n, for example are configured to communicate occupancy count in an area to devices such as the server 705 or even a laptop 706 located off premises.

The lighting control 702 can be deployed in standalone or integrated environments. System 702 can be an integrated deployment, or a deployment of standalone groups with no gateway 752. One or more groups of lighting system 702 may operate independently of one another with no backhaul connections to other networks.

Lighting system 702 can leverage existing sensor and fixture control capabilities of Acuity Brands Lighting's commercially available nLight® wired product through firmware reuse. In general, Acuity Brands Lighting's nLight® wired product provides the lighting control applications. However, the illustrated lighting system 704 includes a communications backbone and includes model—transport, network, media access control (MAC)/physical layer (PHY) functions.

Lighting control 702 may comprise a mix and match of various indoor systems, wired lighting systems (nLight® wired), emergency, and outdoor (dark to light) products that are networked together to form a collaborative and unified lighting solution. Additional control devices and lighting fixtures, gateway(s) 750 for backhaul connection, time sync control, data collection and management capabilities, and interoperation with the Acuity Brands Lighting's commercially available SensorView product may also be provided.

Figure 8:
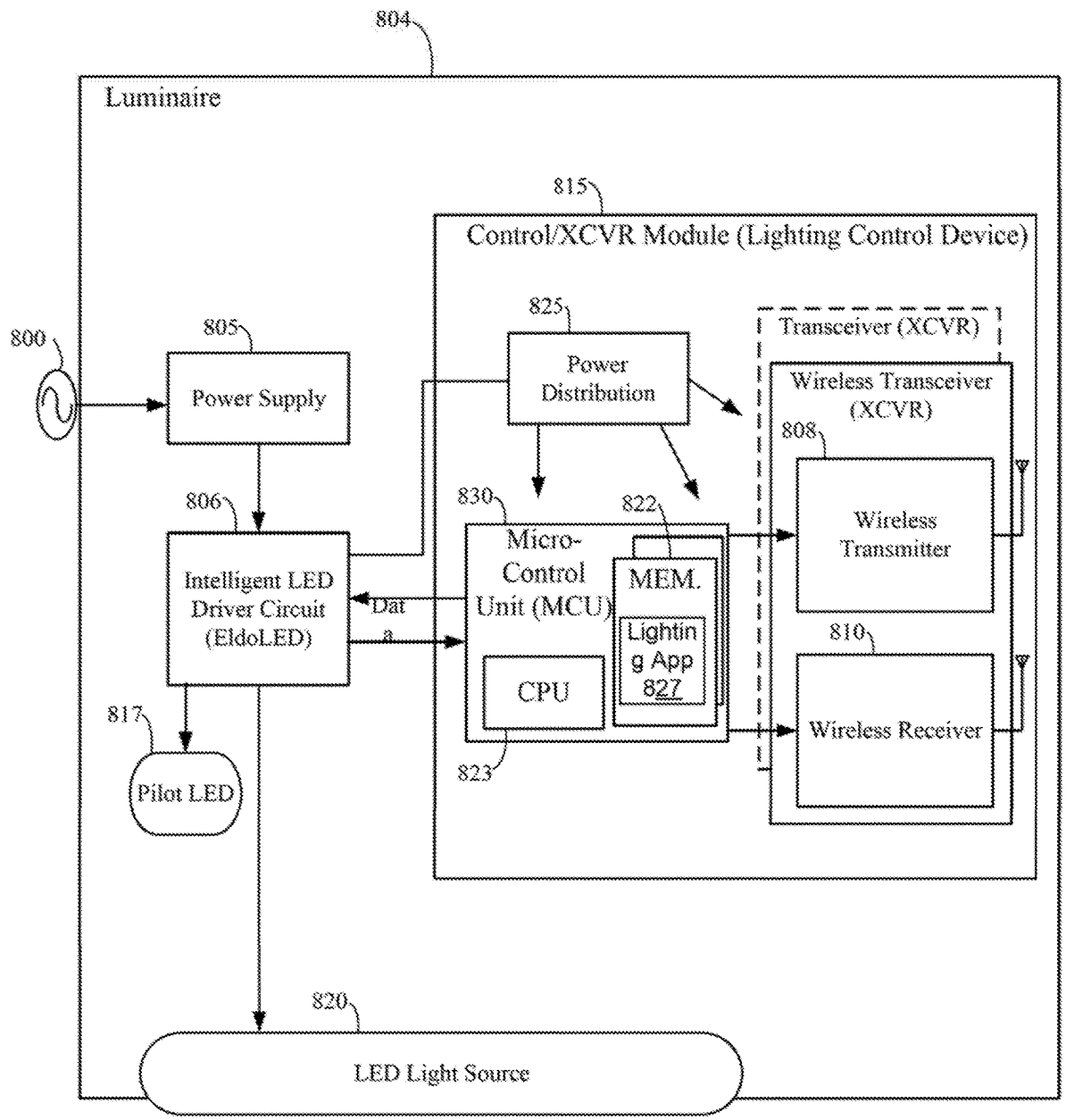
FIG. 8 is a block diagram of an example of a lighting device that operates in and communicates via the lighting system of FIG. 7.

FIG. 8 is a block diagram of a lighting device (in this example, a luminaire) 804 that operates in and communicates via the lighting system 702 of FIG. 7. Luminaire 804 is an integrated light fixture that generally includes a power supply 805 driven by a power source 800. Power supply 805 receives power from the power source 800, such as an AC mains, battery, solar panel, or any other AC or DC source. Power supply 805 may include a magnetic transformer, electronic transformer, switching converter, rectifier, or any other similar type of circuit to convert an input power signal into a power signal suitable for luminaire 804.

Luminaire 804 furthers include an intelligent LED driver circuit 810, control/XCVR module 815, and a light emitting diode (LED) light source 820. Intelligent LED driver circuit 810 is coupled to LED light source 820 and drives that LED light source 820 by regulating the power to LED light source 820 by providing a constant quantity or power to LED light source 320 as its electrical properties change with temperature, for example. The intelligent LED driver circuit 810 includes a driver circuit that provides power to LED light source 820 and a pilot LED 817. The pilot LED 817 may be included as part of the control/XCVR module 315. Intelligent LED driver circuit 810 may be a constant-voltage driver, constant-current driver, or AC LED driver type circuit that provides dimming through a pulse width modulation circuit and may have many channels for separate control of different LEDs or LED arrays. An example of a commercially available intelligent LED driver circuit 810 is manufactured by EldoLED.

LED driver circuit 810 can further include an AC or DC current source or voltage source, a regulator, an amplifier (such as a linear amplifier or switching amplifier), a buck, boost, or buck/boost converter, or any other similar type of circuit or component. LED driver circuit 810 outputs a variable voltage or current to the LED light source 820 that may include a DC offset, such that its average value is nonzero, and/or an AC voltage.

Control/XCR module 815 includes power distribution circuitry 825 and a micro-control unit (MCU) 830. As shown, MCU 830 is coupled to LED driver circuit 810 and controls the light source operation of the LED light source 820. MCU 830 includes a memory 322 (volatile and non-volatile) and a central processing unit (CPU) 823. The memory 822 includes a lighting application 827 (which can be firmware) for both occupancy counting and lighting control operations. The power distribution circuitry 825 distributes power and ground voltages to the MCU 830, wireless transmitter 808 and wireless receiver 810, to provide reliable operation of the various circuitry on the sensor/processing circuitry 815 chip.

Luminaire 804 also includes a wireless radio communication interface system configured for two way wireless communication on at least one band. Optionally, the wireless radio communication interface system may be a dual-band system. It should be understood that "dual-band" means communications over two separate RF bands. The communication over the two separate RF bands can occur simultaneously (concurrently); however, it should be understood that the communication over the two separate RF bands may not actually occur simultaneously.

In our example, luminaire 804 has a radio set that includes radio transmitter 808 as well as a radio receiver 810, together forming a radio transceiver. The wireless transmitter 808 transmits RF signals on the lighting network. This wireless transmitter 808 wireless communication of control and systems operations information, during luminaire operation and during transmission over the first wireless communication band. The wireless receiver carries out receiving of the RF signals from other system elements on the network and generating RSSI data based on signal strengths of the received RF signals. If provided (optional) another transceiver (Tx and Rx) may be provided, for example, for point-to-point communication, over a second different wireless communication bands, e.g. for communication of information other than the control and systems operations information, concurrently with at least some communications over the first wireless communication band. Optionally, the luminaire 804 may have a radio set forming a second transceiver (shown in dotted lines, transmitter and receiver not separately shown).

The included transceiver (solid lines), for example, may be a sub GHz transceiver or a Bluetooth transceiver configured to operate in a standard GHz band. A dual-band implementation might include two transceivers for different bands, e.g. for a sub GHz band and a GHz band for Bluetooth or the like. Additional transceivers may be provided. The particular bands/transceivers are described here by way of non-limiting example, only.

If two bands are supported, the two bands may be for different applications, e.g. lighting system operational communications and system element maintenance/commissioning. Alternatively, the two bands may support traffic segregation, e.g. one band may be allocated to communications of the entity owning/operating the system at the premises whereas the other band may be allocated to communications of a different entity such as the system manufacturer or a maintenance service bureau.

The RF spectrum or "radio spectrum" is a non-visible part of the electromagnetic spectrum, for example, from around 3 MHz up to approximately 3 THz, which may be used for a variety of communication applications, radar applications, or the like. In the discussions above, the RF transmitted and received for network communication, e.g. Wifi, BLE, Zigbee etc., was also used for occupancy counting functions, in the frequencies bands/bandwidths specified for those standard wireless RF spectrum data communication technologies. In another implementation, the transceiver is an ultra-wide band (also known as UWB, ultra-wide band and ultra band) transceiver. UWB is a radio technology that can use a very low energy level for short-range, high-bandwidth communications over a large portion of the radio spectrum. UWB does not interfere with conventional narrowband and carrier wave transmission in the same frequency band. Ultra-wideband is a technology for transmitting information spread over a large bandwidth (>500 MHz) and under certain circumstances be able to share spectrum with other users.

Ultra-wideband characteristics are well-suited to short-distance applications, such as short-range indoor applications. High-data-rate UWB may enable wireless monitors, the efficient transfer of data from digital camcorders, wireless printing of digital pictures from a camera without the need for a personal computer and file transfers between cell-phone handsets and handheld devices such as portable media players. UWB may be used in a radar configuration (emitter and deflection detection at one node) for real-time location systems and occupancy sensing/counting systems; its precision capabilities and low power make it well-suited for radio-frequency-sensitive environments. Another feature of UWB is its short broadcast time. Ultra-wideband is also used in "see-through-the-wall" precision radar-imaging technology, precision detecting and counting occupants (between two radios), precision locating and tracking (using distance measurements between radios), and precision time-of-arrival-based localization approaches. It is efficient, with a spatial capacity of approximately 1013 bit/s/m$^2$. In one example, the UWB is used as the active sensor component in an automatic target recognition application, designed to detect humans or objects in any environment.

The MCU 830 may be a system on a chip. Alternatively, a system on a chip may include the transmitter 808 and receiver 810 as well as the circuitry of the MCU 830.

As shown, the MCU 830 includes programming in the memory 822. A portion of the programming configures the CPU (processor) 823 to determine occupancy counting in an area in the lighting network, including the communications over one or more wireless communication. The programming in the memory 822 includes a real-time operating system (RTOS) and further includes a lighting application 827 which is firmware/software that engages in communications with controlling of the light source based on occupancy counting determined by the CPU 823. The lighting application 827 programming in the memory 822 carries out lighting control operations over the lighting network 750 of FIG. 7. The programming for the determination of an occupancy count in the area may be implemented as part of the RTOS, as part of the lighting application 827, as a standalone application program, or as other instructions in the memory.

Figure 9:
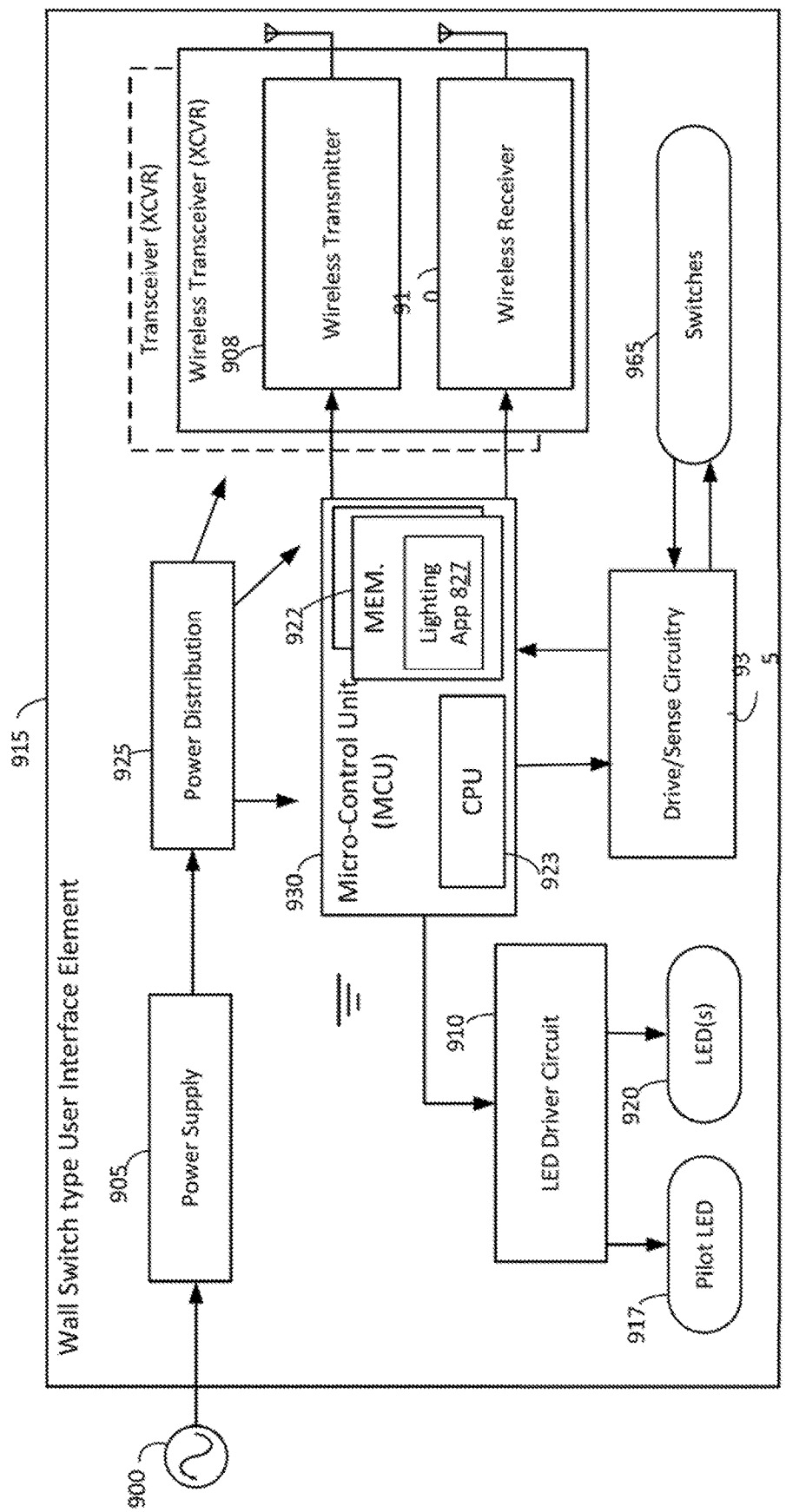
FIG. 9 is a block diagram of an example of a wall switch type user interface element that operates in and communicates via the lighting system of FIG. 7.

FIG. 9 is a block diagram of a wall type user interface element 915 that operates in and communicates via the lighting system 702 of FIG. 7. Wall type user interface (UI) element (UI element) is an integrated wall switch that generally includes a power supply 905 driven by a power source 900. Power supply 905 receives power from the power source 900, such as an AC mains, battery, solar panel, or any other AC or DC source. Power supply 905 may include a magnetic transformer, electronic transformer, switching converter, rectifier, or any other similar type of circuit to convert an input power signal into a power signal suitable for the UI element 915.

UI element 915 furthers includes an intelligent LED driver circuit 910, coupled to LED (s) 920 and drives that LED light source (LED) 920 by regulating the power to LED 820 by providing a constant quantity or power to LED 920 as its electrical properties change with temperature, for example. The intelligent LED driver circuit 910 includes a driver circuit that provides power to LED 920 and a pilot LED 917. Intelligent LED driver circuit 910 may be a constant-voltage driver, constant-current driver, or AC LED driver type circuit that provides dimming through a pulse width modulation circuit and may have many channels for separate control of different LEDs or LED arrays. An example of a commercially available intelligent LED driver circuit 910 is manufactured by EldoLED.

LED driver circuit 910 can further include an AC or DC current source or voltage source, a regulator, an amplifier (such as a linear amplifier or switching amplifier), a buck, boost, or buck/boost converter, or any other similar type of circuit or component. LED driver circuit 910 outputs a variable voltage or current to the LED light source 920 that may include a DC offset, such that its average value is nonzero, and/or an AC voltage.

The UI element 915 includes power distribution circuitry 925 and a micro-control unit (MCU) 930. As shown, MCU 930 is coupled to LED driver circuit 910 and controls the light source operation of the LED 920. MCU 930 includes a memory 922 (volatile and non-volatile) and a central processing unit (CPU) 923. The memory 922 includes a lighting application 927 (which can be firmware) for both occupancy counting and lighting control operations. The power distribution circuitry 925 distributes power and ground voltages to the MCU 930, wireless transmitter 908 and wireless receiver 910, to provide reliable operation of the various circuitry on the UI element 915 chip.

The UI element 915 also includes a wireless radio communication interface system configured for two way wireless communication on at least one band. Optionally, the wireless radio communication interface system may be a dual-band system. It should be understood that "dual-band" means communications over two separate RF bands. The communication over the two separate RF bands can occur simultaneously (concurrently); however, it should be understood that the communication over the two separate RF bands may not actually occur simultaneously.

In our example, the UI element 915 has a radio set that includes radio transmitter 908 as well as a radio receiver 910 together forming a radio transceiver. The wireless transmitter 908 transmits RF signals on the lighting network. This wireless transmitter 908 wireless communication of control and systems operations information, during luminaire operation and during transmission over the first wireless communication band. The wireless receiver carries out receiving of the RF signals from other system elements on the network and generating RSSI data based on signal strengths of the received RF signals. If provided (optional) another transceiver (Tx and Rx) may be provided, for example, for point-to-point communication, over a second different wireless communication bands, e.g. for communication of information other than the control and systems operations information, concurrently with at least some communications over the first wireless communication band. Optionally, the UI element 915 may have a radio set forming a second transceiver (shown in dotted lines, transmitter and receiver not separately shown).

The included transceiver (solid lines), for example, may be a sub GHz transceiver or a Bluetooth transceiver configured to operate in a standard GHz band. A dual-band implementation might include two transceivers for different bands, e.g. for a sub GHz band and a GHz band for Bluetooth or the like. Additional transceivers may be provided. The particular bands/transceivers are described here by way of non-limiting example, only.

If two bands are supported, the two bands may be for different applications, e.g. lighting system operational communications and system element maintenance/commissioning. Alternatively, the two bands may support traffic segregation, e.g. one band may be allocated to communications of the entity owning/operating the system at the premises whereas the other band may be allocated to communications of a different entity such as the system manufacturer or a maintenance service bureau.

The MCU 930 may be a system on a chip. Alternatively, a system on a chip may include the transmitter 908 and receiver 910 as well as the circuitry of the MCU 930.

As shown, the UI element 915 includes a drive/sense circuitry 935, such as an application firmware, drives the occupancy, audio, and photo sensor hardware. The drive/sense circuitry 935 detects state changes (such as change of occupancy, audio or daylight sensor or switch to turn lighting on/off, dim up/down or set scene) via switches 965, such as a dimmer switch, set scene switch. Switches 965 can be or include sensors, such as infrared sensors for occupancy or motion detection, occupancy count, an in-fixture daylight sensor, an audio sensor, a temperature sensor, or other environmental sensor. Switches 965 may be based on Acuity Brands Lighting's commercially available xPoint® Wireless ES7 product.

Also, as shown, the MCU 930 includes programming in the memory 922. A portion of the programming configures the CPU (processor) 923 to determine occupancy count in an area in the lighting network, including the communications over one or more wireless communication bands. The programming in the memory 922 includes a real-time operating system (RTOS) and further includes a lighting application 927 which is firmware/software that engages in communications with controlling of the light source based on one of the occupancy count determined by the CPU 923. As shown, a drive/sense circuitry detects a state change event. The lighting application 927 programming in the memory 922 carries out lighting control operations over the lighting system 702 of FIG. 7. The programming for the determination of an occupancy count in the area may be implemented as part of the RTOS, as part of the lighting application 927, as a standalone application program, or as other instructions in the memory.

Figure 10:
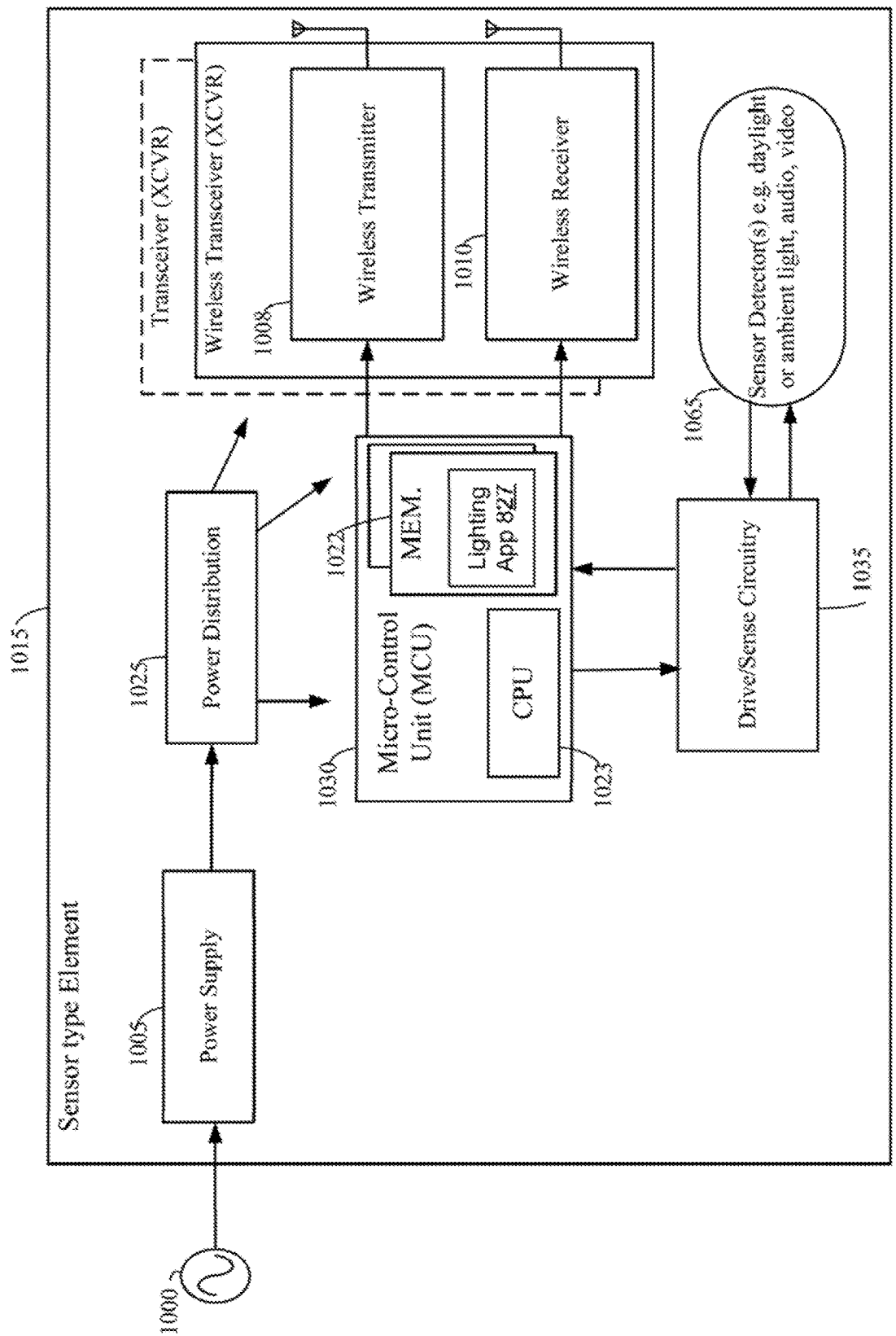
FIG. 10 is a block diagram of an example of a sensor type element that operates in and communicates via the lighting system of FIG. 7.

FIG. 10 is a block diagram of a sensor type element, 1015 that operates in and communicates via the lighting system 702 of FIG. 7. Sensor type element is an integrated sensor detector that generally includes a power supply 1005 driven by a power source 1000. Power supply 805 receives power from the power source 1000, such as an AC mains, battery, solar panel, or any other AC or DC source. Power supply 1005 may include a magnetic transformer, electronic transformer, switching converter, rectifier, or any other similar type of circuit to convert an input power signal into a power signal suitable for the sensor type element 1015.

The sensor type element 1015 includes power distribution circuitry 1025 and a micro-control unit (MCU) 1030. As shown, MCU 1030 includes a memory 1022 (volatile and non-volatile) and a central processing unit (CPU) 1023. The memory 1022 includes a lighting application 1027 (which can be firmware) for both occupancy counting and lighting control operations. The power distribution circuitry 1925 distributes power and ground voltages to the MCU 1030, wireless transmitter 1008 and wireless receiver 1010, to provide reliable operation of the various circuitry on the sensor type element 1015 chip.

The sensor type element 1015 also includes a wireless radio communication interface system configured for two way wireless communication on at least one band. Optionally, the wireless radio communication interface system may be a dual-band system. It should be understood that "dual-band" means communications over two separate RF bands. The communication over the two separate RF bands can occur simultaneously (concurrently); however, it should be understood that the communication over the two separate RF bands may not actually occur simultaneously.

In our example, the sensor type element 1015 has a radio transmitter 1008 as well as radio receiver 1010 together forming a radio transceiver. The wireless transmitter 1008 transmits RF signals on the lighting network. This wireless transmitter 1008 wireless communication of control and systems operations information, during luminaire operation and during transmission over the first wireless communication band. The wireless receiver carries out receiving of the RF signals from other system elements on the network and generating RSSI data based on signal strengths of the received RF signals. If provided (optional) another transceiver (Tx and Rx) may be provided, for example, for point-to-point communication, over a second different wireless communication bands, e.g. for communication of information other than the control and systems operations information, concurrently with at least some communications over the first wireless communication band. Optionally, the luminaire sensor type element 1015 may have a radio set forming a second transceiver (shown in dotted lines, transmitter and receiver not separately shown).

The included transceiver (solid lines), for example, may be a sub GHz transceiver or a Bluetooth transceiver configured to operate in a standard GHz band. A dual-band implementation might include two transceivers for different bands, e.g. for a sub GHz band and a GHz band for Bluetooth or the like. Additional transceivers may be provided. The particular bands/transceivers are described here by way of non-limiting example, only.

If two bands are supported, the two bands may be for different applications, e.g. lighting system operational communications and system element maintenance/commissioning. Alternatively, the two bands may support traffic segregation, e.g. one band may be allocated to communications of the entity owning/operating the system at the premises whereas the other band may be allocated to communications of a different entity such as the system manufacturer or a maintenance service bureau.

The MCU 1030 may be a system on a chip. Alternatively, a system on a chip may include the transmitter 1008 and the receiver 1010 as well as the circuitry of the MCU 830.

As shown, the sensor type element 1015 includes a drive/sense circuitry 1035, such as an application firmware, drives the occupancy, daylight, audio, and photo sensor hardware. The drive/sense circuitry 1035 detects state changes (such as change of occupancy, audio or daylight) via sensor detector(s) 1065, such as occupancy count, audio, daylight, temperature or other environment related sensors. Sensors 1065 may be based on Acuity Brands Lighting's commercially available xPoint® Wireless ES7 product.

Also as shown, the MCU 1030 includes programming in the memory 1022. A portion of the programming configures the CPU (processor) 1023 to determine occupancy count in an area in the lighting network, including the communications over one or more different wireless communication bands. The programming in the memory 1022 includes a real-time operating system (RTOS) and further includes a lighting application 1027 which is firmware/software that engages in communications with controlling of the light source based on occupancy count determined by the CPU 1023. The lighting application 1027 programming in the memory 1022 carries out lighting control operations over the lighting system 702 of FIG. 7. The programming for the determination of an occupancy count in the area may be implemented as part of the RTOS, as part of the lighting application 1027, as a standalone application program, or as other instructions in the memory.

Figure 11:
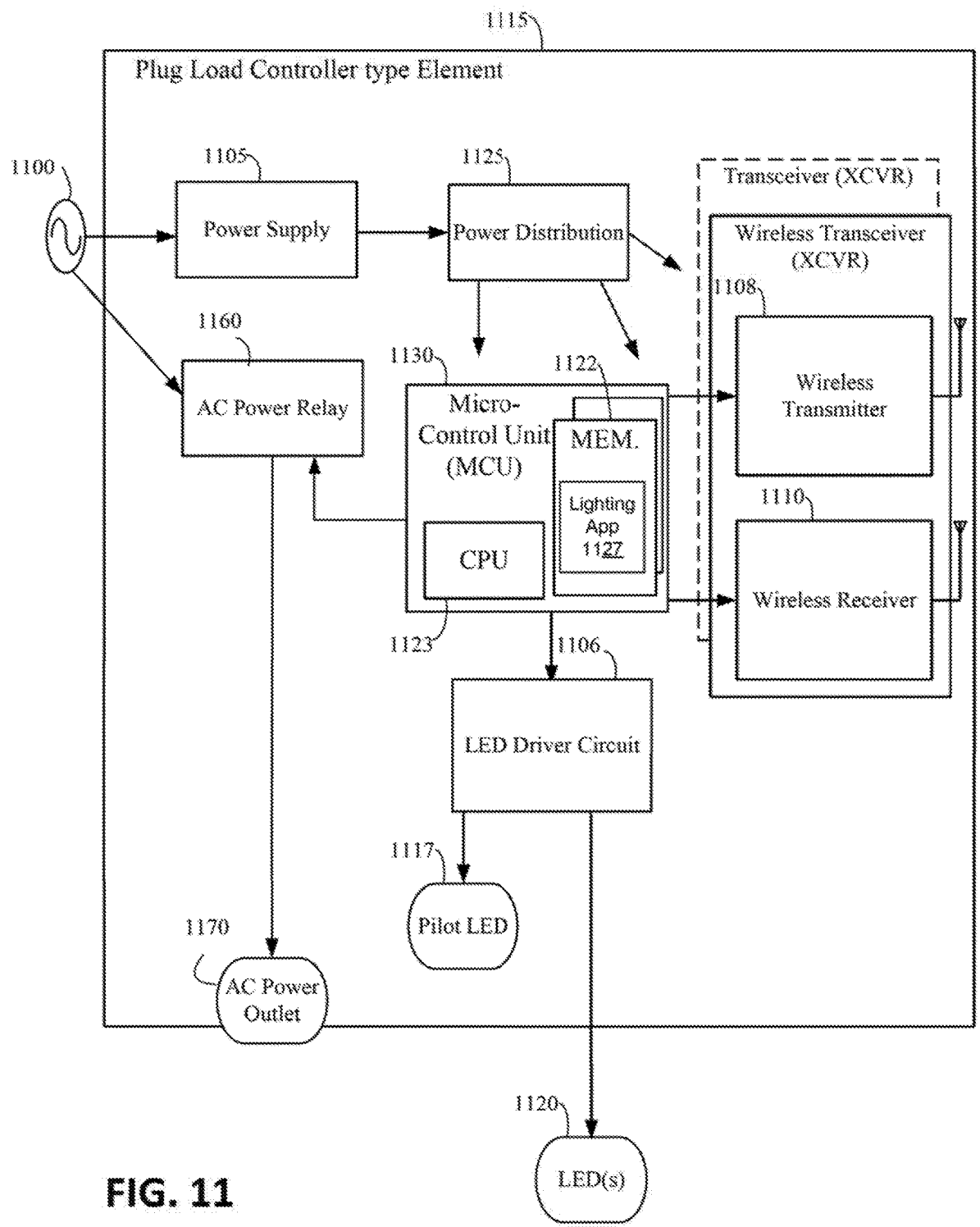
FIG. 11 is a block diagram of an example of a plug load controller type element that operates in and communicates via the lighting system of FIG. 7.

FIG. 11 is a block diagram of a plug load controller type element (plug load element) 1115 that operates in and communicates via the lighting system 702 of FIG. 7. In one example, plug load element 1115 is an integrated switchable power connector that generally includes a power supply 1105 driven by a power source 1100. Power supply 1105 receives power from the power source 1100, such as an AC mains, battery, solar panel, or any other AC or DC source. Power supply 1105 may include a magnetic transformer, electronic transformer, switching converter, rectifier, or any other similar type of circuit to convert an input power signal into a power signal suitable for the plug load element 1115.

Plug load element 1115 includes an intelligent LED driver circuit 1110, coupled to LED (s) 1120 and drives that LED light source (LED) by regulating the power to LED 1120 by providing a constant quantity or power to LED 1120 as its electrical properties change with temperature, for example. The intelligent LED driver circuit 1110 includes a driver circuit that provides power to LED 1120 and a pilot LED 1117. Intelligent LED driver circuit 1110 may be a constant-voltage driver, constant-current driver, or AC LED driver type circuit that provides dimming through a pulse width modulation circuit and may have many channels for separate control of different LEDs or LED arrays. An example of a commercially available intelligent LED driver circuit 1110 is manufactured by EldoLED.

LED driver circuit 1110 can further include an AC or DC current source or voltage source, a regulator, an amplifier (such as a linear amplifier or switching amplifier), a buck, boost, or buck/boost converter, or any other similar type of circuit or component. LED driver circuit 1110 outputs a variable voltage or current to the LED light source 1120 that may include a DC offset, such that its average value is nonzero, and/or an AC voltage.

The plug load element 1115 includes power distribution circuitry 1125 and a micro-control unit (MCU) 1130. As shown, MCU 1130 is coupled to LED driver circuit 1110 and controls the light source operation of the LED 1120. MCU 1130 includes a memory 1122 (volatile and non-volatile) and a central processing unit (CPU) 1123. The memory 1122 includes a lighting application 1127 (which can be firmware) for both occupancy counting and lighting control operations. The power distribution circuitry 1125 distributes power and ground voltages to the MCU 1130, wireless transmitter 1108 and wireless receiver 1110, to provide reliable operation of the various circuitry on the plug load control 1115 chip.

The plug load element 1115 also includes a wireless radio communication interface system configured for two way wireless communication on at least one band. Optionally, the wireless radio communication interface system may be a dual-band system. It should be understood that "dual-band" means communications over two separate RF bands. The communication over the two separate RF bands can occur simultaneously (concurrently); however, it should be understood that the communication over the two separate RF bands may not actually occur simultaneously.

In our example, the plug load element 1115 has a radio set that includes radio transmitter 1108 as well as a radio receiver 1110 forming a radio transceiver. The wireless transmitter 1108 transmits RF signals on the lighting network. This wireless transmitter 1108 wireless communication of control and systems operations information, during luminaire operation and during transmission over the first wireless communication band. The wireless receiver carries out receiving of the RF signals from other system elements on the network and generating RSSI data based on signal strengths of the received RF signals. If provided (optional) another transceiver (Tx and Rx) may be provided, for example, for point-to-point communication, over a second different wireless communication bands, e.g. for communication of information other than the control and systems operations information, concurrently with at least some communications over the first wireless communication band. Optionally, the plug load element 1115 may have a radio set forming a second transceiver (shown in dotted lines, transmitter and receiver not separately shown).

The included transceiver (solid lines), for example, may be a sub GHz transceiver or a Bluetooth transceiver configured to operate in a standard GHz band. A dual-band implementation might include two transceivers for different bands, e.g. for a sub GHz band and a GHz band for Bluetooth or the like. Additional transceivers may be provided. The particular bands/transceivers are described here by way of non-limiting example, only.

If two bands are supported, the two bands may be for different applications, e.g. lighting system operational communications and system element maintenance/commissioning. Alternatively, the two bands may support traffic segregation, e.g. one band may be allocated to communications of the entity owning/operating the system at the premises whereas the other band may be allocated to communications of a different entity such as the system manufacturer or a maintenance service bureau.

The MCU 1130 may be a system on a chip. Alternatively, a system on a chip may include the transmitter 1108 and the receiver 1110 as well as the circuitry of the MCU 1130.

Plug load element 1115 plugs into existing AC wall outlets, for example, and allows existing wired lighting devices, such as table lamps or floor lamps that plug into a wall outlet, to operate in the lighting system. The plug load element 1115 instantiates the table lamp or floor lamp by allowing for commissioning and maintenance operations and processes wireless lighting controls in order to the allow the lighting device to operate in the lighting system. Plug load element 1115 further comprises an AC power relay 1160 which relays incoming AC power from power source 1100 to other devices that may plug into the receptacle of plug load element 1115 thus providing an AC power outlet 1170.

Also, as shown, the MCU 1130 includes programming in the memory 1122. A portion of the programming configures the CPU (processor) 1123 to determine occupancy count in an area in the lighting network, including the communications over one or more wireless communication bands. The programming in the memory 1122 includes a real-time operating system (RTOS) and further includes a lighting application 1127 which is firmware/software that engages in communications with controlling of the light source based on the occupancy count determined by the CPU 1123. As shown, a drive/sense circuitry detects a state change event. The lighting application 1127 programming in the memory 1122 carries out lighting control operations over the lighting system 702 of FIG. 7. The programming for the determination of the occupancy count in the area may be implemented as part of the RTOS, as part of the lighting application 1127, as a standalone application program, or as other instructions in the memory.

Figure 12:
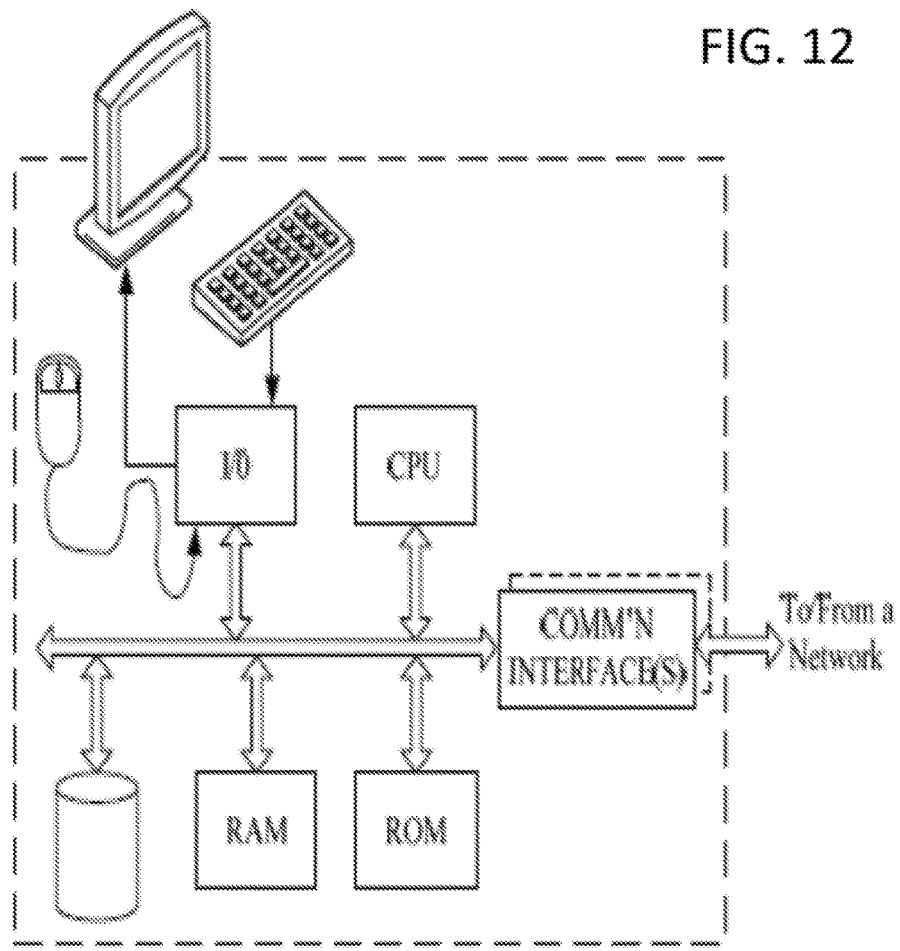
FIG. 12 provides a functional block diagram illustration of a host or server type general purpose computer hardware platform that may be configured to implement some or all of the functional processing examples described with respect to FIGS. 1-6.
Figure 13:
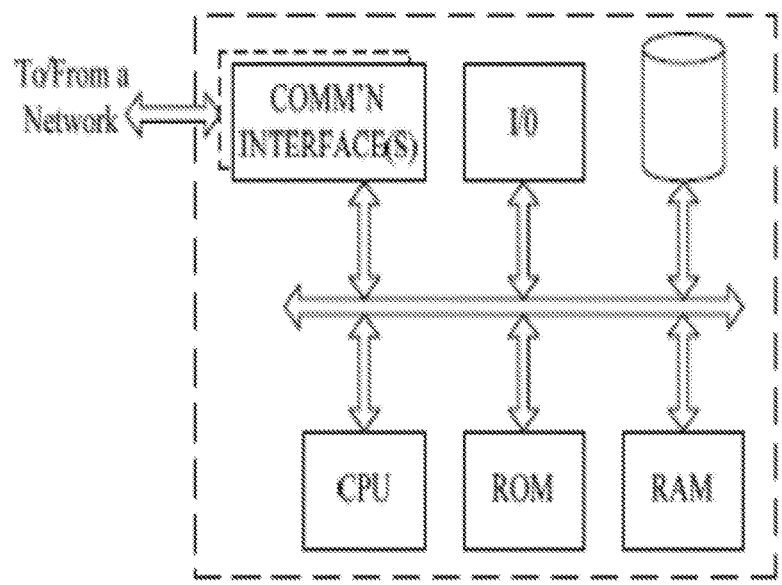
FIG. 13 provides functional block diagram illustrations of a user terminal type general purpose computer hardware platforms that may be configured to implement some or all of the functional processing examples described with respect to FIGS. 1-6.

FIGS. 12 and 13 provide functional block diagram illustrations of general purpose computer hardware platforms that may be configured to implement some or all of the processor or controller functions in the examples described above with respect to FIGS. 1-6. The computer hardware platforms may also be used to implement server 705, the terminal computer 706 or the gateway 752 of FIG. 7.

Specifically, FIG. 12 illustrates a network or host computer platform, as may typically be used to implement a server. Specifically, FIG. 13 depicts a computer with user interface elements, as may be used to implement a personal computer or other type of work station or terminal device, although the computer of FIG. 13 may also act as a server if appropriately programmed. It is believed that those skilled in the art are familiar with the structure, programming and general operation of such computer equipment and as a result the drawings should be self-explanatory.

Hardware of a server computer, for example (FIG. 12), includes a data communication interface for packet data communication. The server computer also includes a central processing unit (CPU), in the form of circuitry forming one or more processors, for executing program instructions. The server platform hardware typically includes an internal communication bus, program and/or data storage for various programs and data files to be processed and/or communicated by the server computer, although the server computer often receives programming and data via network communications. The hardware elements, operating systems and programming languages of such server computers are conventional in nature, and it is presumed that those skilled in the art are adequately familiar therewith. Of course, the server functions may be implemented in a distributed fashion on a number of similar hardware platforms, to distribute the processing load.

Hardware of a computer type user terminal device, such as a PC or tablet computer, similarly includes a data communication interface, CPU, main memory and one or more mass storage devices for storing user data and the various executable programs (see FIG. 13).

Aspects of the methods for occupancy counting in a nodal network, as outlined above, may be embodied in programming in (such as described above FIGS. 12 and 13), e.g. in the form of software, firmware, or microcode executable by a networked computer system such as a server or gateway, and/or a programmable nodal device. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software, from one computer or processor into another, for example, from a management server or host processor (e.g.

from server 705, terminal computer 706 or gateway 752 of FIG. 7) into the processing circuitry 216 of the systems 200, 201 and 202 of FIGS. 2A, 2B and 2C respectively or the processing circuitry 416 of the systems 400, 401 and 402 of FIGS. 4A, 4B and 4C respectively. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to one or more of "non-transitory," "tangible" or "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-transitory storage media include, for example, optical or magnetic disks, such as any of the storage devices in any computer(s) or the like. It may also include storage media such as dynamic memory, for example, the main memory of a machine or computer platform. Tangible transmission media include coaxial cables; copper wire and fiber optics, including the wires that include a bus within a computer system. Carrier-wave transmission media can take the form of electric or electromagnetic signals, or acoustic or light waves such as those generated during radio frequency (RF) and light-based data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Program instructions may include a software or firmware implementation encoded in any desired language. Programming instructions, when embodied in machine readable medium accessible to a processor of a computer system or device, render computer system or device into a special-purpose machine that is customized to perform the operations specified in the program performed by the systems 200, 201 and 202 of FIGS. 2A, 2B and 2C respectively or the processing circuitry 416 of the systems 400, 401 and 402 of FIGS. 4A, 4B and 4C respectively.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is ordinary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that includes the element.

The term "coupled" as used herein refers to any logical, physical or electrical connection, link or the like by which signals produced by one system element are imparted to another "coupled" element. Unless described otherwise, coupled elements or devices are not necessarily directly connected to one another and may be separated by intermediate components, elements or communication media that may modify, manipulate or carry the signals. Each of the various couplings may be considered a separate communications channel.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

The invention claimed is:

1. A system, comprising:
a plurality of lighting elements, wherein each of the plurality of lighting elements is a luminaire and comprises a light source to illuminate an area;
a wireless communication transmitter for wireless radio frequency (RF) spectrum transmission in an area, including RF spectrum transmission at a plurality of times, wherein the wireless communication transmitter is integrated into one of the lighting elements;
a plurality of wireless communication receivers configured to receive RF spectrum signals of transmissions from the wireless communication transmitter through the area at the plurality of times, wherein each of the plurality of the receivers is configured to generate an indicator data of a signal characteristic of an RF spectrum signal at each of the plurality of times, wherein a respective wireless communication receiver of the plurality of wireless communication receivers is integrated into one of the lighting elements; and
a processing circuitry coupled to the plurality of wireless communication receivers to obtain the indicator data of the RF spectrum signal generated at each of the plurality of times from each of the plurality of wireless communication receivers, wherein the processing circuitry is configured to:
(a) at each respective one of the plurality of times, for each respective wireless communication receiver:
(i) apply one of a plurality of heuristic algorithm coefficients to each indicator data of the RF spectrum signal from the wireless communication transmitter received by the respective wireless communication receiver at a respective time based on RF perturbations in the area caused by a person in the area and detected by the respective_wireless communication receiver,
(ii) based on results of the application of the heuristic algorithm coefficients, generate an indicator data metric value for each of the indicator data generated by the respective wireless communication receiver for the respective time,
(iii) process each of the indicator data metric value to compute a plurality of metric values associated with the respective wireless communication receiver for the respective time, wherein each of the plurality of metric values provide a measurement of each of a plurality of a probable number of occupants in the area for the respective time, and
(iv) combine the plurality of metric values associated with each of the plurality of wireless communication receivers to compute an output metric value for each of the plurality of probable number of occupants in the area for the respective time; and
(b) at each respective one of the plurality of times, determine an occupancy count in the area at the respective time based on the computed output metric values for each of the plurality of probable number of occupants in the area.

2. The system of claim 1, wherein:
the wireless communication transmitter is one of a WiFi, blue tooth low energy, Zigbee, nLightAir or an ultra wide band transmitter; and
one or more of the plurality of wireless communication receivers is one of a WiFi, blue tooth low energy, Zigbee, nLightAir or an ultra wide band receiver.

3. The system of claim 1, further comprising a controller coupled to the processing circuitry to control the light source in response to determination of the occupancy count in the area at each of the plurality of times.

4. The system of claim 1, wherein to determine the occupancy count in the area at the respective time, the processing circuitry is configured to:
compare each one of the plurality of computed output metric values with another one of the plurality of computed output metric values to determine one of the plurality of computed output metric values as having a largest value among the plurality of computed output metric values; and
determine the probable number of occupants associated with the computed output metric value having the largest value as the occupancy count in the area.

5. The system of claim 4 further comprising a trusted detector, wherein the trusted detector comprises a known occupancy count value for a pre-determined number of occupants in the area at each of the plurality of times.

6. The system of claim 5, wherein the processing circuitry is further configured to, at each respective one of the plurality of times, compare the determined occupancy count in the area with the known occupancy count value generated by the trusted detector during each respective one of the plurality of times.

7. The system of claim 6 further comprising a learning module coupled to the processing circuitry, wherein the learning module is configured to:
determine whether the plurality of the heuristic algorithm coefficients are optimized heuristic algorithm coefficients at each of the plurality of times based on the comparison.

8. The system of claim 7 wherein upon determination of the plurality of the heuristic algorithm coefficients as the optimized heuristic algorithm coefficients, the learning module is configured to instruct the processing circuitry to utilize the optimized heuristic algorithm coefficients to apply to each indicator data from each of the plurality of wireless communication receivers for determination of the occupancy count in the area at a real time.

9. The system of claim 7 wherein upon determination of the plurality of the heuristic algorithm coefficients as not the optimized heuristic algorithm coefficients, the learning module is configured to update one or more of the plurality of heuristic algorithm coefficients and instruct the processing circuitry to utilize the updated one or more heuristic algorithm coefficients in a next time.

10. The system of claim 9 wherein the processing circuitry is further configured to:
at each respective one of the plurality of times after the update:
apply heuristic algorithm coefficients including the one or more updated heuristic algorithm coefficients to each indicator data from each of the plurality of wireless communication receivers for the respective time after the update,
based on results of the applications of the heuristic algorithm coefficients including the one or more updated heuristic algorithm coefficients to indicator data, generate an updated indicator data metric value for each of the indicator data from each of the plurality of wireless communication receivers for the respective time after the update, and
process the updated indicator data metric values to compute a plurality of updated metric values associated with the respective wireless communication receiver for the respective time, wherein each of the plurality of updated metric values provide a measurement of each of a plurality of a probable number of occupants in the area for the respective time;

combine the plurality of updated plurality of metric values associated with each of the plurality of wireless communication receivers to compute an updated output metric value for each of the plurality of probable number of occupants in the area at the respective time; and determine an updated occupancy count in the area at the respective time based on the updated output metric values for each of the plurality of probable number of occupants in the area; and compare the determined updated occupancy count at each of the plurality of times with the known occupancy count value in the area.

11. The system of claim 1, wherein the indicator data is one of a relative signal strength indicator (RSSI) data, bit error rate data, packet error rate data, or a phase change data, or a combination of two or more thereof.

12. The system of claim 11 wherein:
the processing circuitry is a neural network module; and
the neural network module comprises:
an input layer having a plurality of input nodes, each of the plurality of input nodes includes an indicator data among the plurality of indicator data;
a middle layer having a plurality of middle nodes, each of the middle nodes is coupled to each of the plurality of input nodes; and
an output layer having a plurality of output nodes, each of the output nodes is coupled to each of the plurality of middle nodes.

13. The system of 12, wherein:
the indicator data is a relative signal strength indicator (RSSI) data and the plurality of heuristic algorithm coefficients comprise a set of weights and a set of bias constants,
the function to apply a plurality of the heuristic algorithm coefficients to the RSSI data generated by the respective wireless communication receiver for the respective time includes to:
generate an RSSI data metric value for the RSSI data generated by the respective wireless communication receiver for the respective time and compute a the plurality of metric values for the respective wireless communication receiver for the respective time, the neural network module applies a forward propagation function, and the forward propagation function comprises:
at each of the plurality of middle nodes:
receive from each of the input nodes among the plurality of input nodes, a corresponding RSSI data among a plurality of RSSI data;
apply a set of weights and a set of bias constants to each of the corresponding RSSI data;
compute a product value of each weight among the set of weights with each of the corresponding RSSI data to generate the RSSI data metric value of each of the corresponding RSSI data, wherein the weight is a connection between an input node and a corresponding middle node;
add each product value with a corresponding bias constant among the set of bias constants to generate a plurality of constant values; and
sum each of the plurality constant values to generate a propagation value.

14. The system of claim 13, wherein the function to compute the output metric value for each of the plurality of probable number of occupants in the area at the respective time, the neural network module comprises:
at each of the plurality of the output nodes:
apply an activation function to the propagation value.

15. The system of claim 14, wherein the neural network module is configured to:
update one or more weights among the set of weights to generate updated set of weights; and
update one or more bias constants among the set of bias constants to generate updated set of bias constants.

16. The system of claim 15 wherein the backward propagation function comprises to:
provide, at each of the plurality of output nodes, the updated set of weights and the updated set of bias constants; and
apply, at each of the plurality of middle nodes, the updated set of weights and the updated set of bias constants.

17. The system of claim 16 wherein the processing circuitry is configured to determine an occupancy count in a sub-area within the area.

18. The system of claim 17 wherein the processing circuitry is configured to reject the indicator data of RF spectrum signals generated by one of the plurality of wireless communication receivers located outside of the sub-area and within the area.

19. The system of claim 17 wherein the processing circuitry is configured to reject the indicator data generated by one of the plurality of wireless communication receivers of the RF spectrum signals received from another wireless communication transmitter located outside of the sub-area and within the area.

20. A method comprising:
obtaining, in a lighting system, an indicator data generated at each of a plurality of times from each of a plurality of wireless communication receivers configured to receive radio frequency (RF) spectrum signals from an RF transmitter in an area, wherein the lighting system comprises a plurality of lighting elements;
at each respective one of the plurality of times in the lighting system:
applying a plurality of heuristic algorithm coefficients to each indicator data from each of the plurality of wireless communication receivers for a respective time based on RF perturbations in the area caused by a person in the area and detected by a respective wireless communication receiver,
based on results of the application of the heuristic algorithm coefficients to the indicator data, generating an indicator data metric value for the indicator data generated by a respective wireless communication receiver for the respective time,
processing each of the indicator data metric for each of the indicator data to compute a plurality of metric values for the respective wireless communication receiver for the respective time, wherein each of the plurality of metric values provide a measurement of each of a plurality of a probable number of occupants in the area for the respective time,
combining the plurality of metric values for the respective wireless communication receiver to compute an output value for each of the plurality of probable number of occupants in the area for the respective time; and determining an occupancy count in the area at the respective time based on the computed output metric values for each of the plurality of probable number of occupants in the area.

21. The method of claim 20, further comprising controlling the light source in response to a determination of the occupancy count in the area at each of the plurality of times.

22. The method of claim 20, wherein the determining the occupancy count comprises:
   comparing each one of the plurality of computed output metric values with another one of the plurality of computed output metric values to determine one of the plurality of computed output metric values as having a largest value among the plurality of computed output metric values; and
   determining the probable number of occupants associated with the computed output metric value having the largest value as the occupancy count in the area.

23. The method of claim 20, further comprising comparing the determined occupancy count in the area with a known occupancy count value during each respective one of the plurality of times.

24. The method of claim 23 further comprising determining whether the plurality of the heuristic algorithm coefficients are optimized heuristic algorithm coefficients at each of the plurality of times based on the comparison.

25. The method of claim 24, wherein upon determination of the plurality of the heuristic algorithm coefficients as the optimized heuristic algorithm coefficients, utilizing the optimized heuristic algorithm coefficients to apply to each indicator data from each of the plurality of wireless communication receivers for determination of the occupancy count in the area at a real time.

26. The method of claim 24, wherein upon determination of the plurality of the heuristic algorithm coefficients as not the optimized heuristic algorithm coefficients, updating one or more of the plurality of heuristic algorithm coefficients.

27. The method of claim 26, wherein
   at each respective one of the plurality of times after the update:
      applying heuristic algorithm coefficients including the one or more updated heuristic algorithm coefficients to each indicator data from each of the plurality of wireless communication receivers for the respective time,
      based on results of the application of the updated heuristic algorithm coefficients to the indicator data, generating an updated indicator data metric value for the indicator data generated by the a respective wireless communication receiver for the respective time,
   processing each of the updated indicator data metric for each of the indicator data to compute a plurality of updated metric values for the respective wireless communication receiver for the respective time, wherein each of the plurality of updated metric values provide a measurement of each of a plurality of a probable number of occupants in the area for the respective time,
   combining the plurality of updated metric values for the respective wireless communication receiver to compute an updated output value for each of the plurality of probable number of occupants in the area for the respective time;
   determining an occupancy count in the area at the respective time based on the computed updated output metric values for each of the plurality of probable number of occupants in the area.

* * * * *